United States Patent
Jafari et al.

(10) Patent No.: US 11,451,292 B2
(45) Date of Patent: Sep. 20, 2022

(54) TIME DIVISION MULTIPLE ACCESS OPTICAL SUBCARRIERS

(71) Applicant: Infinera Corporation, Sunnyvale, CA (US)

(72) Inventors: Amir Jafari, Ottawa (CA); Kuang-Tsan Wu, Kanata (CA); David F. Welch, Atherton, CA (US); Steven Joseph Hand, Los Gatos, CA (US); Mohamed Osman, Ottawa (CA)

(73) Assignee: Infinera Corporation, San Jose, CA (US)

( * ) Notice: Subject to any disclaimer, the term of this patent is extended or adjusted under 35 U.S.C. 154(b) by 44 days.

(21) Appl. No.: 16/809,441

(22) Filed: Mar. 4, 2020

(65) Prior Publication Data

US 2020/0287621 A1 Sep. 10, 2020

Related U.S. Application Data

(60) Provisional application No. 62/813,151, filed on Mar. 4, 2019.

(51) Int. Cl.
*H04B 7/26* (2006.01)
*H04B 10/50* (2013.01)
(Continued)

(52) U.S. Cl.
CPC ....... *H04B 7/2656* (2013.01); *H04B 10/0773* (2013.01); *H04B 10/0793* (2013.01);
(Continued)

(58) Field of Classification Search
CPC ............ H04B 7/2656; H04B 10/25754; H04B 10/25; H04B 10/40; H04B 10/505;
(Continued)

(56) References Cited

U.S. PATENT DOCUMENTS 4,483,000 A 11/1984 Yamamoto et al.
4,528,565 A 7/1985 Hauptmann
(Continued)

FOREIGN PATENT DOCUMENTS

EP 0512642 11/1992
EP 3208957 8/2017
(Continued)

OTHER PUBLICATIONS

"Faster than Nyquist Transmission by Non-Orthogonal Time Division Multiplexing of Nyquist Sinc Sequences"; Dorostkar et al.; 2018 (Year: 2018).*

(Continued)

*Primary Examiner* — Benjamin H Elliott, IV
(74) *Attorney, Agent, or Firm* — David L. Soltz

(57) ABSTRACT

A transmitter can include a laser operable to output an optical signal; a digital signal processor operable to receive user data and provide electrical signals based on the data; and a modulator operable to modulate the optical signal to provide optical subcarriers based on the electrical signals. A first one of the subcarriers carries carries first TDMA encoded information and second TDMA encoded information, such that the first TDMA encoded information is indicative of a first portion of the data and is carried by the first one of the subcarriers during a first time slot, and the second TDMA encoded information is indicative of a second portion of the data and is carried by the first one of the subcarriers during a second time slot. The first TDMA encoded information is associated with a first node remote from the transmitter and the second TDMA encoded information is associated with a second node remote from the transmitter. A second one of the subcarriers carries third information that is not TDMA encoded, the third informa-
(Continued)

tion being associated with a third node remote from the transmitter. A receiver and system also are described.

26 Claims, 33 Drawing Sheets

(51) Int. Cl.
| | |
|---|---|
| H04B 10/548 | (2013.01) |
| H04B 10/61 | (2013.01) |
| H04B 10/69 | (2013.01) |
| H04J 14/02 | (2006.01) |
| H04L 1/00 | (2006.01) |
| H04L 5/00 | (2006.01) |
| H04J 14/08 | (2006.01) |
| H04J 14/00 | (2006.01) |
| H04B 10/077 | (2013.01) |
| H04B 10/079 | (2013.01) |
| H04B 10/25 | (2013.01) |
| H04B 10/40 | (2013.01) |
| H04J 99/00 | (2009.01) |
| H04Q 11/00 | (2006.01) |
| H04B 10/2575 | (2013.01) |

(52) U.S. Cl.
CPC ....... *H04B 10/25* (2013.01); *H04B 10/25754* (2013.01); *H04B 10/40* (2013.01); *H04B 10/503* (2013.01); *H04B 10/504* (2013.01); *H04B 10/505* (2013.01); *H04B 10/548* (2013.01); *H04B 10/61* (2013.01); *H04B 10/613* (2013.01); *H04B 10/69* (2013.01); *H04J 14/005* (2013.01); *H04J 14/0298* (2013.01); *H04J 14/08* (2013.01); *H04J 15/00* (2013.01); *H04L 1/0041* (2013.01); *H04L 1/0045* (2013.01); *H04L 1/0071* (2013.01); *H04L 5/001* (2013.01); *H04Q 11/0005* (2013.01); *H04Q 11/0067* (2013.01); *H04Q 2011/0015* (2013.01); *H04Q 2011/0035* (2013.01); *H04Q 2011/0079* (2013.01)

(58) Field of Classification Search
CPC ............ H04B 10/0773; H04B 10/0793; H04B 10/613; H04B 10/504; H04B 10/503; H04B 10/548; H04B 10/61; H04B 10/69; H04B 10/60; H04Q 11/0005; H04Q 11/0067; H04Q 2011/0015; H04Q 2011/0035; H04Q 2011/0079; H04J 15/00; H04J 14/005; H04J 14/08; H04J 14/0298; H04L 1/0045; H04L 1/0041; H04L 1/0071; H04L 5/001
See application file for complete search history.

(56) References Cited

U.S. PATENT DOCUMENTS

| | | | |
|---|---|---|---|
| 5,153,762 A | 10/1992 | Huber | |
| 5,208,692 A | 5/1993 | McMahon | |
| 5,596,436 A | 1/1997 | Sargis | |
| 5,822,094 A | 10/1998 | O'Sullivan | |
| 5,825,857 A | 10/1998 | Reto | |
| 6,046,838 A | 4/2000 | Kou | |
| 6,362,913 B2 | 3/2002 | Ooi et al. | |
| 6,525,857 B1 | 2/2003 | Way | |
| 6,563,880 B1 | 5/2003 | Hunsinger et al. | |
| 6,580,544 B1 | 6/2003 | Lin et al. | |
| 6,687,044 B2 | 2/2004 | Paquet | |
| 7,076,168 B1* | 7/2006 | Shattil | H04B 10/25752 398/202 |
| 7,266,306 B1 | 9/2007 | Harley et al. | |
| 7,466,919 B1 | 2/2008 | Birk et al. | |
| 7,346,284 B2 | 3/2008 | Wan | |
| 7,376,358 B2 | 5/2008 | Roberts et al. | |
| 7,447,436 B2 | 11/2008 | Yee | |
| 7,701,842 B2 | 4/2010 | Roberts et al. | |
| 7,715,710 B2 | 5/2010 | Wan | |
| 7,729,621 B2 | 6/2010 | Nahapetian et al. | |
| 7,756,421 B2 | 7/2010 | Roberts | |
| 7,826,752 B1 | 11/2010 | Zanoni | |
| 8,184,992 B2 | 5/2012 | Kikuchi | |
| 8,203,777 B2 | 6/2012 | Smith et al. | |
| 8,412,047 B2 | 4/2013 | Tanaka | |
| 8,437,645 B2 | 5/2013 | Boffi et al. | |
| 8,472,810 B2 | 6/2013 | Akiyama | |
| 8,477,056 B2 | 7/2013 | Sun et al. | |
| 8,477,656 B2 | 7/2013 | O'Mahony | |
| 8,478,137 B2 | 7/2013 | Komaki et al. | |
| 8,655,190 B2 | 2/2014 | Wu et al. | |
| 8,682,180 B1 | 3/2014 | Nimon et al. | |
| 8,730,079 B2 | 5/2014 | Tudose | |
| 8,768,177 B2 | 7/2014 | Wu et al. | |
| 8,861,977 B2 | 10/2014 | McNicol | |
| 8,929,750 B2 | 1/2015 | Ishihara | |
| 8,965,203 B1 | 2/2015 | Vahdat | |
| 8,971,723 B2 | 3/2015 | Le Taillandier De Gabory et al. | |
| 8,989,593 B2 | 3/2015 | Sun et al. | |
| 9,020,363 B2 | 4/2015 | Yasuda | |
| 9,048,957 B2 | 6/2015 | Nakashima | |
| 9,112,609 B2 | 8/2015 | Kim et al. | |
| 9,154,231 B2 | 10/2015 | Kaneda | |
| 9,166,692 B1 | 10/2015 | Felderman | |
| 9,197,320 B2 | 11/2015 | Vassilieva | |
| 9,244,928 B1 | 1/2016 | Hiroshi | |
| 9,270,379 B2 | 2/2016 | Huang et al. | |
| 9,281,915 B2 | 3/2016 | Kaneda | |
| 9,363,585 B2 | 6/2016 | Carpini | |
| 9,419,720 B2 | 8/2016 | Akiyama | |
| 9,461,749 B2 | 10/2016 | Jansen et al. | |
| 9,485,554 B1 | 11/2016 | Kim | |
| 9,553,675 B2 | 1/2017 | Karar et al. | |
| 9,608,866 B2 | 3/2017 | Nagarajan | |
| 9,673,907 B1 | 6/2017 | Vassilieva | |
| 9,686,020 B2 | 6/2017 | Mochizuki et al. | |
| 9,705,592 B1 | 7/2017 | Schmogrow | |
| 9,712,273 B2* | 7/2017 | Yu | H04B 10/11 |
| 9,735,881 B1 | 8/2017 | Agazzi et al. | |
| 9,991,953 B1 | 6/2018 | Fludger | |
| 10,014,975 B2 | 7/2018 | Krause et al. | |
| 10,027,424 B2 | 7/2018 | Zhuge et al. | |
| 10,243,653 B2 | 3/2019 | Wiswell | |
| 10,243,688 B2 | 3/2019 | Vassilieva | |
| 10,320,486 B1* | 6/2019 | Kojima | H04L 27/36 |
| 10,348,410 B1 | 7/2019 | Charlton | |
| 10,374,623 B1 | 8/2019 | Oveis Gharan | |
| 10,374,721 B2 | 8/2019 | Awdalla Ahmed | |
| 10,389,447 B1 | 8/2019 | Khandani | |
| 10,397,190 B2 | 8/2019 | Akhavain Mohammadi et al. | |
| 10,491,302 B1 | 11/2019 | Morris | |
| 10,523,315 B2 | 12/2019 | Jiang | |
| 10,547,388 B2 | 1/2020 | Ikeda | |
| 10,574,362 B2 | 2/2020 | Chen | |
| 10,587,358 B1 | 3/2020 | Ebrahimzad | |
| 2002/0003641 A1 | 1/2002 | Hall | |
| 2002/0005971 A1 | 1/2002 | Sasai | |
| 2002/0034194 A1 | 3/2002 | Shattil | |
| 2002/0067883 A1 | 6/2002 | Lo | |
| 2002/0114038 A1 | 8/2002 | Arnon | |
| 2002/0122518 A1 | 9/2002 | Yasuda et al. | |
| 2002/0145783 A1 | 10/2002 | Chang | |
| 2003/0020995 A1 | 1/2003 | Harasawa | |
| 2003/0223751 A1 | 12/2003 | Shimizu | |
| 2004/0016874 A1 | 1/2004 | Rao | |
| 2004/0019459 A1 | 1/2004 | Dietz | |
| 2004/0032643 A1 | 2/2004 | Chimfwembe | |
| 2004/0033074 A1 | 2/2004 | Hsu | |
| 2004/0105682 A1 | 6/2004 | Roberts | |
| 2004/0151109 A1 | 8/2004 | Batra | |
| 2004/0197103 A1 | 10/2004 | Roberts | |
| 2004/0198265 A1 | 10/2004 | Wallace | |

(56) References Cited

U.S. PATENT DOCUMENTS

| | | |
|---|---|---|
| 2004/0208614 A1 | 10/2004 | Price |
| 2004/0223763 A1* | 11/2004 | Lee ................. H04J 14/0246 398/78 |
| 2004/0252996 A1 | 12/2004 | McNicol |
| 2005/0008085 A1 | 1/2005 | Lee |
| 2005/0041972 A1* | 2/2005 | Kim ................. H04L 1/0045 398/78 |
| 2005/0074037 A1 | 4/2005 | Rickard |
| 2005/0111789 A1 | 5/2005 | Hayes |
| 2005/0147415 A1 | 7/2005 | Fee |
| 2005/0169585 A1 | 8/2005 | Aronson |
| 2005/0175112 A1 | 8/2005 | Pisani |
| 2005/0175339 A1 | 8/2005 | Herskowits |
| 2006/0078336 A1 | 4/2006 | McNicol et al. |
| 2006/0093052 A1 | 5/2006 | Cho |
| 2006/0159454 A1 | 7/2006 | Bjornstad |
| 2006/0215540 A1 | 9/2006 | Krishnamoorthi |
| 2006/0222365 A1* | 10/2006 | Jung ................. H04J 14/0282 398/72 |
| 2006/0233147 A1 | 10/2006 | Karabinis |
| 2006/0269295 A1 | 11/2006 | Way |
| 2006/0280510 A1 | 12/2006 | Onaka |
| 2007/0004465 A1 | 1/2007 | Papasakellariou |
| 2007/0025421 A1 | 2/2007 | Shattil |
| 2007/0092263 A1 | 4/2007 | Agazzi |
| 2008/0063397 A1* | 3/2008 | Hu ................. H04W 88/085 398/43 |
| 2008/0063409 A1 | 3/2008 | Toliver |
| 2008/0085125 A1 | 4/2008 | Frankel |
| 2008/0232816 A1 | 9/2008 | Hoshida |
| 2008/0267630 A1 | 10/2008 | Qian |
| 2009/0110033 A1 | 4/2009 | Shattil |
| 2009/0154336 A1 | 6/2009 | Green |
| 2009/0190929 A1 | 7/2009 | Khurgin |
| 2009/0196603 A1 | 8/2009 | Zhou |
| 2009/0214224 A1 | 8/2009 | Cho |
| 2009/0232234 A1 | 9/2009 | Du |
| 2009/0238578 A1 | 9/2009 | Taylor |
| 2009/0238580 A1 | 9/2009 | Kikuchi |
| 2009/0257344 A1 | 10/2009 | Huang |
| 2009/0257755 A1 | 10/2009 | Buelow |
| 2009/0092389 A1 | 11/2009 | Wei |
| 2010/0021163 A1 | 1/2010 | Shieh |
| 2010/0021166 A1 | 1/2010 | Way |
| 2010/0028002 A1 | 2/2010 | Qian |
| 2010/0086303 A1 | 4/2010 | Qian |
| 2010/0142964 A1 | 6/2010 | Chang et al. |
| 2010/0142967 A1 | 6/2010 | Perez |
| 2010/0178057 A1 | 7/2010 | Shieh |
| 2010/0189445 A1 | 7/2010 | Nakashima |
| 2010/0215368 A1 | 8/2010 | Qian |
| 2010/0246581 A1 | 9/2010 | Henry |
| 2010/0254707 A1 | 10/2010 | Peng |
| 2010/0329671 A1 | 12/2010 | Essiambre |
| 2010/0329683 A1 | 12/2010 | Liu |
| 2011/0097092 A1 | 4/2011 | Wagner et al. |
| 2011/0135301 A1 | 6/2011 | Myslinski |
| 2011/0142450 A1 | 6/2011 | Tanzi et al. |
| 2011/0150475 A1 | 6/2011 | Soto et al. |
| 2011/0176813 A1 | 7/2011 | Kim |
| 2011/0182577 A1 | 7/2011 | Wu |
| 2011/0249978 A1 | 10/2011 | Sasaki |
| 2011/0255870 A1 | 10/2011 | Grigoryan |
| 2012/0002703 A1 | 1/2012 | Yamashita |
| 2012/0033965 A1 | 2/2012 | Zhang |
| 2012/0045209 A1 | 2/2012 | Boyd |
| 2012/0082466 A1 | 4/2012 | Wu |
| 2012/0093510 A1 | 4/2012 | Zhang |
| 2012/0099864 A1 | 4/2012 | Ishihara |
| 2012/0141130 A1 | 6/2012 | Nakashima |
| 2012/0141135 A1 | 6/2012 | Yang |
| 2012/0148264 A1 | 6/2012 | Liu |
| 2012/0219285 A1 | 8/2012 | Dahan |
| 2012/0251119 A1 | 10/2012 | McNicol |
| 2012/0251121 A1 | 10/2012 | McNicol |
| 2012/0263471 A1 | 10/2012 | Buchali |
| 2012/0269510 A1* | 10/2012 | Hui ................. H04L 27/2697 398/50 |
| 2012/0269515 A1 | 10/2012 | Cvijetic |
| 2013/0070785 A1 | 3/2013 | Liu |
| 2013/0070786 A1 | 3/2013 | Liu |
| 2013/0101296 A1 | 4/2013 | Nishimoto |
| 2013/0108271 A1 | 5/2013 | Tang et al. |
| 2013/0136449 A1 | 5/2013 | Liu |
| 2013/0170834 A1* | 7/2013 | Cho ................. H04J 14/0282 398/58 |
| 2013/0191877 A1 | 7/2013 | Rakib |
| 2013/0195452 A1* | 8/2013 | Hui ................. H04Q 11/0005 398/50 |
| 2013/0202303 A1 | 8/2013 | Wilkinson |
| 2013/0251364 A1 | 9/2013 | Pachnicke |
| 2013/0286847 A1 | 10/2013 | Schmidt |
| 2014/0010543 A1 | 1/2014 | Lee |
| 2014/0056371 A1 | 2/2014 | Ji |
| 2014/0072303 A1 | 3/2014 | Pfau |
| 2014/0079390 A1 | 3/2014 | Kim |
| 2014/0079391 A1 | 3/2014 | Kim |
| 2014/0092924 A1 | 4/2014 | Krause et al. |
| 2014/0099116 A1 | 4/2014 | Bai |
| 2014/0126916 A1 | 5/2014 | Ota |
| 2014/0153925 A1 | 6/2014 | Nishihara et al. |
| 2014/0205286 A1 | 7/2014 | Ji et al. |
| 2014/0233963 A1 | 8/2014 | Le Taillandier De Gabory |
| 2014/0241727 A1 | 8/2014 | Lim et al. |
| 2014/0270759 A1 | 9/2014 | Djordjevic |
| 2014/0270761 A1 | 9/2014 | Xu |
| 2014/0270803 A1 | 9/2014 | Olsson |
| 2014/0294381 A1 | 10/2014 | McNicol |
| 2014/0314411 A1 | 10/2014 | Huang |
| 2014/0314416 A1 | 10/2014 | Vassilieva |
| 2014/0341587 A1 | 11/2014 | Nakashima |
| 2014/0363164 A1 | 12/2014 | Kim |
| 2014/0376930 A1 | 12/2014 | Shiba |
| 2015/0029990 A1* | 1/2015 | Marinier ................. H04B 7/0632 370/329 |
| 2015/0063808 A1 | 3/2015 | Xia |
| 2015/0071642 A1 | 3/2015 | Tanaka |
| 2015/0093118 A1 | 4/2015 | Jia |
| 2015/0098700 A1 | 4/2015 | Zhu |
| 2015/0117860 A1 | 4/2015 | Braun |
| 2015/0125160 A1 | 5/2015 | Wen |
| 2015/0188637 A1* | 7/2015 | Tanimura ................. H04B 10/532 398/184 |
| 2015/0188642 A1 | 7/2015 | Sun |
| 2015/0229332 A1 | 8/2015 | Yuan |
| 2015/0229401 A1 | 8/2015 | Tanaka |
| 2015/0280853 A1 | 10/2015 | Sun |
| 2015/0288456 A1 | 10/2015 | Zhu |
| 2015/0289035 A1 | 10/2015 | Mehrvar |
| 2015/0296278 A1 | 10/2015 | Liu |
| 2015/0333860 A1 | 11/2015 | Rahn |
| 2015/0333865 A1* | 11/2015 | Yu ................. H04B 10/11 398/44 |
| 2016/0013881 A1 | 1/2016 | Rejaly et al. |
| 2016/0029403 A1 | 1/2016 | Roy et al. |
| 2016/0050021 A1 | 2/2016 | Hua |
| 2016/0057516 A1 | 2/2016 | Hochberg |
| 2016/0065325 A1* | 3/2016 | Cavaliere ................. H04J 14/0223 398/65 |
| 2016/0094292 A1 | 3/2016 | Mochizuki |
| 2016/0099777 A1 | 4/2016 | Liu |
| 2016/0112141 A1 | 4/2016 | Rahn |
| 2016/0142150 A1 | 5/2016 | Lyubomirsky |
| 2016/0191168 A1 | 6/2016 | Huang |
| 2016/0191218 A1* | 6/2016 | Bala ................. H04L 5/0044 370/203 |
| 2016/0192042 A1 | 6/2016 | Mitchell |
| 2016/0197681 A1 | 7/2016 | Sun |
| 2016/0218812 A1 | 7/2016 | Okabe |
| 2016/0233963 A1 | 8/2016 | Zhuge et al. |
| 2016/0261347 A1 | 9/2016 | Karar |
| 2016/0277816 A1 | 9/2016 | Yuang |
| 2016/0316281 A1 | 10/2016 | Keyworth |

(56) References Cited

U.S. PATENT DOCUMENTS

| | | |
|---|---|---|
| 2016/0323039 A1 | 11/2016 | Sun et al. |
| 2017/0005747 A1 | 1/2017 | Kim |
| 2017/0019168 A1 | 1/2017 | Menard |
| 2017/0033864 A1 | 2/2017 | Nagarajan |
| 2017/0033999 A1 | 2/2017 | Nagarajan |
| 2017/0041691 A1 | 2/2017 | Rickman |
| 2017/0054513 A1 | 2/2017 | Guo |
| 2017/0070313 A1 | 3/2017 | Kato |
| 2017/0078028 A1 | 3/2017 | Zhang |
| 2017/0078044 A1 | 3/2017 | Hino |
| 2017/0104535 A1 | 4/2017 | Hoshida |
| 2017/0134836 A1 | 5/2017 | Sindhy |
| 2017/0149507 A1 | 5/2017 | Le Taillandier De Gabory |
| 2017/0163347 A1 | 6/2017 | Akiyama |
| 2017/0163371 A1* | 6/2017 | Hino ............... H04J 14/02 |
| 2017/0222716 A1 | 8/2017 | Nakashima |
| 2017/0222719 A1* | 8/2017 | Haas ............... H04B 10/60 |
| 2017/0237500 A1 | 8/2017 | Nishimoto |
| 2017/0250775 A1 | 8/2017 | Kato |
| 2017/0324480 A1 | 11/2017 | Elmirghani |
| 2017/0324496 A1* | 11/2017 | Yamada ............ H04J 3/0623 |
| 2017/0366267 A1 | 12/2017 | Campos |
| 2017/0367061 A1 | 12/2017 | Kim |
| 2018/0034555 A1 | 2/2018 | Goh |
| 2018/0115407 A1 | 4/2018 | Melikyan |
| 2018/0120520 A1 | 5/2018 | Kelly |
| 2018/0145761 A1 | 5/2018 | Zhuge |
| 2018/0198547 A1 | 7/2018 | Mehrvar |
| 2018/0219632 A1 | 8/2018 | Yoshida |
| 2018/0234285 A1 | 8/2018 | Djordjevic |
| 2018/0241476 A1 | 8/2018 | Johnson |
| 2018/0278331 A1 | 9/2018 | Cao |
| 2018/0324717 A1 | 11/2018 | Zhou |
| 2018/0359047 A1* | 12/2018 | Vassilieva ......... H04J 14/0298 |
| 2019/0020409 A1 | 1/2019 | Le Taillandier De Gabory |
| 2019/0097728 A1 | 3/2019 | Frankel |
| 2019/0123819 A1 | 4/2019 | Jiang |
| 2019/0149242 A1 | 5/2019 | Torbatian |
| 2019/0149389 A1 | 5/2019 | Torbatian |
| 2019/0253153 A1 | 8/2019 | Sun |
| 2019/0260493 A1 | 8/2019 | Chimfwembe |
| 2019/0288777 A1 | 9/2019 | Ishimura |
| 2019/0312640 A1 | 10/2019 | Binkai |
| 2020/0014418 A1* | 1/2020 | Yu .............. H04B 10/6161 |
| 2020/0076508 A1 | 3/2020 | Jia |
| 2020/0177525 A1 | 6/2020 | Morris |
| 2020/0287621 A1* | 9/2020 | Jafari ............... H04J 14/005 |
| 2020/0287648 A1* | 9/2020 | Jafari ............... H04B 10/69 |
| 2020/0287649 A1* | 9/2020 | Jafari ............... H04B 10/0793 |
| 2020/0287651 A1* | 9/2020 | Jafari ............... H04B 10/0773 |
| 2020/0382216 A1* | 12/2020 | Rahn ............... H04B 10/504 |
| 2020/0403702 A1* | 12/2020 | Rahn ............... H04B 10/40 |
| 2020/0403704 A1* | 12/2020 | Rahn ............... H04L 1/0071 |
| 2020/0413169 A1* | 12/2020 | Rahn ............... H04B 10/61 |
| 2021/0091876 A1* | 3/2021 | Rahn ............... H04J 14/0204 |
| 2021/0211201 A9* | 7/2021 | Rahn ............... H04J 14/0272 |

FOREIGN PATENT DOCUMENTS

| | | | |
|---|---|---|---|
| WO | WO 2012100714 | 8/2012 | |
| WO | WO 2014114332 | 7/2014 | |
| WO | WO-2020181005 A1 * | 9/2020 | ............ H04L 5/001 |

OTHER PUBLICATIONS

"Reduction of Optical Beat Noise in Optical Sampled Subcarrier Multiplexing Systems Using Polarization Interleaved-OTDM technology"; Ho et al.; 2008 IEEE PhotonicsGlobal@Singapore (Year: 2008).*

"Performance Comparison of Single-Sideband Direct Detection Nyquist-Subcarrier Modulation and OFDM"; Erkilinc et al.; Journal of Lightwave Technology, vol. 33, No. 10, May 15, 2015 (Year: 2015).*

International search report for PCT/US2020/021024; dated Sep. 10, 2020 (Year: 2020).*

J. Leuthold et al., "Super Channels Based on Nyquist Multiplexing," 2012 17th Opto-Electronics and Communications Conference (OECC 2012) Technical Digest, Jul. 2012, Busan, Kor.

S. Watanabe et al., "Optical Coherent Broad-Band Transmission for Long-Haul and Distribution Systems Using Subcarrier Multiplexing," Journal of Lightwave Technology, vol. 11, No. 1, Jan. 1993, pp. 116-127.

M. Jinno et al., "Demonstration of Novel Spectrum-Efficient Elastic Optical Path Network with Per-Channel Variable Capacity of 40 Gb/s to Over 400 Gb/s," ECOC 2008, Sep. 21-25, 2008, Brussels, Belgium, Th.3.F.6.

Y. Chen Et Al., "Experimental Demonstration of Roadm Functionality on an Optical Scfdm Superchannel," IEEE Photonics Technology Letters, vol. 24, No. 3, Feb. 1, 2012, pp. 215-217.

Adaptive Software Defined Terabit Transceiver for Flexible Optical Networks, Public executive summary of the Final Project Periodic Report, Jun. 16, 2016.

Hillerkus, Single-Laser Multi-Terabit/s Systems, KIT Scientific Publishing, 2013, Chapters 1, 3, and 6.

Hu et al., "Flexible and Concurrent All-Optical VPN in OFDMA PON," IEEE Photonics Technology Journal, vol. 5, No. 6, Dec. 2013.

Bosco et al., "On the Performance of Nyquist-WDM Terabit Superchannels Based on PM-BPSK, PM-QPSK, PM-8QAM or PM-16QAM Subcarriers," Journal of Lightwave Technology, vol. 29, No. 1, Jan. 1, 2011, pp. 53-60.

K. Roberts et al., "Flexible Transceivers," ECOC Technical Digest, 2012, We.3.A.3.

K. Roberts et al., "High Capacity Transport—100G and Beyond," Journal of Lightwave Technology, vol. 33, No. 3, Feb. 1, 2015, pp. 563-578.

J. Reis et al., "Performance Optimization of Nyquist Signaling for Spectrally Efficient Optical Access Networks [Invited]," J. Opt. Commun. Netw./vol. 7, No. 2, Feb. 2015, pp. A200-A208.

R. Ferreira et al, Coherent Nyquist UDWDM-PON With Digital Signal Processing in Real Time, Journal of Lightwave Technology, vol. 34, No. 2, Jan. 15, 2016, pp. 826-833.

A. Shahpari et al., "Coherent Access: A Review", Journal of Lightwave Technology, vol. 35, No. 4, Feb. 15, 2017, pp. 1050-1058.

P. Layec et al., "Rate-Adaptable Optical Transmission and Elastic Optical Networks," Chapter 15, Enabling Technologies for High Spectral-efficiency Coherent Optical Communication Networks, First Edition, 2016 John Wiley & Sons, Inc. Published 2016, pp. 507-545.

J. Altabas, "Cost-effective Transceiver based on a RSOA and a VCSEL for Flexible uDWDM Networks," IEEE Photonics Technology Letters ( vol. 28 , Issue: 10, May 15, 2016, pp. 1111-1114.

K. Roberts et al., "Beyond 100 Gb/s: Capacity, Flexibility, and Network Optimization," J. Opt. Commun. Netw./vol. 9, No. 4/Apr. 2017, pp. C12-C24.

Lavery et al., "Digital Coherent Receivers for Long-Reach Optical Access Networks," Journal of Lightwave Technology, vol. 31, No. 4, Feb. 15, 2013, pp. 609-620.

V. Vujicic, "Optical Multicarrier Sources for Spectrally Efficient Optical Networks," A Dissertation submitted in fulfilment of the requirements for the award of Doctor of Philosophy (Ph.D.) to the Dublin City University, Dec. 2015, Chapters 1, 2, and 6.

Straullu et al., "Single-Wavelength Downstream FDMA-PON at 32 Gbps and 34 dB ODN Loss," IEEE Photonics Technology Letters, vol. 27, No. 7, Apr. 1, 2015, pp. 774-777.

Y. Zhang et al., "Digital subcarrier multiplexing for flexible spectral allocation in optical transport network," Oct. 24, 2011 / vol. 19, No. 22 / Optics Express 21882.

R. Schmogrow et al., "Nyquist Frequency Division Multiplexing for Optical Communications," CLEO Technical Digest, OSA 2012, CTh1H.2.

P Khodashenas. "Investigation of Spectrum Granularity for Performance Optimization of Flexible Nyquist-WDM-Based Optical Networks." Journal of Lightwave Technology, vol. 33, No. 23, Dec. 1, 2015 pp. 4767-4774.

(56) References Cited

OTHER PUBLICATIONS

Mishra et al., "Flexible RF-Based Comb Generator," IEEE Photonics Technology Letters, vol. 25, No. 7, Apr. 1, 2013, pp. 701-704.
M. Jinno et al., "Multiflow Optical Transponder for Efficient Multilayer Optical Networking," IEEE Communications Magazine • May 2012, pp. 56-65.
Kim Roberts, "100G and Beyond," OFC 2014, OSA 2014, Tu3J.1.
J. Fischer, "Digital signal processing for coherent UDWDM passive optical networks," ITG-Fachbericht 248: Photonische.
Netze 05.-06.05.2014 in Leipzig, VDE Verlag GMBH ∎ Berlin ∎ Offenbach, Germany, ISBN 978-3-8007-3604-1.
Kottke et al., "Coherent UDWDM PON with joint subcarrier reception at OLT," Optics Express, Jul. 2, 2014.
Lavery et al., "Reduced Complexity Equalization for Coherent Long-Reach Passive Optical Networks," J. Opt. Commun. Netw./vol. 7, No. 1/Jan. 2015, pp. A16-A27.
Lazaro et al., "Flexible PON Key Technologies: Digital Advanced Modulation Formats and Devices," 2014 16th International Conference on Transparent Optical Networks (ICTON), Tu.B3.2.
Optical Internetworking Forum—Technology Options for 400G Implementation OIF-Tech-Options-400G-01.0, Jul. 2015.
Riccardi et al., "Sliceable bandwidth variable transponder: the Idealist vision," 2015 European Conference on Networks and Communications (EuCNC), pp. 330-334.
Sambo et al., "Next Generation Sliceable Bandwidth Variable Transponders," IEEE Communications Magazine, Feb. 2015, pp. 163-171.
P. Schindler et al., "Colorless FDMA-PON With Flexible Bandwidth Allocation and Colorless, Low-Speed ONUs [Invited]," J. Opt. Commun. Netw./vol. 5, No. 10/Oct. 2013, pp. A204-A212.
Schmogrow et al., "Real-time Nyquist signaling with dynamic precision and flexible non-integer oversampling," Jan. 13, 2014 | vol. 22, No. 1 | DOI:10.1364/OE.22.000193 | Optics Express 193.
Schmogrow et al., "Real-Time Digital Nyquist-WDM and OFDM Signal Generation: Spectral Efficiency Versus DSP Complexity," ECOC Technical Digest, 2012 OSA, Mo.2.A.4.
Boutaba et al., "Elastic Optical Networking for 5G Transport," J Netw Syst Manage (2017) 25m pp. 819-847 123.
S. Smolorz et al., "Demonstration of a Coherent UDWDM-PON with Real-Time Processing," OFC/NFOEC 2011, PDPD4.
H. Rohde et al. "Coherent Ultra Dense WDM Technology for Next Generation Optical Metro and Access Networks," Journal of Lightwave Technology, vol. 32, No. 10, May 15, 2014 pp. 2041-2052.
Ze Dong et al., "Very-High-Throughput Coherent Ultradense WDM-PON Based on Nyquist-ISB Modulation," IEEE Photonics Technology Letters, vol. 27, No. 7, Apr. 1, 2015, pp. 763-766.
Rohde et al., "Digital Multi-Wavelength Generation and Real Time Video Transmission in a Coherent Ultra Dense WDM PON," OFC/NFOEC Technical Digest, 2013 OSA, OM3H.3.
International Search Report issued in connection with PCT/US2020/023871 dated Sep. 24, 2020.
Guo-Wei Lu et al., "Optical subcarrier processing for Nyquist SCM signals via coherent spectrum overlapping in four-wave mixing with coherent multi-tone pump", Optics Express, vol. 26, No. 2, Jan. 22, 2018.
International Search Report issued in connection with PCT/US2020/018180 dated Sep. 18, 2020.
International Search Report issued in connection with PCT/US2020/036209 dated Oct. 1, 2020.
International Search Report issued in connection with PCT/US2020/018292 dated Jun. 4, 2020.
International Search Report issued in connection with PCT/US2020/021024 dated Aug. 3, 2020.
Wei et al: Mac Protocols for Optical Orthogonal Frequency Division Multiple Access (OFDMA)-based Passive Optical Networks, OFC/NFOEC 2008, paper JWA82, Feb. 24-28, 2008 (Year: 2008).
Cerisola et al., "Subcarrier multiplex of packet headers in a WDM optical network and a nouvel ultrafast header clock-recovery technique", 1995, OFC '95 Technical Digest, pp. 273-274 (Year: 1995).
Michael G. Taylor, "Coherent Detection Method Using DSP for Demodulation of Signal and Subsequent Equalization of Propagation Impairments," IEEE Photonics Technology Letters, vol. 16, No. 2, Feb. 2004, pp. 674-676.
K. Roberts, et al., "Performance of dual-polarization QPSK for optical transport system," JLT, vol. 27, No. 16, pp. 3546-3559, Aug. 2009.
S.J. Savory et al., "Digital equalisation of 40Gbit/s per wavelength transmission over 2480km of standard fibre without optical dispersion compensation," European Conference on Optical Communications (ECOC) 2006, paper Th2.5.5.
H. Sun et al., "Real-time measurements of a 40 Gb/S coherent system," Jan. 21, 2008, vol. 16, No. 2, Optics Express, pp. 873-879.
Greshishchev et al., "A 56GS/s 6b DAC in 65nm CMOS with 256×6b Memory", ISSCC 2011/Session 1 0/Nyquist-Rate Converters/1 0.8, 2011 IEEE International Solid-State Circuits Conference, 3 pages.
Yan et al. "Experimental Comparison of No-Guard-Interval-OFDM and Nyquist-WDM Superchannels", OFC/NFOEC Techincal Digest, Jan. 23, 2012; 4 pages.
Zhuge et al., "Comparison of Intra-Channel Nonlinearity Tolerance Between Reduced-Guard-Interval CO-OFDM Systems and Nyquist Single Carrier Systems", OFC/NFOEC Technical Digest, Jan. 23, 2012, 4 pages.
Zhang et al., "3760km, 100G SSMF Transmission over Commercial Terrestrial DWDM ROADM Systems using SD-FEC", OFC/NFOEC Postdeadline Papers, Mar. 2012, 3 pages.
Rahn et al., "250Gb/s Real-Time PIC-based Super-Channel Transmission Over a Gridless 6000km Terrestrial Link", OFC/NFOEC Posteadline Papers, Mar. 2012,3 pages.
Bingham, "Multicarrier Modulation for Data Transmission: An Idea Whose Time Has Come", IEEE Communications Magazine, May 1990, pp. 5-14.

* cited by examiner

Fig. 33

| ToF | ToF (μs) | ToF in # of TS | ToF Delta (μs) (Node 112-m − Node 112-x) | ToF Delta (μs) | ToF Delta in # of TS |
|---|---|---|---|---|---|
| Node 112-j | 300 | 1.5 | 1000 − 300 | 700 | 3.5 |
| Node 112-k | 500 | 2.5 | 1000 − 500 | 500 | 2.5 |
| Node 112-l | 600 | 3.0 | 1000 − 600 | 400 | 2 |
| Node 112-m | 1000 | 5.0 | 1000 − 1000 | 0 | 0 |

3302

TIME DIVISION MULTIPLE ACCESS OPTICAL SUBCARRIERS

This application claims priority under 35 U.S.C. § 119 to U.S. Provisional Patent Application No. 62/813,151, filed on Mar. 4, 2019, the entire content of which is incorporated by reference herein in its entirety.

BACKGROUND

Optical communication systems are known in which multiple optical signals, each having a corresponding wavelength, and each being modulated to carry a different data stream, are multiplexed onto an optical fiber. In such systems, a laser and a modulator may be used to generate each optical signal. Accordingly, in order to increase the capacity of such systems, additional lasers, modulators and associated circuitry are employed. The cost associated with such systems may therefore increase, as capacity is increased. Accordingly, there is a need for a more cost-effective network requiring fewer components, such as the components described above.

Moreover, conventional optical communication systems may include high speed circuitry and components to generate optical signals at a transmit end of the system. Such signals may carry data at a relatively high data rate. At a receive end, corresponding high-speed circuitry may be provided to detect the incoming data and forward or distribute such data to lower capacity nodes. Accordingly, there is a further need to reduce costs by supplying high capacity signals to less expensive lower capacity nodes without the need for intermediate high-speed circuitry and components at the receive end of the system.

In addition, in conventional optical communication systems, data may be transmitted as a series of frames, each of which including a payload portion including customer or user data, and a header or overhead portion including operation, administration, and maintenance ("OAM") information associated with the system. With increasing network complexity, the amount of such control or OAM information has increased, which may limit the amount of transmitted customer data. Therefore, there is also need to more efficiently transmit the OAM information so that more customer data may be transmitted.

Accordingly, other aspects, features and advantages will be apparent from the following detailed description, the drawings, and the claims.

SUMMARY

In one aspect, the present disclosure describes a transmitter that includes a laser operable to output an optical signal; a digital signal processor operable to receive user data and provide a plurality of electrical signals based on the data; and a modulator operable to modulate the optical signal to provide a plurality of optical subcarriers based on the plurality of electrical signals. A first one of the plurality of subcarriers carries first TDMA encoded information and second TDMA encoded information, such that the first TDMA encoded information is indicative of a first portion of the data and is carried by the first one of the plurality of subcarriers during a first time slot, and the second TDMA encoded information is indicative of a second portion of the data and is carried by the first one of the plurality of subcarriers during a second time slot. The first TDMA encoded information is associated with a first node remote from the transmitter and the second TDMA encoded information is associated with a second node remote from the transmitter. A second one of the plurality of subcarriers carries third information that is not TDMA encoded, the third information being associated with a third node remote from the transmitter.

The present disclosure also describes a system that includes a transmitter. The transmitter includes a laser operable to output an optical signal; a digital signal processor operable to receive data and provide a plurality of electrical signals based on the data; and a modulator operable to modulate the optical signal to provide a plurality of optical subcarriers based on the plurality of electrical signals. A first one of the plurality of subcarriers carries first information during a first time slot and second information during a second time slot, and a second one of the plurality of subcarriers carries third information. The system includes a first receiver provided in a first node, the first receiver receiving being optically coupled to the transmitter. A second receiver is provided in a second node, the second receiver being optical coupled to the transmitter. The first and second receivers are remote from the transmitter, such that the first information is associated with the first node and the second information is associated with a second node remote from the transmitter. A third receiver is provided in a third node, the third receiver being remote from the transmitter, such that the third information is associated with the third node.

The present disclosure also describes a receiver that includes a local oscillator laser; and an optical hybrid circuit that receives a plurality of optical subcarriers and an optical signal supplied from the local oscillator laser. The optical hybrid circuit supplies a plurality of mixing products. One of the plurality of optical subcarriers carries first information during a first time slot and second information during a second time slot, and a second one of the plurality of optical subcarriers carries third information. The first information is designated for the receiver and the second and third information are designated for another first receiver and another second receiver, respectively. The receiver also includes a photodiode circuit that receives the plurality of mixing products and outputs a plurality of electrical signals; and a digital signal processor that outputs, based on the plurality of electrical signals, data associated with the first information.

It is to be understood that both the foregoing general description and the following detailed description are exemplary and explanatory only and are not restrictive of the invention, as claimed.

The accompanying drawings, which are incorporated in and constitute a part of this specification, illustrate several embodiments and together with the description, serve to explain the principles of the invention.

Accordingly, other aspects, features and advantages will be apparent from the following detailed description, the drawings, and the claims.

BRIEF DESCRIPTION OF THE DRAWINGS

FIG. 33 shows a table with various example TOF times; and

DESCRIPTION OF THE EMBODIMENTS

Consistent the present disclosure, a network or system is provided in which a hub or primary node may communicate with a plurality of leaf or secondary nodes. The hub node may operate or have a capacity that may be greater than that of the leaf nodes. Accordingly, relatively inexpensive leaf nodes may be deployed that receive data carrying optical signals from and supply data carrying optical signals to the hub node. One or more connections may couple each leaf node to the hub node, whereby each connection may include one or more spans or segments of optical fibers, optical amplifiers, and optical add/drop multiplexer, for example. Consistent with an aspect of the present disclosure, optical subcarriers may be transmitted over such connections. The subcarriers may be generated by a combination of a laser and a modulator, such that multiple lasers and modulators are not required, and costs may be reduced. In addition, the subcarriers may be employed using multiple access techniques, such as frequency division multiplexing (FDM) and time-division multiple access (TDMA) so that the primary node can communicate with a relatively large number of secondary nodes. In addition, an out-of-band control channel may be provided to carry OAM information from the primary node to the secondary nodes, as well as from the secondary nodes to the primary nodes.

Reference will now be made in detail to the present embodiments of the present disclosure, examples of which are illustrated in the accompanying drawings. Wherever possible, the same reference numbers will be used throughout the drawings to refer to the same or like parts.

Figure 1A:
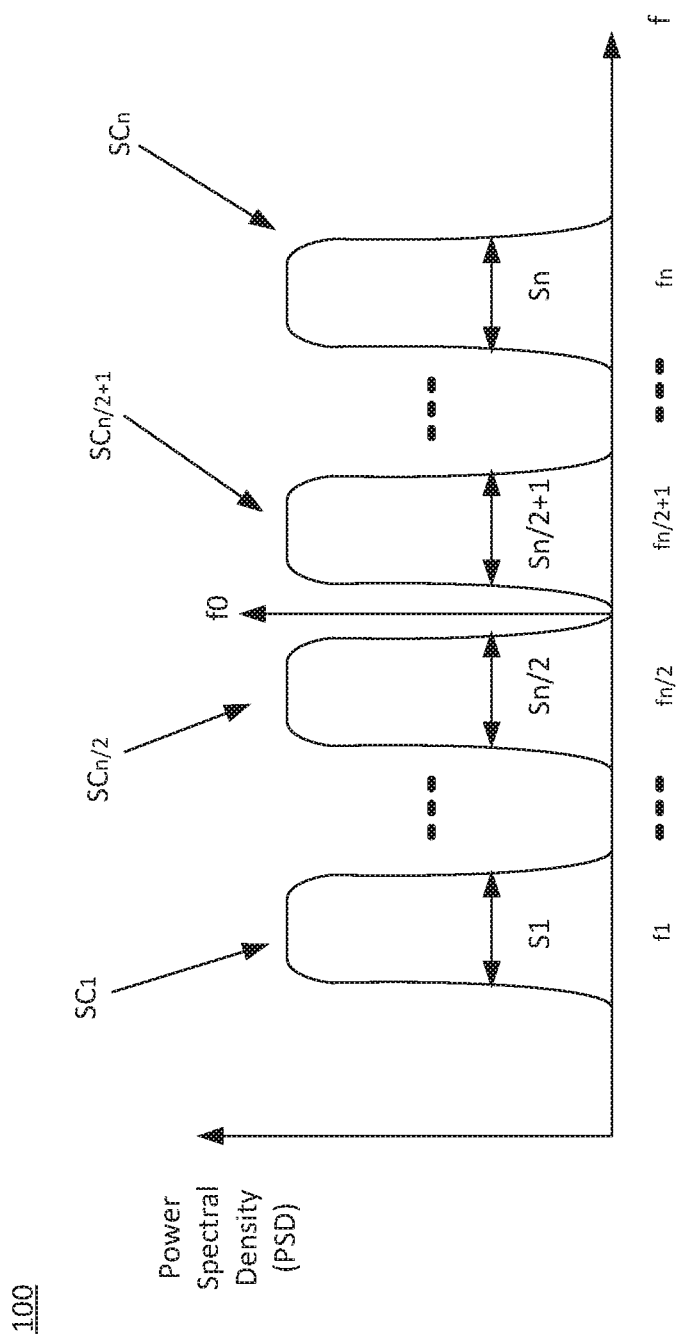
FIG. 1a illustrates a power spectral density plot showing optical subcarriers consistent with an aspect of the present disclosure.

FIG. 1a illustrates a plot 100 of power spectral density (PSD) vs. frequency consistent with the present disclosure. Plot 100 identifies a plurality of subcarriers SC1 to SCn, which may be supplied or output by a transmitter described in greater detail below. Each of subcarriers SC1 to SCn may have a corresponding one of a plurality of frequencies f1 to fn, as well as a respective one of spectral widths W1 to Wn In one example, half of the subcarriers, SC1 to SCn/2 have corresponding frequencies f1 to fn/2, which are less than a frequency f0 of a laser provided in the transmitter, and half of the subcarriers, SCn/2+1 to SCn have corresponding frequencies fn/2+1 to fn greater than f0.

Subcarriers SC1 to SCn, in one example, are Nyquist subcarriers, which are a group of optical signals, each carrying data, wherein (i) the spectrum of each such optical signal within the group is sufficiently non-overlapping such that the optical signals remain distinguishable from each other in the frequency domain, and (ii) such group of optical signals is generated by modulation of light from a single laser. In general, each subcarrier may have an optical spectral bandwidth that is at least equal to the minimum Nyquist bandwidth, as determined by the baud rate of such subcarrier.

Figure 1B:
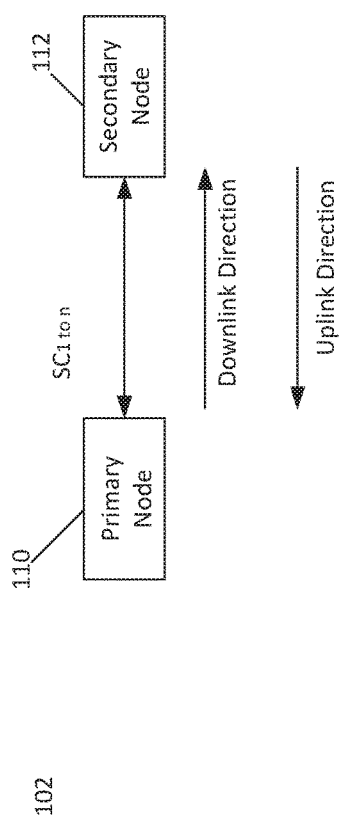
FIGS. 1b, 1c and 1d show block diagrams of networks consistent with an additional aspect of the present disclosure.
Figure 1C:
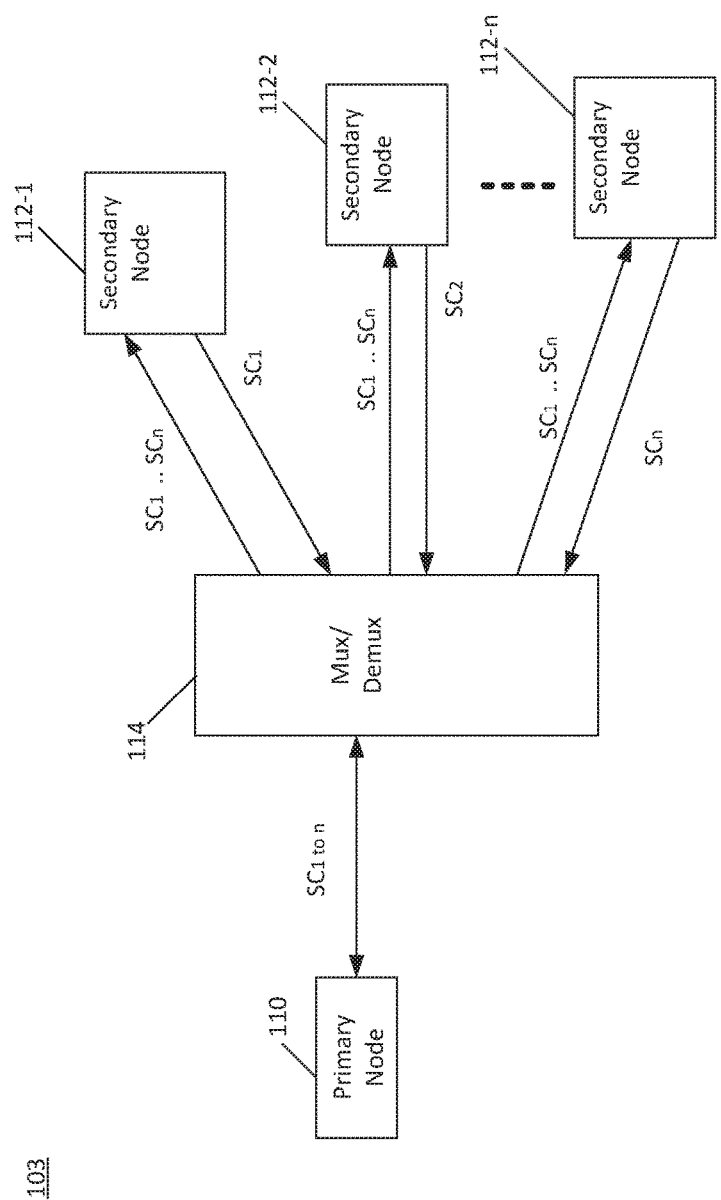
Figure 1D:
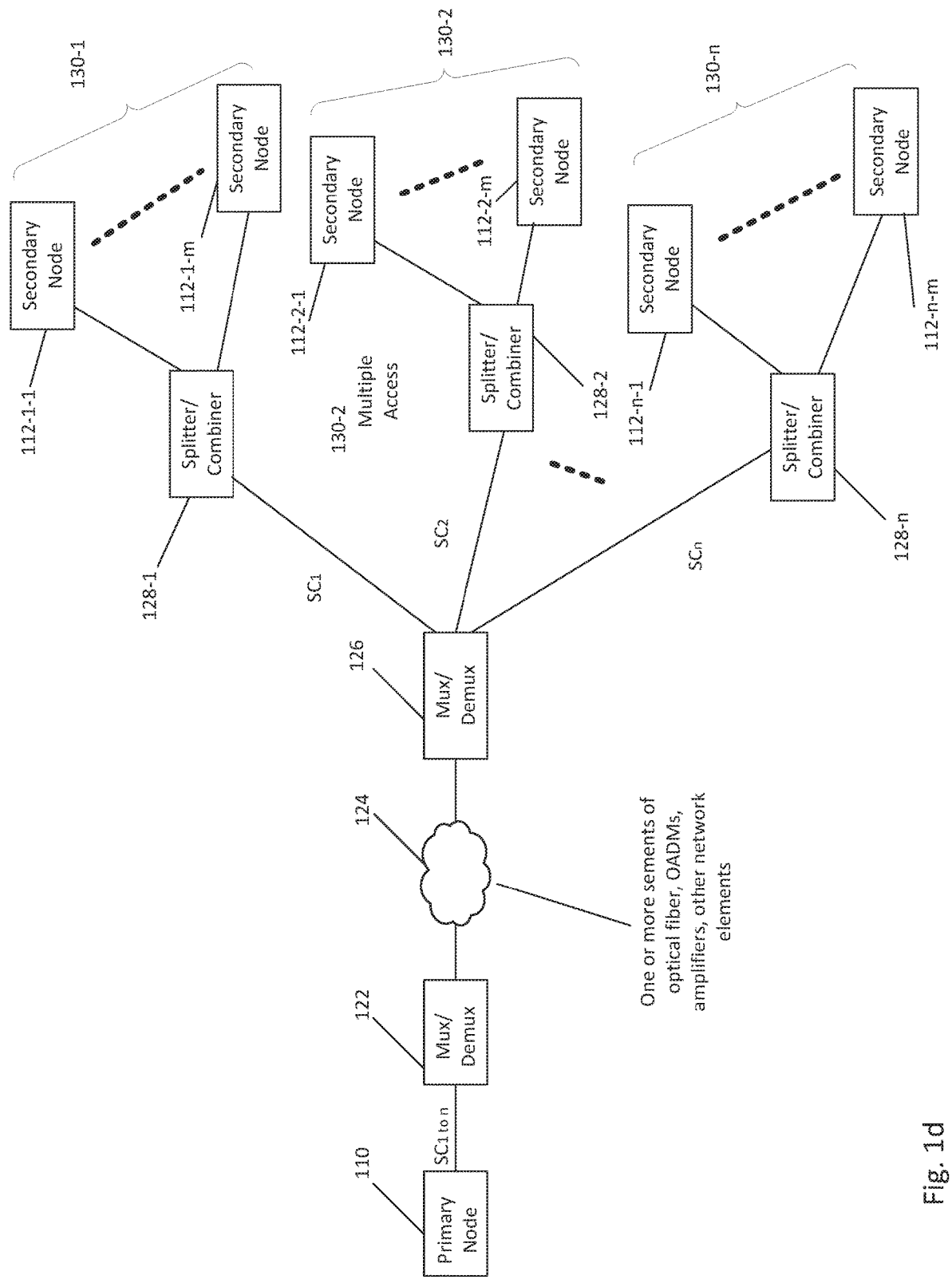

FIGS. 1b-1d illustrate examples of communication systems consistent with the present disclosure in which subcarriers SC1 to SCn may be transmitted.

FIG. 1b shows an example of connection 102, including an optical fiber link, between primary node 110 and secondary node 112. In one example, a modulated optical signal including subcarriers SC1 to SCn may be output from primary node 110 to secondary node 112 along an optical fiber link in a downlink direction. Further optical signals may be transmitted in an uplink direction from secondary node 112 to primary node 110 on the same fiber link of connection 102.

FIG. 1c shows an example of system 103 or aggregation network in which primary node 110 may communicate with multiple secondary nodes 112-1 to 112-n. System 103 may employ frequency division multiplexing (FDM) in which a modulated optical signal including subcarriers SC1 to SCn is output from primary node 110 to a multiplexer/demultiplexer (mux/demux) 114, which, in turn, supplies each subcarrier in a downlink direction to a respective on of secondary nodes 112-1 to 112-n. In addition, each of secondary nodes 112-1 to 112-n may supply a respective one of subcarriers SC1 to SCn to mux/demux 114 in an uplink direction. Mux/demux 114 may, in turn, provide a multiplexed output including the combined subcarriers SC1 to SCn to primary node 110.

Alternatively, mux/demux 114 may include a splitter/combiner to provide a power split portion of each of subcarriers SC1 to SCn may be supplied to a respective one of secondary nodes 112-1 to 112-n, and subcarriers SC1 to SCn output from secondary nodes 112-1 to 112-n may be combined by the splitter/combiner and output to primary node 110.

In addition to or in combination with FDM, multiple access techniques, such as time division multiple access (TDMA) techniques, may be employed so that data or user data intended for a particular one of secondary nodes 112-1 to 112-n may be detected at such node and output to a user. Such multiple access techniques are described in greater detail below.

FIG. 1d shows an example of an aggregation network 120, in which primary node 110 supplies a modulated optical signal including subcarriers SC1 to SCn. In this example, subcarriers SC1 to SCn may be provided to a mux/demux 122, which may combine such subcarriers with other subcarriers. Subcarriers SC1 to SCn may then be directed through one or more segments of optical fiber, optical add-drop multiplexers, amplifiers, or other network elements, collectively, network elements 124, to a further mux/demux 126 which may separate or demultiplex subcarriers SC1 to SCn and direct or supply each subcarrier to a respective one of splitters/combiners 128-1 to 128-n. Each splitter/combiner 128-1 to 128-n further supplies power split portions of a corresponding one of subcarriers SC1 to SCn to a respective secondary node group 130-1 to 130-n, each of which including m secondary nodes (112-1-1 to 112-1-m; 112-2-1 to 112-2-m; . . . 112-n-1 to 112-n-m), where n and m are integers. In one example, multiple access techniques, as discussed below, may be employed to direct data carried by a particular one of subcarriers SC1 to SCn from primary node 110 to desired secondary nodes or a node group. Further, such techniques may be employed in both uplink and downlink directions.

Figure 2:
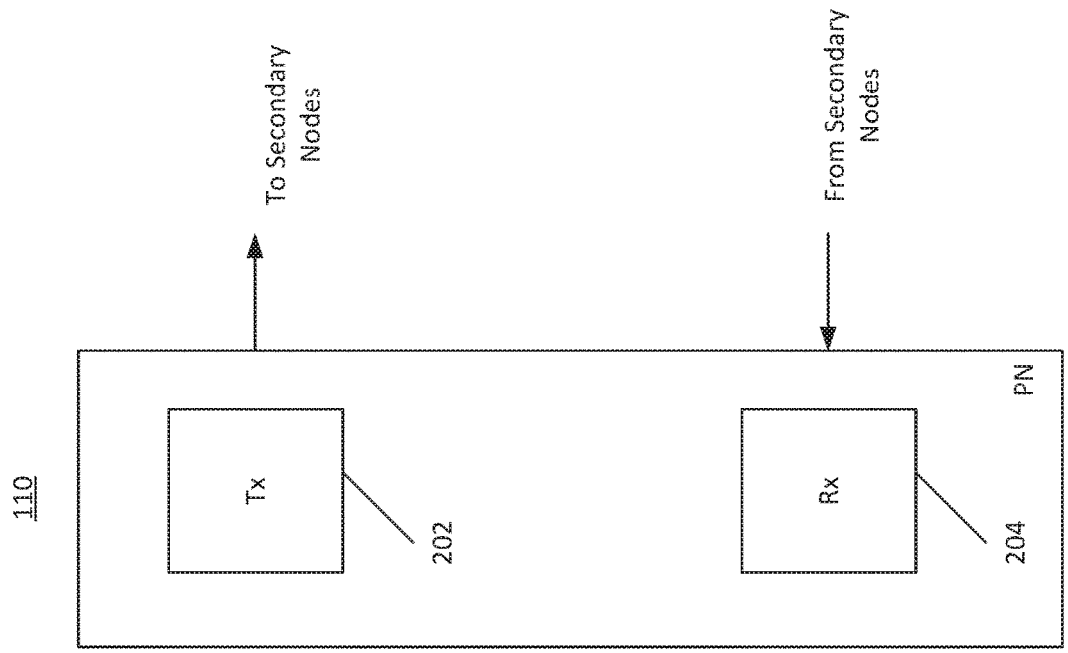

FIG. 2 illustrates primary node 110 in greater detail. Primary node 110 may include a transmitter 202 that supplies a modulated optical signal including subcarriers SC1 to SCn, and a receiver that 204 that may receive another modulated optical signal including such subcarriers, but carrying data originating from the secondary nodes, such as node 112-1 to 112-n.

Figure 3:
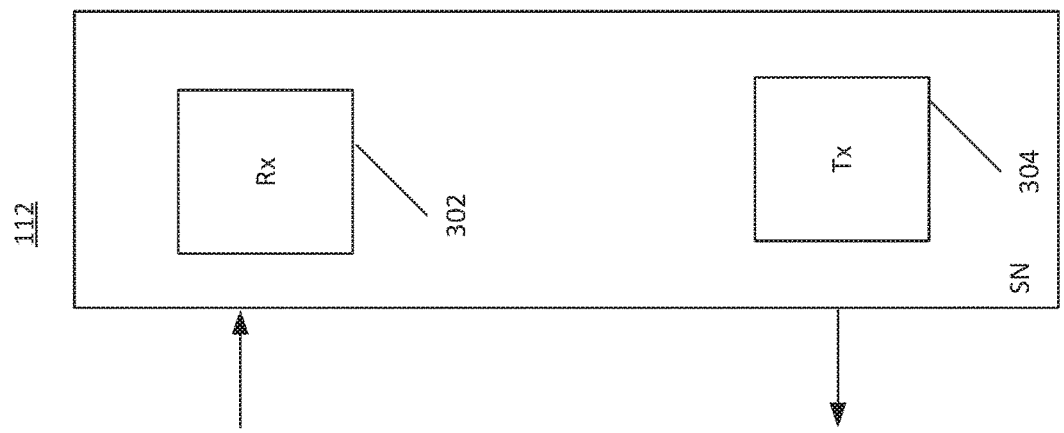
FIGS. 2 and 3 show block diagrams of a primary node and secondary node, respectively, in accordance with an additional aspect of the present disclosure.

FIG. 3 shows a block diagram of one of secondary nodes 112, which may include a receiver circuit 302 that receives one or more of the subcarriers, such as subcarrier SC1, and transmitter circuit 304 that supplies a modulated optical signal including such subcarrier.

Figure 4:
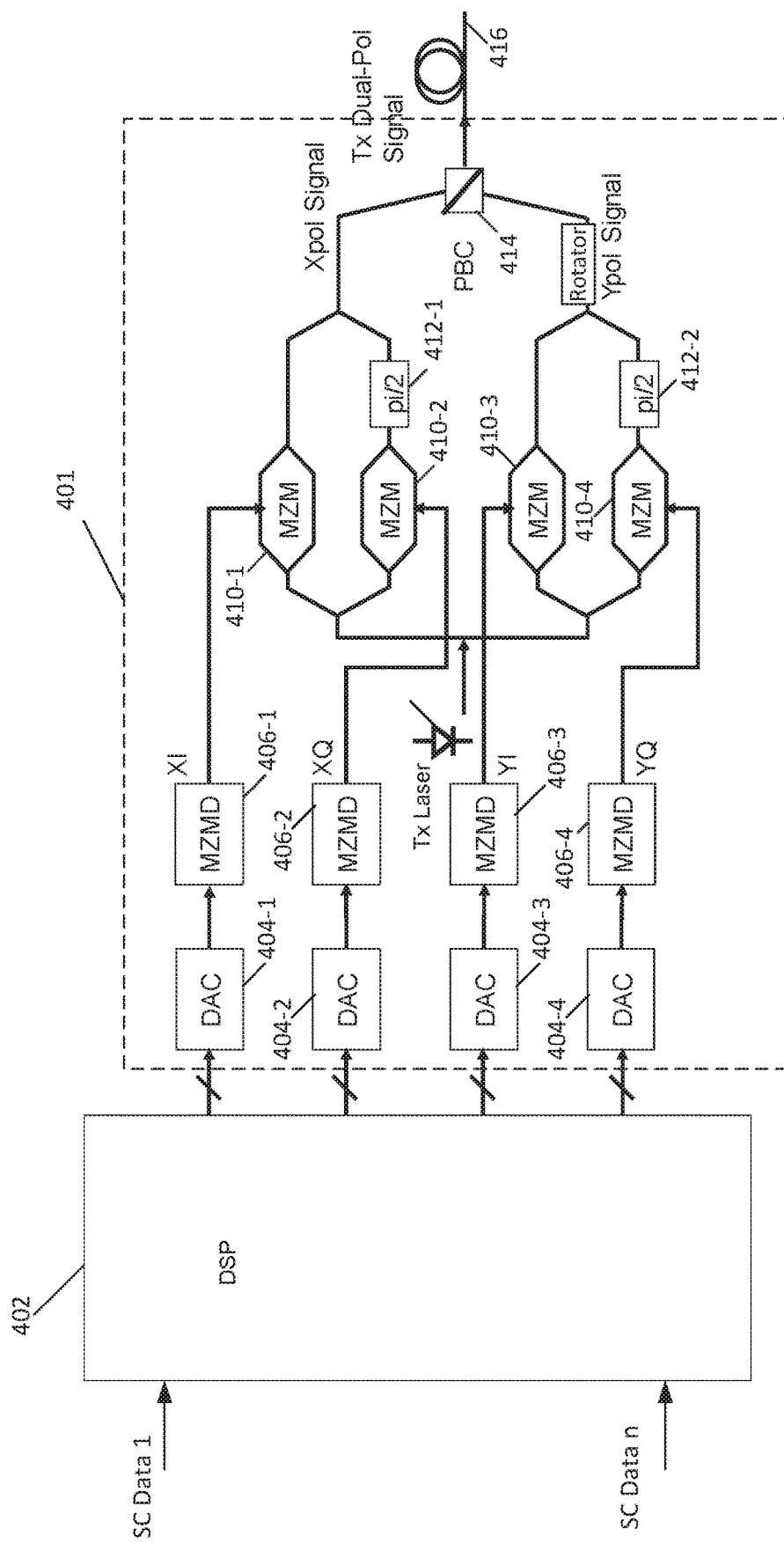
FIG. 4 shows an example of a primary node transmitter consistent with the present disclosure.

FIG. 4 illustrates transmitter 202 of primary node 110 in greater detail. Transmitter 202 include a digital signal processor (DSP) 402 (described in greater detail below), which may receive input data or data streams SC Data 1 to SC Data n. Based on these data streams, DSP 402 may supply a plurality of outputs to D/A and optics block 401 including digital-to-analog conversion (DAC) circuits 404-1 to 404-2, which convert digital signal received from DSP 402 into corresponding analog signals. D/A and optics block 401 also includes driver circuits 406-1 to 406-2 that receive the analog signals from DACs 404-1 to 404-4 adjust the voltages or other characteristics thereof to provide drive signals to a corresponding one of modulators 410-1 to 410-4.

D/A and optics block 401 further includes modulators 410-1 to 410-4, each of which may be a Mach-Zehnder modulator (MZM) that modulates the phase and/or amplitude of the light output from laser 408 having a frequency f0. As further shown in FIG. 4, light output from laser 408, also included in block, 401, is split such that a first portion of the light is supplied to a first MZM pairing including MZMs 410-1 and 410-2 and a second portion of the light is supplied to a second MZM pairing including MZMs 410-3 and 410-4. The first portion of the light is further split into third and fourth portions, such that the third portion is modulated by MZM 410-1 to provide an in-phase (I) component of an X (or TE) polarization component of a modulated optical signal, and the fourth portion is modulated by MZM 410-2 and fed to phase shifter 412-1 to shift the phase of such light by 90 degrees in order to provide a quadrature (Q) component of the X polarization component of the modulated optical signal. Similarly, the second portion of the light is further split into fifth and sixth portions, such that the fifth portion is modulated by MZM 410-3 to provide an I component of a Y (or TM) polarization component of the modulated optical signal, and the sixth portion is modulated by MZM 410-4 and fed to phase shifter 412-2 to shift the phase of such light by 90 degrees to provide a Q component of the Y polarization component of the modulated optical signal.

The optical outputs of MZMs 410-1 and 410-2 are combined to provide an X polarized optical signal including I and Q components and fed to a polarization beam combiner (PBC) 414 provided in block 401. In addition, the outputs of MZMs 410-3 and 410-4 are combined to provide an optical signal that is fed to a polarization rotator, further provided in block 401, that rotates the polarization of such optical signal to provide a modulated optical signal having a Y (or TM) polarization. The Y polarized modulated optical signal is also provided to PBC 414, which combines the X and Y polarized modulated optical signals to provide a polarization multiplexed ("dual-pol") modulated optical signal onto optical fiber 416, for example.

The polarization multiplexed optical signal output from D/A and optics block 401 includes subcarriers SC1 to SCn noted above, such that each subcarrier has X and Y polarization components and I and Q components. Moreover, each subcarrier SC1 to SCn may be associated with or corresponds to a respective one of data streams SC Data 1 to SC Data n.

Figure 5:
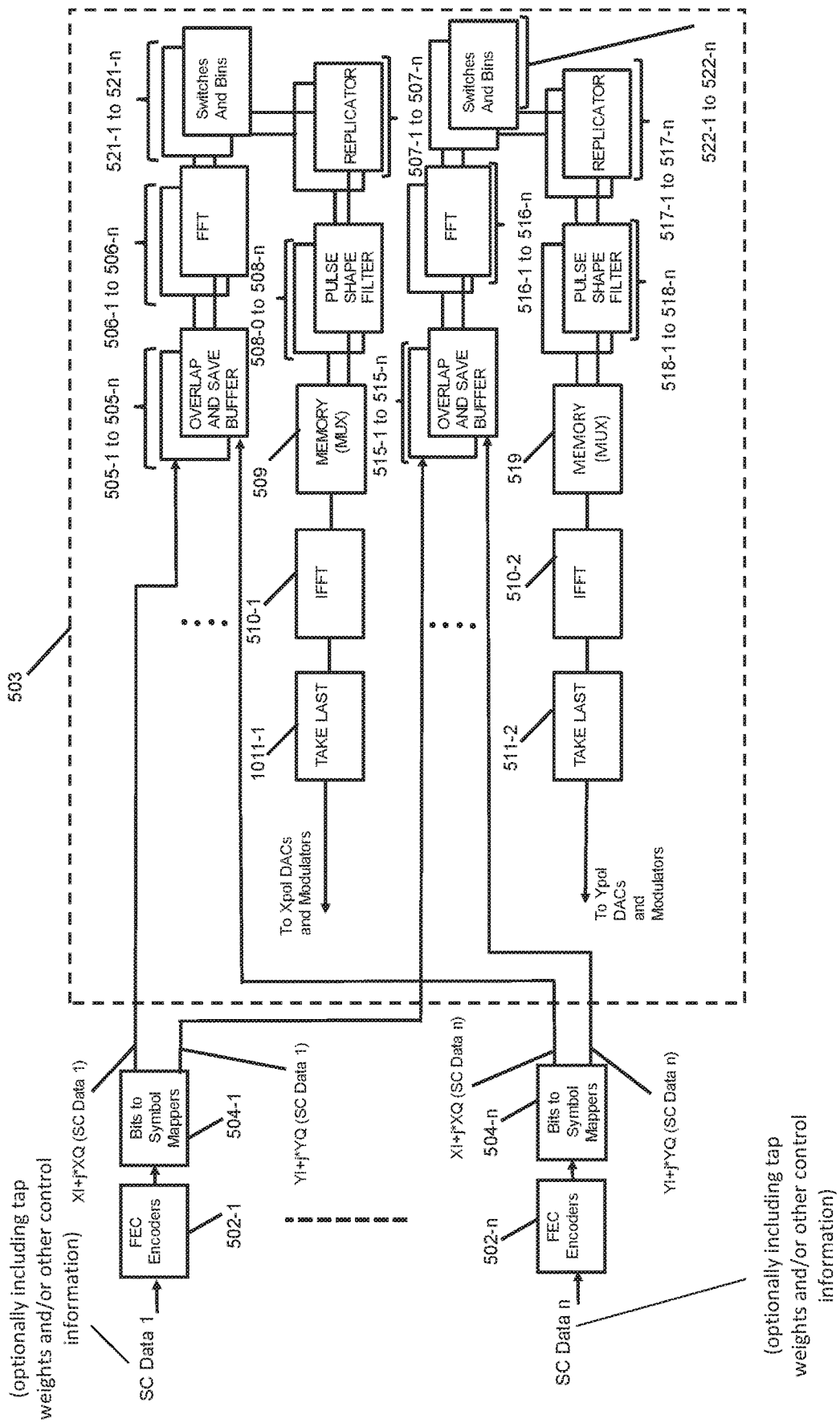
FIG. 5 shows an example of a block diagram of a transmitter DSP consistent with a further aspect of the present disclosure.

FIG. 5 shows an example of a DSP 402 in greater detail. As shown in FIG. 5, TX DSP 402 may include FEC encoders 502-1 to 502-n, each of which may receive a respective one of a plurality of independent input data streams of bits (SC Data 1 to SC Data n from a respective one of a plurality of data sources and carry out error correction coding on a corresponding one of the input data streams, such as through the addition of parity bits. FEC encoders 502-1 to 502-$n$ may provide timing skew between the subcarriers to correct for skew induced by link between nodes 110 and 112-1 to 112-$n$ described above.

Each of FEC encoders 502-1 to 502-$n$ provides an output to a corresponding one of a plurality of bits-to-symbol circuits, 504-1 to 504-$n$ (collectively referred to herein as "504"). Each of bits to symbol circuits 504 may map the encoded bits to symbols on a complex plane. For example, bits to symbol circuits 504 may map four bits to a symbol in a dual-polarization QPSK constellation. Each of bits to symbol circuits 504 provides first symbols, having the complex representation XI+j*XQ, associated with SC Data 1 to DSP portion 503. Data indicative of such first symbols is carried by the X polarization component of the polarization multiplexed modulated optical signal.

Each of bits to symbol circuits 504 may further provide second symbols to DSP portion 503. Such second symbols have the complex representation YI+j*YQ, also associated with SC Data 1. Data indicative of such second symbols, however, is carried by the Y polarization component of the polarization multiplexed modulated optical signal.

As further shown in FIG. 5, each of the first symbols output from each of bits to symbol circuits 504 is supplied to a respective one of first overlap and save buffers 505-1 to 505-$n$ (collectively referred to herein as overlap and save buffers 505) that may buffer 256 symbols, for example. Each of overlap and save buffers 505 may receive 128 of the first symbols or another number of such symbols at a time from a corresponding one of bits to symbol circuits 504. Thus, overlap and save buffers 505 may combine 128 new symbols from bits to symbol circuits 505, with the previous 128 symbols received from bits to symbol circuits 505.

Each overlap and save buffer 505 supplies an output, which is in the time domain, to a corresponding one of fast Fourier Transform (FFT) circuits 506-1 to 506-$n$ (collectively referred to as "FFTs 506"). In one example, the output includes 256 symbols or another number of symbols. Each of FFTs 506 converts the received symbols to the frequency domain using, for example, a fast Fourier transform. Each of FFTs 506 may include 256 memories or registers, also referred to as frequency bins, that store frequency components associated with the input symbols. Each of replicator components 507-1 to 507-$n$ may replicate the 256 frequency components associated with of FFTs 506 and store such components in 512 or another number of frequency bins (e.g., for T/2 based filtering of the subcarrier) in a respective one of the plurality of replicator components. This replication may increase the sample rate.

Each of pulse shape filter circuits 508-1 to 508-$n$ may apply a pulse shaping filter to the data stored in the 512 frequency bins of a respective one of the plurality of replicator components 507-1 to 507-$n$ to thereby provide a respective one of a plurality of filtered outputs, which are multiplexed and subject to an inverse FFT, as described below. The pulse shape filter circuits 508-1 to 508-$n$ calculate the transitions between the symbols and the desired spectrum so that the subcarriers can be packed together on the channel, e.g., with a close frequency separation. Pulse shape filter circuits 508-1 to 508-$n$ may also be used to introduce timing skew between the subcarriers to correct for timing skew induced by links between nodes shown in FIGS. 1$b$-1$c$, for example. Multiplexer component 509, which may include a multiplexer circuit or memory, may receive the filtered outputs from pulse shape filter circuits 508-1 to 508-$n$, and multiplex or combine such outputs together to form an element vector.

Next, IFFT circuit or component 510-1 may receive the element vector and provide a corresponding time domain signal or data based on an inverse fast Fourier transform (IFFT). In one example, the time domain signal may have a same rate of 64 Giga Sample/s. Take last buffer or memory circuit 511-1 may select the last 1024 or another number of samples from IFFT component 510-1 and output the samples to DACs 404-1 and 404-1 at 64 Giga Sam ple/s, for example. As noted above, DAC 404-1 is associated with the in-phase (I) component of the X pol signal and DAC 404-2 is associated with the quadrature (Q) component of the Y pol signal. Accordingly, consistent with the complex representation XI+jXQ, DAC 404-1 receives values associated with XI and DAC 404-2 receives values associated with jXQ. Based on these inputs DACs 404-1 and 404-2 provide analog outputs to MZMD 406-1 and MZMD 406-2, respectively, as discussed above.

As further shown in FIG. 5, each of bits to symbol circuits 504-1 to 504-$n$ outputs a corresponding one of symbols indicative of data carried by the Y polarization component of the polarization multiplexed modulated optical signal output on fiber 416. As further noted above, these symbols may have the complex representation YI+j*YQ. Each such symbol may be processed by a respective one of overlap and save buffers 515-1 to 515-$n$, a respective one of FFT circuits 516-1 to 516-$n$, a respective one of replicator components or circuits 517-1 to 517-$n$, pulse shape filter circuits 518-1 to 518-$n$, multiplexer or memory 519, IFFT 510-2, and take last buffer or memory circuit 511-2, to provide processed symbols having the representation YI+j*YQ in a manner similar to or the same as that discussed above in generating processed symbols XI+j*XQ output from take last circuit 511-1. In addition, symbol components YI and YQ are provided to DACs 404-3 and 404-4, respectively. Based on these inputs, DACs 404-3 and 404-4 provide analog outputs to MZMD 406-3 and MZMD 406-4, respectively, as discussed above.

While FIG. 5 shows DSP 402 as including a particular quantity and arrangement of functional components, in some implementations, DSP 402 may include additional functional components, fewer functional components, different functional components, or differently arranged functional components.

As noted above, based on the outputs of MZMDs 406-1 to 406-4, a plurality of optical subcarriers SC1 to SCn may be output onto optical fiber 416, which is coupled to the primary node 110. Optical subcarriers SC1 to SCn may be provided to one or more of secondary nodes 112 in FIGS. 1$b$-1$d$ and 2. An example of receiver circuit 302 in one of secondary nodes 112 will next be described with reference to FIG. 6.

Figure 6:
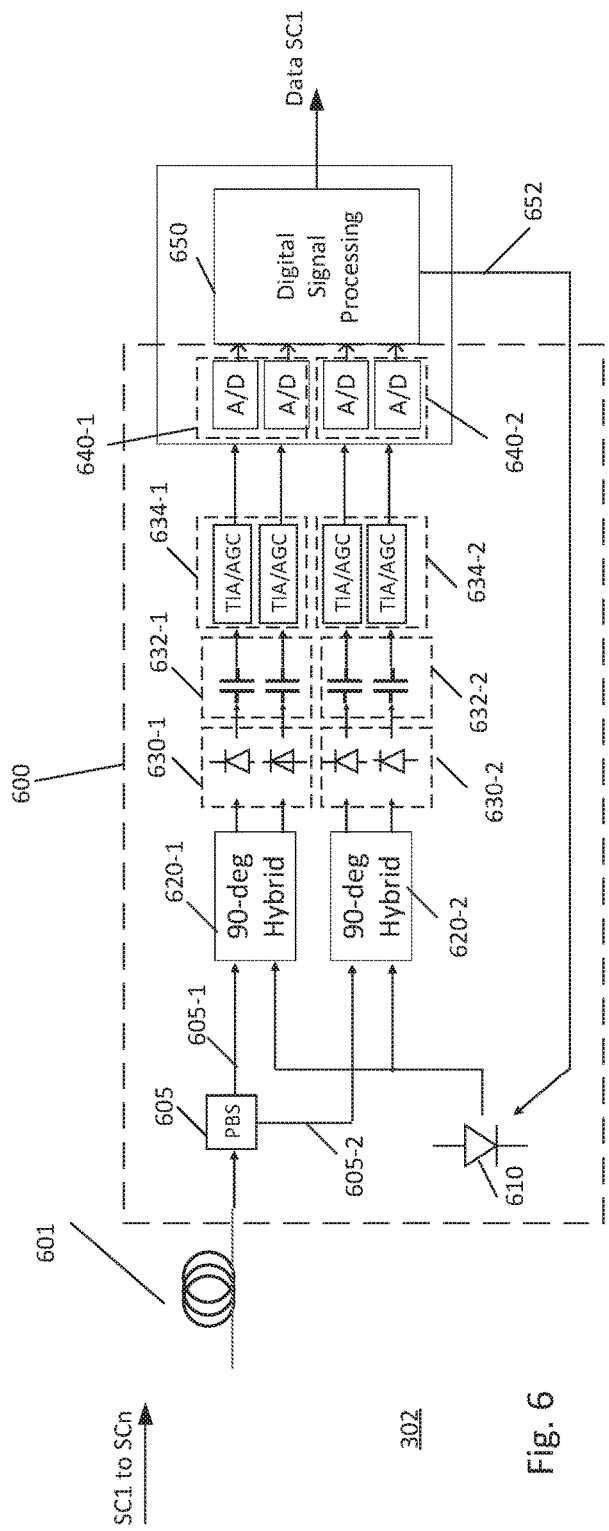
FIG. 6 shows an example of a secondary node receiver consistent with the present disclosure.

As shown in FIG. 6, optical receiver 302 may include an Rx optics and A/D block 600, which, in conjunction with DSP 650, may carry out coherent detection. Block 600 may include a polarization splitter 605 with first (605-1) and second (605-2) outputs), a local oscillator laser 610, 90 degree optical hybrids or mixers 620-1 and 620-2 (referred to generally as hybrid mixers 620 and individually as hybrid mixer 620), detectors 630-1 and 630-2 (referred to generally as detectors 630 and individually as detector 630, each including either a single photodiode or balanced photodiode), AC coupling capacitors 632-1 and 632-2, transimpedance amplifiers/automatic gain control circuits TIA/AGC 634-1 and 634-2, ADCs 640-1 and 640-2 (referred to generally as ADCs 640 and individually as ADC 640), and an RX DSP 650. Local oscillator 610, hybrid mixers 620, detectors 630, ADCs 640, and RX DSP 650 may correspond to like components described with regard to FIG. 6.

Polarization beam splitter (PBS) 605 may include a polarization splitter that receives an input polarization multiplexed optical signal including optical subcarriers SC1 to SCn and supplied by optical fiber link 601, which may include optical fiber 416 noted above. PBS 605 may split the incoming optical signal into the two X and Y orthogonal polarization components. Hybrid mixers 620 may combine the X and Y polarization components with light from local oscillator laser 610. For example, hybrid mixer 620-1 may combine a first polarization signal (e.g., the component of the incoming optical signal having a first or X (TE) polarization output from PBS port 605-1) with light from local oscillator 610, and hybrid mixer 620-2 may combine a second polarization signal (e.g., the component of the incoming optical signal having a second or Y (TM) polarization output from PBS port 605-2) with the light from local oscillator 610. In one example, a polarization rotator may be provided at PBS output 605-2 to rotate Y component polarization to have the X polarization.

Detectors 630 may detect mixing products output from the optical hybrids, to form corresponding voltage signals, which are subject to AC coupling by capacitors 632-1 and 632-1, as well as amplification and gain control by TIA/AGCs 634-1 and 634-2. The outputs of TIA/AGCs 634-1 and 634-2 and ADCs 640 may convert the voltage signals to digital samples. For example, two detectors or photodiodes 630-1 may detect the X polarization signals to form the corresponding voltage signals, and a corresponding two ADCs 640-1 may convert the voltage signals to digital samples for the first polarization signals after amplification, gain control and AC coupling. Similarly, two detectors 630-2 may detect the rotated Y polarization signals to form the corresponding voltage signals, and a corresponding two ADCs 640-2 may convert the voltage signals to digital samples for the second polarization signals after amplification, gain control and AC coupling. RX DSP 650 may process the digital samples associated with the X and Y polarization components to output data associated with one of the subcarriers, for example, such as Data SC1 associated with, which may be outputted as output data carried by one of the subcarrier.

While FIG. 6 shows optical receiver 302 as including a particular quantity and arrangement of components, in some implementations, optical receiver 302 may include additional components, fewer components, different components, or differently arranged components. The quantity of detectors 630 and/or ADCs 640 may be selected to implement an optical receiver 302 that is capable of receiving a polarization diverse signal. In some instances, one of the components illustrated in FIG. 6 may carry out a function described herein as being carry outed by another one of the components illustrated in FIG. 6.

In one example, in order to select a particular subcarrier at a remote node, local oscillator 610 may be tuned to output light having a wavelength relatively close to the selected subcarrier wavelength to thereby cause a beating between the local oscillator light and the selected subcarrier. Such beating will either not occur or will be significantly attenuated for the other non-selected subcarriers so that data carried by the selected subcarrier is detect and processed by DSP 650. In the example shown in FIG. 6, appropriate tuning of the local oscillator wavelength enables selection of one of the subcarriers, e.g., SC1, carrying signals or data indicative of Data SC1, as discussed below. Accordingly, subcarriers may be effectively routed through network 100 to a desired receiver in a particular node.

Accordingly, at each node receiver, such as receiver 302, which may be included in nodes 10, 20, 30, and 40, the local oscillator laser, e.g., 610, may be tuned to have a wavelength close to that of one of the subcarrier carrying signals and data indicative of the desired client data to be output from the DSP, e.g., DSP 650. Such tuning may be achieved by adjusting a temperature or current flowing through local oscillator 610, which may include a semiconductor laser, such as a distributed feedback (DFB) laser or distributed Bragg reflector (DBR) laser. Thus, different optical components in each receiver to select optical signals carrying a desired data stream are not required. Rather, as noted above, the same or substantially the same circuitry may be proved in the receiver portion of each node, such as a node in a mesh network, and signal or data selection may be achieved by tuning the local oscillator laser to the desired beating wavelength.

As further shown in FIG. 6, DSP 650 may have an output 652, such that based on such output, the temperature of or the current supplied to local oscillator laser 610 may be controlled. In the case of temperature control, a thin film heater may be provided adjacent local oscillator laser 610, and an appropriate current may be supplied to such heater, based on output 652, to heat laser 610 to the desired temperature. Control circuitry in DSP 650 may generate output or control signal 652. Alternatively, such circuitry may be provided outside DSP 650. Additionally, the frequency of local oscillator laser 610 may be adjusted by varying the current supplied laser 610 based on control signal 652.

Figure 7:
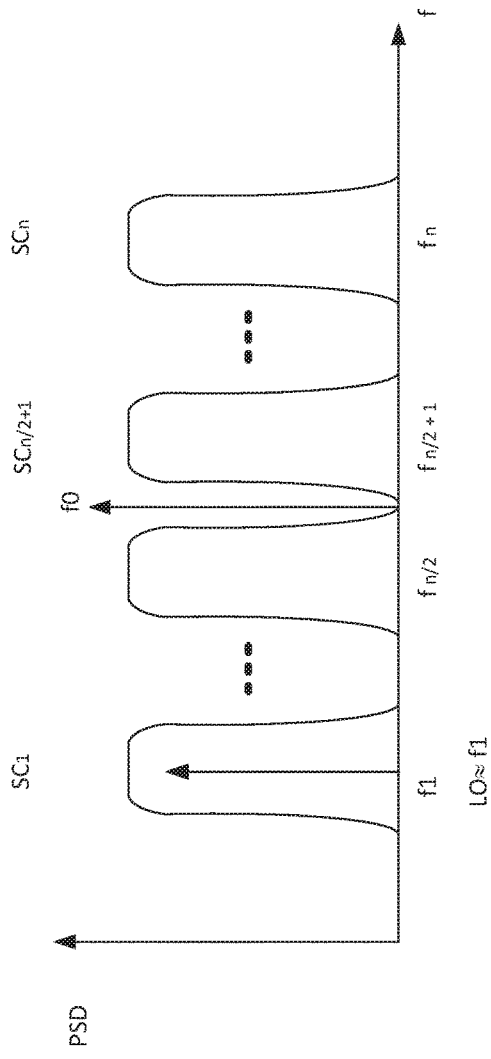
FIG. 7 shows a further example of a power spectral density plot consistent with the present disclosure.

FIG. 7 shows an example in which the frequency of light output from local oscillator laser 610, fLO, may be tuned to frequency f1 so that Data SC1 associated with subcarrier SC1 is selected and output from DSP 650. By tuning fLO in a manner similar to that described above, fLO may, in one example, be adjusted to be substantially the same as, but not equal to, subcarrier frequency f1. As a result, the incoming optical subcarrier SC1 will beat with the light output from local oscillator 610 so that SC1 may be demodulated by optical hybrids 620-1 and 620-2 and processed as noted above to output Data SC1. In a similar manner, frequency fLO may be tuned to select data associated with or carried by the remaining subcarriers SC2 to SCn.

Figure 8:
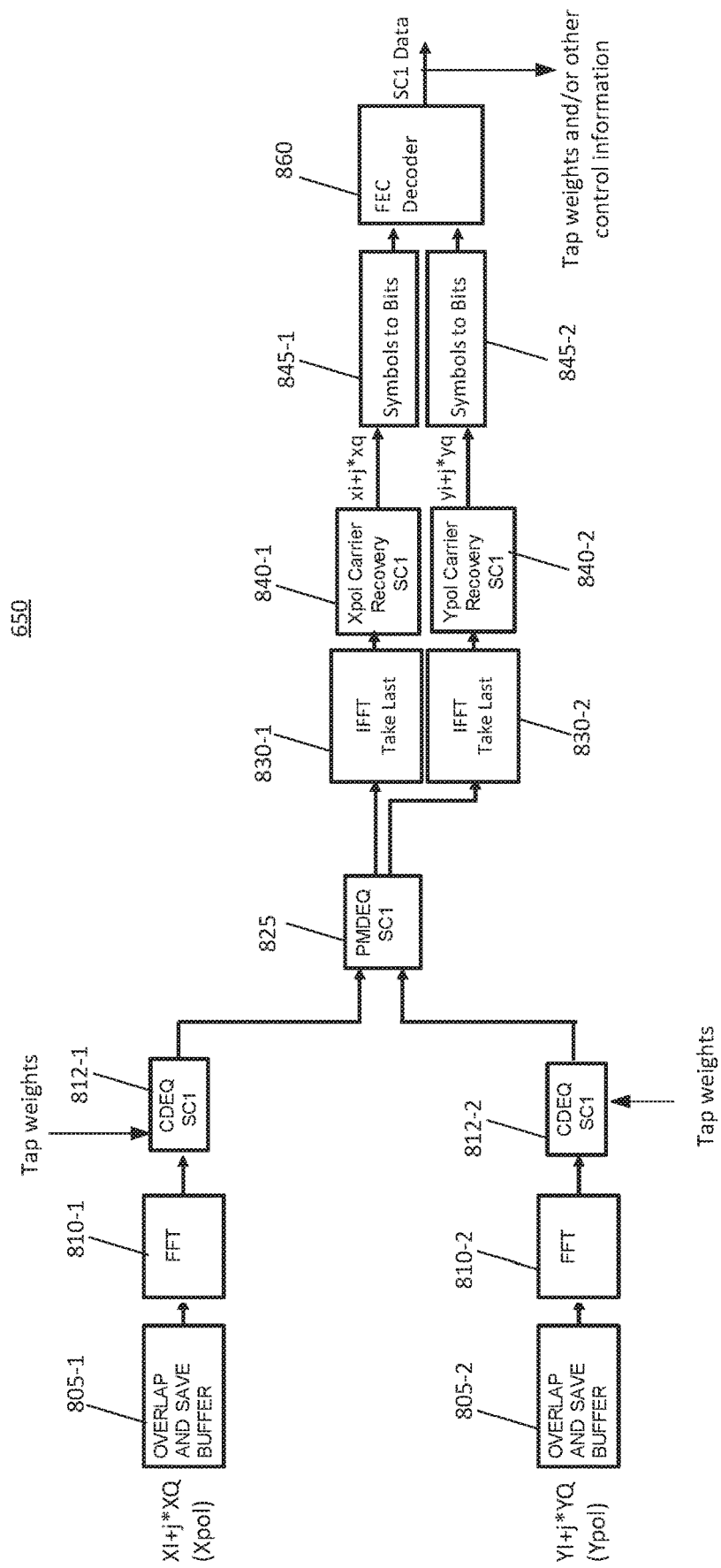
FIG. 8 shows an example of a secondary node receiver DSP consistent with the present disclosure.

FIG. 8 illustrates exemplary components of an example of the receiver digital signal processor (DSP) 650 shown in FIG. 6. The DSP 650 may include overlap and save buffers 805-1 and 805-2, FFT components or circuits 810-1 and 810-2, chromatic dispersion (CD) equalizer components (CDEQs) or circuits 812-1 and 812-2, polarization mode dispersion (PMD) equalizer components or circuit 825, IFFT components or circuits 830-1 and 830-2, carrier recovery components or circuits 840-1 and 840-2, symbols to bits components 845-1 and 845-2, and FEC decoder 860.

As noted above, analog-to-digital (A/D) circuits 640-1 output digital samples corresponding to the analog inputs supplied thereto. In one example, the samples may be supplied by each A/D circuit at a rate of 64 Giga Samples/s. The digital samples correspond to symbols carried by X polarization optical subcarrier SC1 and may be represented by the complex number XI+jXQ. The digital samples may be provided to overlap and save buffer 805-1-2. The FFT component 810-1 may receive the 2048 vector elements, for example, from the overlap and save buffer 805-1 and convert the vector elements to the frequency domain using, for example, a fast Fourier transform (FFT). The FFT component 810-1 may convert the 2048 vector elements to 2048 frequency components, each of which is stored in a register or "bin" or other memory, as a result of carry outing the FFT.

The frequency components are then supplied to CDEQ 812-1, which may include a finite impulse response (FIR) filter that corrects, offsets or reduces the effects of, or errors associated with chromatic dispersion of the transmitted optical subcarrier SC1, in this example. CDEQ 812-1 supplies an output to a polarization mode dispersion (PMD) equalizer circuit 825. In one example, each CDEQ includes a finite-impulse response filter (FIR), as described in greater detail below.

It is noted that digital samples output from A/D circuits 640-2 associated with Y polarization components of subcarrier SC1 may be processed in a similar manner to that of digital samples output from A/D circuits 640-1 and associated with the X polarization component of subcarrier SC1. Namely, overlap and save buffer 805-2, FFT 810-2 and CDEQ 812-2 may have the same or similar structure as and operate in the same or similar fashion as buffer 805-1, FFT 810-1 and CDEQ 812-1, respectively. For example, CDEQ 812-2 may include an FIR filter that corrects, offsets, or reduces the effects of, or errors associated with chromatic dispersion of the transmitted optical subcarrier SC1, in this example. Like, CDEQ 812-1, CDEQ 812-2 provide an output to PMDEQ 825.

PMD component 825 may include another FIR filter that corrects, offsets or reduces the effects of, or errors associated with PMD of the transmitted, subcarrier, such as subcarrier SC1. PMD component supplies a first output to IFFT component 830-1, which converts a 256-element vector, in this example, back to the time domain as 256 samples in accordance with, for example, an inverse fast Fourier transform (IFFT).

Time domain signals or data output from IFFT 830-1 are supplied to carrier recovery circuitry or component 840-1, which may apply carrier recovery techniques to compensate for transmitter (e.g., laser 408) and receiver (e.g., local oscillator laser 610) linewidths. In some implementations, the carrier recovery component 840-1 may carry out carrier recovery to compensate for frequency and/or phase differences between the transmit signal and the light from the local oscillator 610. After carrier recovery, the data associated with the X polarization component may be represented as symbols having the complex representation $xi+j*xq$ in a constellation, such as a QPSK constellation or a constellation associated with another modulation formation, such as an m-quadrature amplitude modulation (QAM), m being an integer. In some implementations, the output of carrier recovery component 840-1 may be used to update the taps of the FIR filter included in PMD component 825.

The symbols to bits component 845-1 may receive the symbols output from the carrier recovery component 840-1 and map the symbols back to bits. For example, the symbol to bits component 845-1 may map one symbol, in the QPSK constellation, to Z bits, where Z is an integer. For dual-polarization QPSK modulated subcarriers, X is four. Bits output from component 845-1 are provided to FEC decoder 860.

As noted above, PMD equalizer circuit 825 provides a second output. As further shown in FIG. 8, the second output is received by IFFT 830-2, which provides an output to carrier recovery component or circuitry 840-2. IFFT 830-2 and carrier recovery circuitry 840-2 may have the same or similar and operate in the same or similar fashion as IFFT 830-1 and carrier recovery circuitry 840-1, respectively, to provide symbols having the complex representation $yi+j*yq$ associated with data carried by the Y polarization component. Symbols output from carrier recovery circuit 840-2 may be provided to symbols to bit circuit or component 845-2 having the same or similar structure and operating in the same or similar manner as symbols to bits component 845-1 to output bits to FEC decoder 860.

In some implementations, FEC the bits may be decoded for error correction using, for example, FEC. The output bits component 850 may output 128*X bits at a time, for example. For dual-polarization QPSK, for example, the output bits component 850 may output 512 bits at a time, for example.

FEC decoder 860 may process the bits output from components 845-1 and 845-2 to remove errors using forward error correction. Such error corrected bits may be output as the SC1 Data.

While FIG. 6 shows DSP 650 as including a particular quantity and arrangement of functional components, in some implementations, DSP 650 may include additional functional components, fewer functional components, different functional components, or differently arranged functional components.

FIGS. 4-8 describe an example of FDM transmission from primary node 110 to one of secondary nodes 112 (see FIGS. 1b-1d, whereby each secondary node transmits and receives data over a particular subcarrier. Alternatively, multiple subcarriers may carry data to one or more of such secondary nodes. In another example, each subcarrier may be encoded based on time division multiple access (TDMA) techniques to designate data for a particular secondary node within a group of secondary nodes.

TDMA subcarrier transmission from primary node 110 to secondary nodes 112 will next be described.

Figure 9:
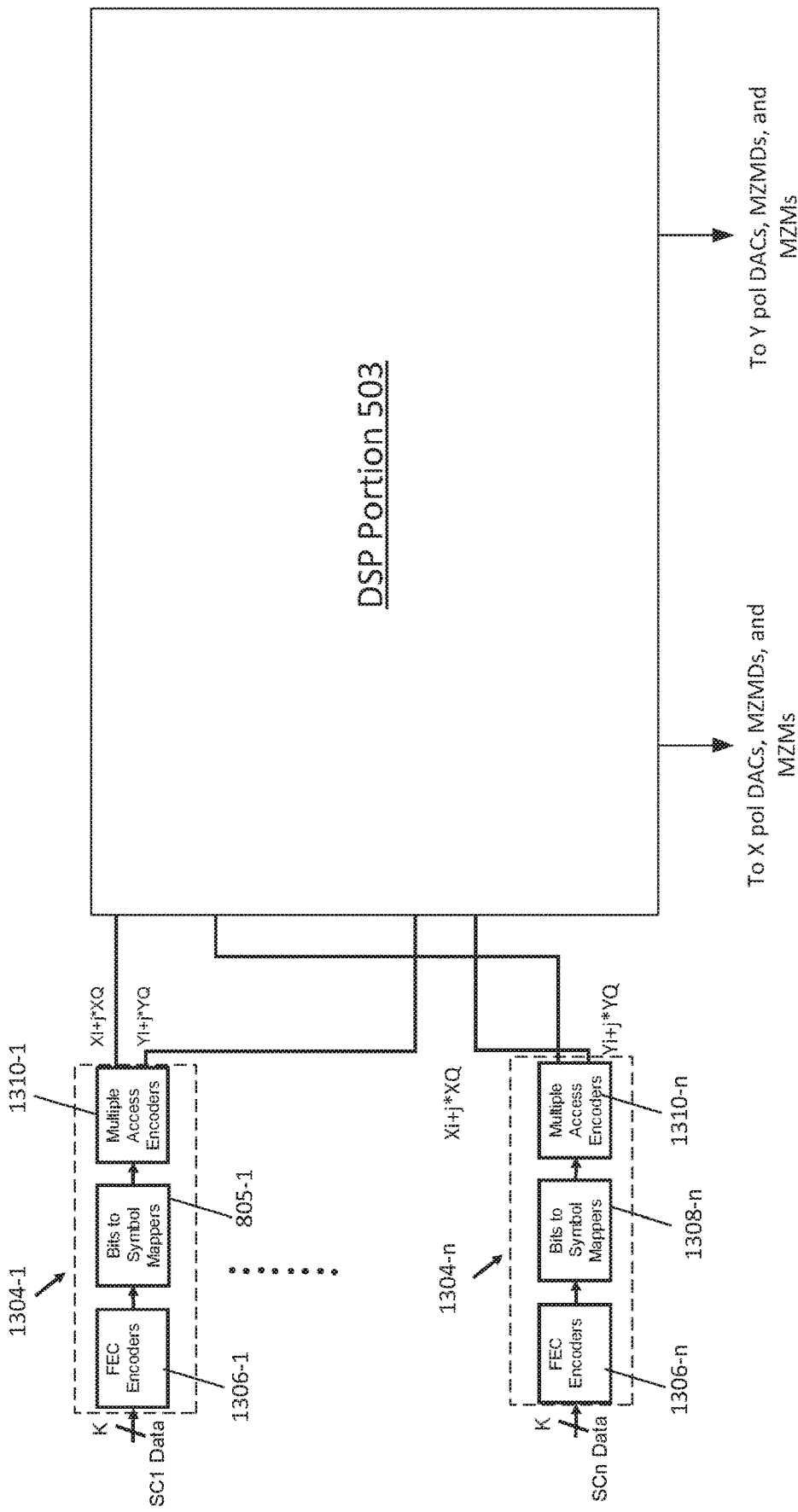
FIG. 9 shows an example of a primary node transmitter DSP consistent with an additional aspect of the present disclosure.

FIG. 9 shows a block diagram of DSP 1302 included in primary node transmitter 202 in place of DSP 402 in FIG. 4 to facilitate TDMA optical subcarrier transmission consistent with an aspect of the present disclosure. DSP 1302 is similar to DSP 402. For example, DSP 1302, like DSP 402, includes a DSP portion 503 that includes overlap and save buffers, FFT circuits, replicator circuits, pulse shape filters, a multiplexer, demultiplexer, IFFTs, and take last buffers. DSP 1302, however, includes input blocks 1304-1 to 1304-n (collectively referred to as input blocks 1304), each of which receiving a respective one of K data streams. Collectively, each group of K data streams may constitute a respective input data SC1 Data to SCn Data. As noted above, each of subcarriers SC1 to SCn may carry respective information indicative of a corresponding one of SC1 Data to SCn Data.

Each input block 1304 may receive a group of K data streams, which are supplied to a respective one of FEC encoder groups 1306-1 to 1306-n (collectively referred to herein as FEC encoder groups 1306). The outputs of each FEC encoder group 1306 are next supplied to a respective one of bits to symbol mapper groups 1308-1 to 1308-n, which, in turn, supply symbols to multiple access encoder circuits or circuit groupings 1310-1 to 1310-n that further encode the received symbols based on TDMA.

Figure 10:
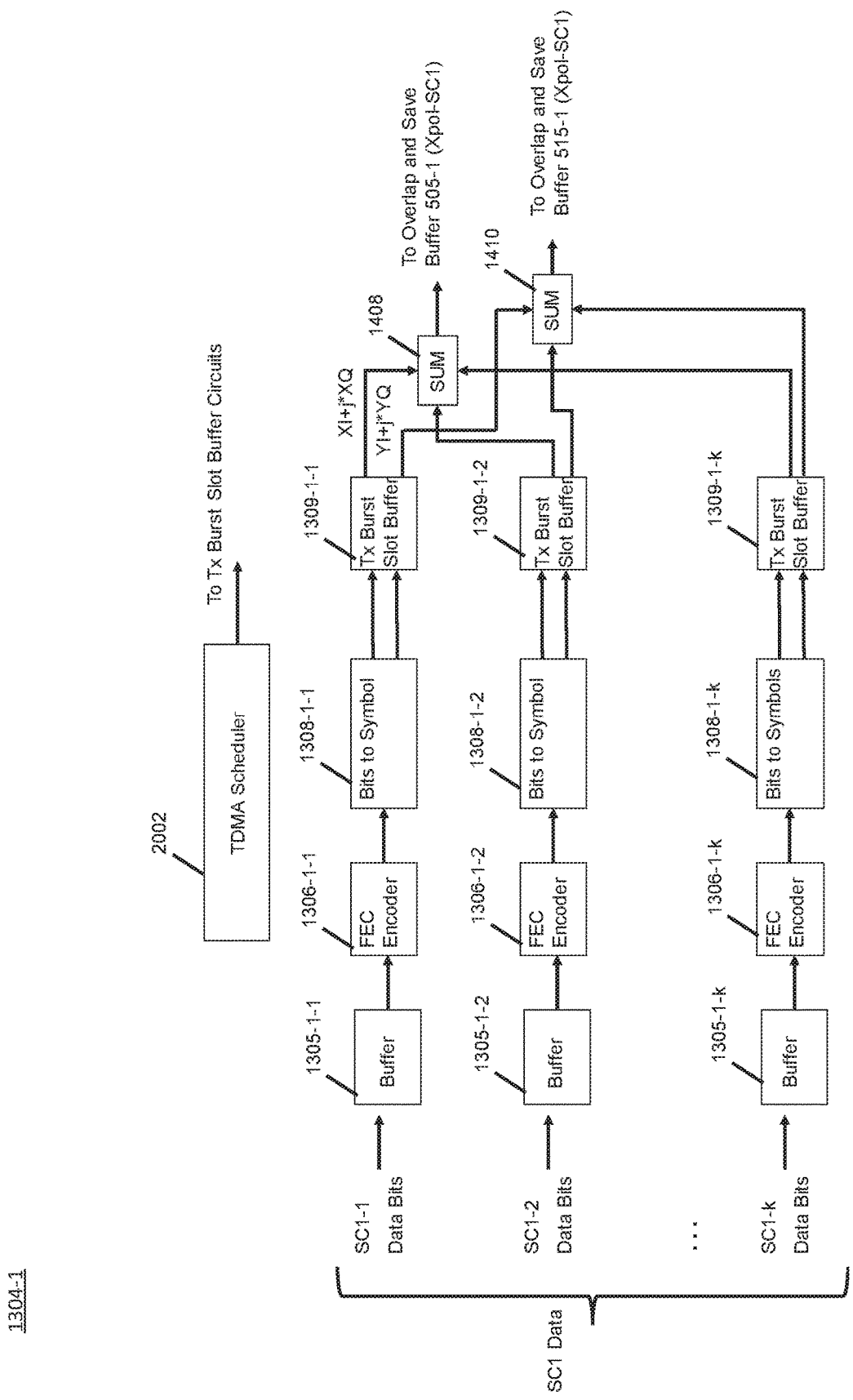
FIG. 10 shows an example of TDMA encoding in a primary node consistent with an additional aspect of the present disclosure.

Input block 1304-1 is shown in greater detail in FIG. 10. It is understood that remaining input blocks 1304-2 to 1304-n have, for example, a similar structure and operation in a similar manner as input block 1304-1. As shown in FIG. 10, and, as noted above, input SC1 Data is provided, for example, as k parallel data streams SC1-1 to SC1-k, each of which being supplied to a corresponding one of buffers 1305-1-1 to 1305-1-k. Each of buffers 1305-1 includes a memory that temporarily stores successive portions of a respective one of data stream SC1-1 to SC1-k. Each of buffers 1305-1 is operable output such data portions during an available time slot. Each of FEC encoder circuits 1306-1-1 to 1306-1-$k$ receives a data portions output from a respective one of buffers 1305-1 encodes the received data bits in accordance with an error correcting code, as described above. The encoded data streams are next supplied to a respective one of bits to symbol circuits 1308-1-1 to 1308-1-$k$, collectively corresponding to bits to symbol circuits 1308-1 shown in FIG. 9. Each of bits to symbol circuits 1308-1-1 to 1308-1-$k$ map the encoded bits to symbols, as further described above. The symbols resulting from such mapping have the complex representations XI+j*XQ (X symbols for X polarization) and YI+j*YQ (Y symbols for Y polarization) and are provided to TDMA encoding circuit 1310-1 including Tx burst slot buffer circuits 1309-1-1 to 1309-1-$k$ and adder or summer circuits 1408 and 1410. Each of Tx burst slot buffer circuits 1309-1-1 to 1309-1-$k$ temporarily store the outputs from a corresponding one of bits-to-symbol mapping circuits 1308-1-1 to 1308-1-$k$.

In one example, the data supplied to and output from burst slot buffer circuits 1309 may be portions of a packet. Such packet portions may be transmitted and accumulated in a buffer provided in each leaf or secondary nodes (see description of buffer 1207 below). In one example, once the amount of data received by the secondary node and stored in the buffer reaches a threshold, which, in a further example, indicates that a packet has been received, such packet is then output from the leaf node.

In a further example, data streams SC1-1 to SC1-$k$ input to buffer circuits 1305-1 to 1305-$k$ may be at the same or different average data rates. For example, each of data streams SC1-1 to SC1-$k$ may provide data at the same average rate of 5 Gbit/s. In that case, the same number of times slots, such as time slots TS shown in FIG. 21, may be allocated with each data stream, whereby the data or information carried in each time slot is indicative of the data of each data stream SC1-1 to SC1-$k$. In another example, one of the data streams, such as data stream SC1-1, may supply data at a higher average rate, such as 10 Gbit/s, and, in that case, twice as many time slots may be allocated with data stream SC1-1 than the remaining data streams SC1-2 to SC1-$k$.

As further shown in FIG. 10, TDMA scheduler circuit 2002 may provide control signals Tx burst slot buffer circuits 1309-1 to 1309-$k$ to synchronize, in one example, the X and Y symbols output from each of the burst slot circuits to adders 1408 and 1410. As a result, symbols associated with data bits SC1-1, for example, are output from burst slot circuit 2004-1 during designated time slots indicated by the control signal output from scheduler circuit 2002. Similarly, based on other control signals output from TDMA scheduler 2002, symbols associated with data bits or streams SC1-2 to SC1-K are output to adders 1408 and 1410 during designated time slots. Accordingly, adder circuit 1408 supplies time division multiplexed symbols to overlap and save buffer 505-1, and adder circuit 1410 outputs time division multiplexed symbols to overlap and save buffer 515-1, both of which being associated with subcarrier SC1.

In a similar fashion, multiple access encoder circuits 1310-2 to 1310-$n$ supply time division multiplexed symbols to corresponding overlap and save buffers 505-2 to 505-$n$ and 515-2 to 515-$n$. As noted above, each of these overlap and save buffer circuits, as well as overlap and save buffer circuit 505-1 and 515-1 operate in conjunction with remaining circuits shown in FIG. 5 to provide outputs that are supplied to DACs 404, which, in turn, provide signals to driver circuits 406, that output drive signals to MZMs 410 (see FIG. 4). Accordingly, the MZMs supply optical subcarriers in a manner similar to that described above. In the current example, however, the optical subcarriers carry TDMA encoded information, whereby the optical carriers carry data or information in time slots, such that each time slot, for example, is associated with and carries information designated for receipt by a particular secondary node.

Figure 11:
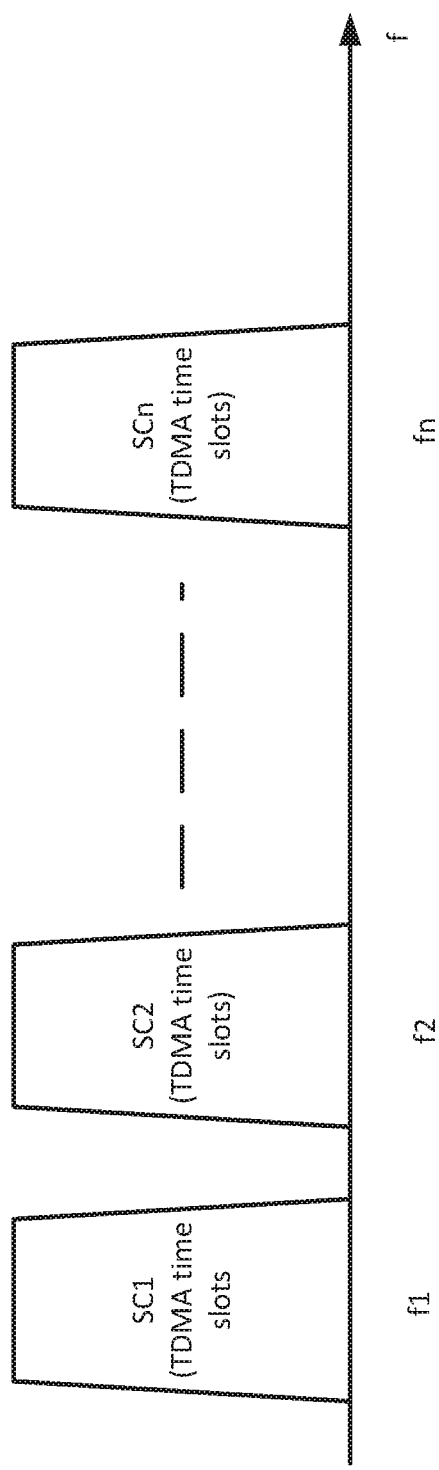
FIG. 11 shows an example of optical subcarriers carrying symbols in designated time slots based on TDMA encoding consistent with the present disclosure.

Namely, FIG. 11 shows the resulting subcarriers SC1 to SCn carrying data indicative of the time division multiplexed symbols or information, whereby one or more symbols are associated with and transmitted during a designated time slot by scheduler 2002. In one example, each such time slot corresponds to a particular secondary node 112 that is intended to receive and process the symbol(s) or information transmitted during that time slot. The symbols output from encoders 1310-1 to 1310-$n$ are processed by DSP portion 503 in a manner similar to that described above with reference to FIG. 4. Thus, a primary node modulator, collectively constituted by MZMs 410, for example, is operable to modulate an optical signal to provide a plurality of optical subcarriers based on the plurality of electrical signals output from DSP 402, such that a first one of the plurality of subcarriers carriers, e.g., SC1, carries TDMA encoded information, whereby first information indicative of a first portion of the data input to DSP 402, e.g., SC1-1 data bits, is carried by SC1 in a first time slot and second information indicative of a second portion of the data, e.g., SC1-2 data bits, is carried by SC1 in a second time slot, the first information being associated with a first node remote from the transmitter, e.g., a first one of secondary nodes 112, and the second information being associated with a second node remote from the transmitter, e.g., a second one of secondary nodes 112. Such time slots are similar to those shown in FIG. 21.

As discussed above, one or more optical subcarriers may be supplied to receiver 302 of a secondary node 112. The structure and operation of receiver 302 is described above in connection FIG. 6. The subcarriers shown in FIG. 11 may be detected by receiver 302 in a manner similar to that described above in connection with FIGS. 6 and 8. That is, the optical signal subcarriers may be mixed with local oscillator light in optical hybrids 620, the resulting mixing products converted to electrical signal by photodiodes 630, and electrical signals output from the photodiodes may be capacitively coupled to TIA and AGC circuits 634. The analog outputs of the AGC circuits may then be converted to digital signals by A/D circuits 640 and supplied to DSP 650.

Further processing in DSP 650 by circuits 805, 810, 812, 825, 830, and 840 is similar to that described above in connection with FIG. 8.

As noted above in connection with FIG. 9, multiple access encoder may also encode symbols for TDMA transmission from primary node 110 to multiple secondary nodes 112, as well as from multiple secondary nodes 112 to primary node 110. Such TDMA transmission consistent with a further aspect of the present disclosure will next be described.

Figure 12:
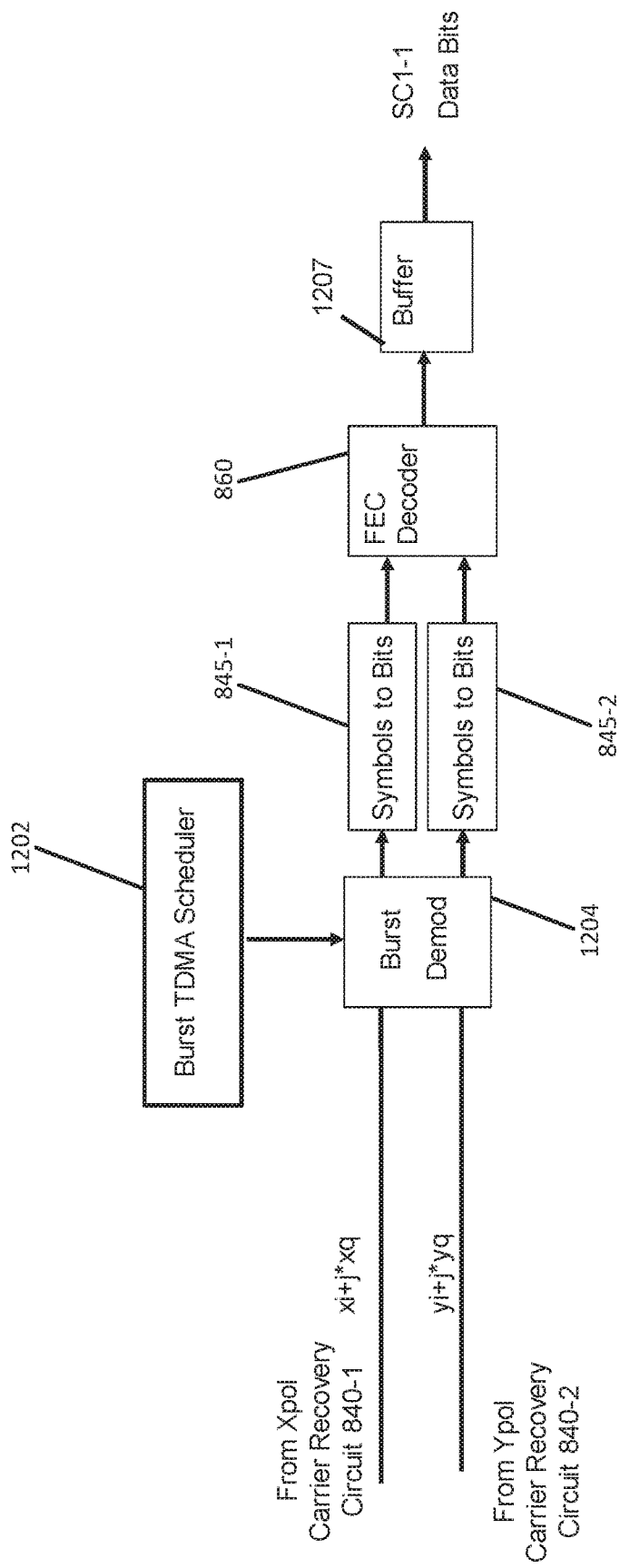
FIG. 12 shows an example of secondary node TDMA decoding consistent with the present disclosure.

Processing of received TDMA optical subcarriers at a secondary node will next be described with reference to FIG. 12. Such processing is similar to that described above in connection with FIGS. 6 and 8. In FIG. 12, however, first (xi+j*xq or symbols associated with the X polarization) and second (yi+j*yq or symbols associated with the Y polarization) symbol outputs from secondary node carrier recovery circuits 840-1 and 840-2 are provided to a burst demodulator circuit 1204, which, under the control of burst TDMA scheduler circuit 1202, is synchronized, in one example, to select one or more symbols transmitted in time slots associated with a particular secondary node 112. The selected symbols are supplied to symbol to bits mapping circuits 845-1 and 845-2 for further processing, as described above in connection with FIG. 8. Namely, the outputs of circuits 845-1 and 845-2 are supplied to FEC decoder 860, which decodes such outputs based on a forward error correction code, which may correspond to the FEC code noted above. In FIG. 12, the output of FEC decoder 860 is fed to a memory or buffer 1207. In one example, buffer 1207 stores data output from decoder 860 until a sufficient amount has been received to constitute a packet, for example. At that point, the data, which output. Alternatively, buffer 1207 outputs data until the amount of received data exceeds a threshold amount, which, as noted above, may indicate that an entire packet has been received and is available for output.

As noted above, control channel information may include coding information that is transmitted over the in-band or out-of-band control channel from the primary node 110 to the secondary nodes 112. In one example, the out-of-band or in-band control channel may supply timing and synchronization information, as well as identifying information, to each secondary node 112 in a manner similar to that described above so that each secondary node is synchronized to detect data in a time slot corresponding to that particular secondary node. Similarly, the synchronization and timing information supplied to a given secondary node may change over time so that as secondary nodes 112 are added or removed from the network the synchronizing and timing information transmitted to the secondary nodes reflects the new network configuration so that each secondary node is associated with particular time slots carrying data or symbols intended for that particular node.

Accordingly, as noted above, the number of secondary nodes 112 communicating with primary node 110 may vary, and control channel information may be exchanged between the primary node and the secondary nodes so that the current network configuration is communicated to all nodes. Thus, even though the number of secondary nodes 112 communicating with primary node 110 may change over time, each secondary node may continue to receive its intended data and transmit data to primary node 110.

In the examples noted above, time-division multiple access techniques are employed so that a high capacity primary node 110 may supply subcarriers, each carrying data at a high data rate, e.g., 100 Gbit/s or 25 Gbit/s, for downstream communication with a plurality of lower rate receivers provided in secondary nodes 112.

Figure 13:
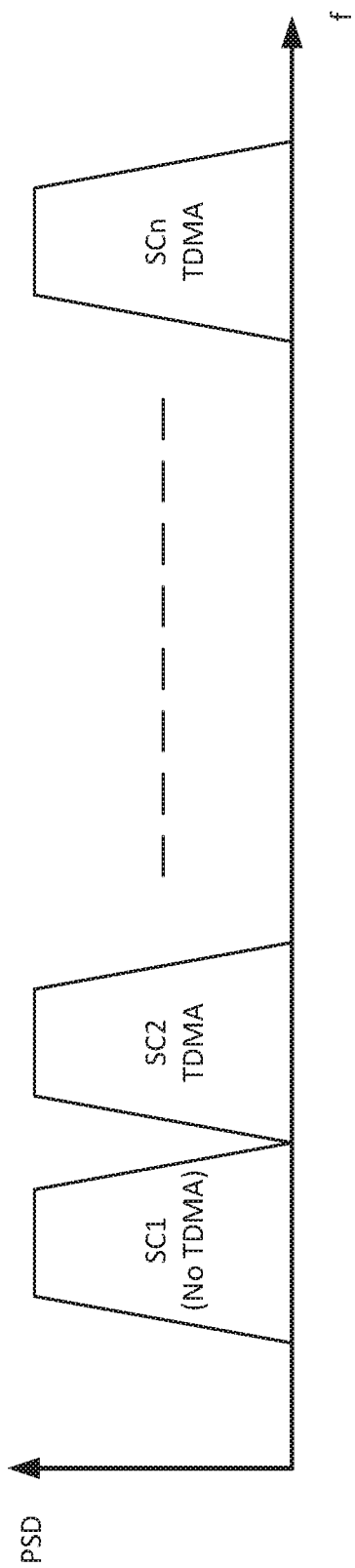
FIG. 13 shows an example of subcarriers carrying TDMA encoded data.
Figure 14:
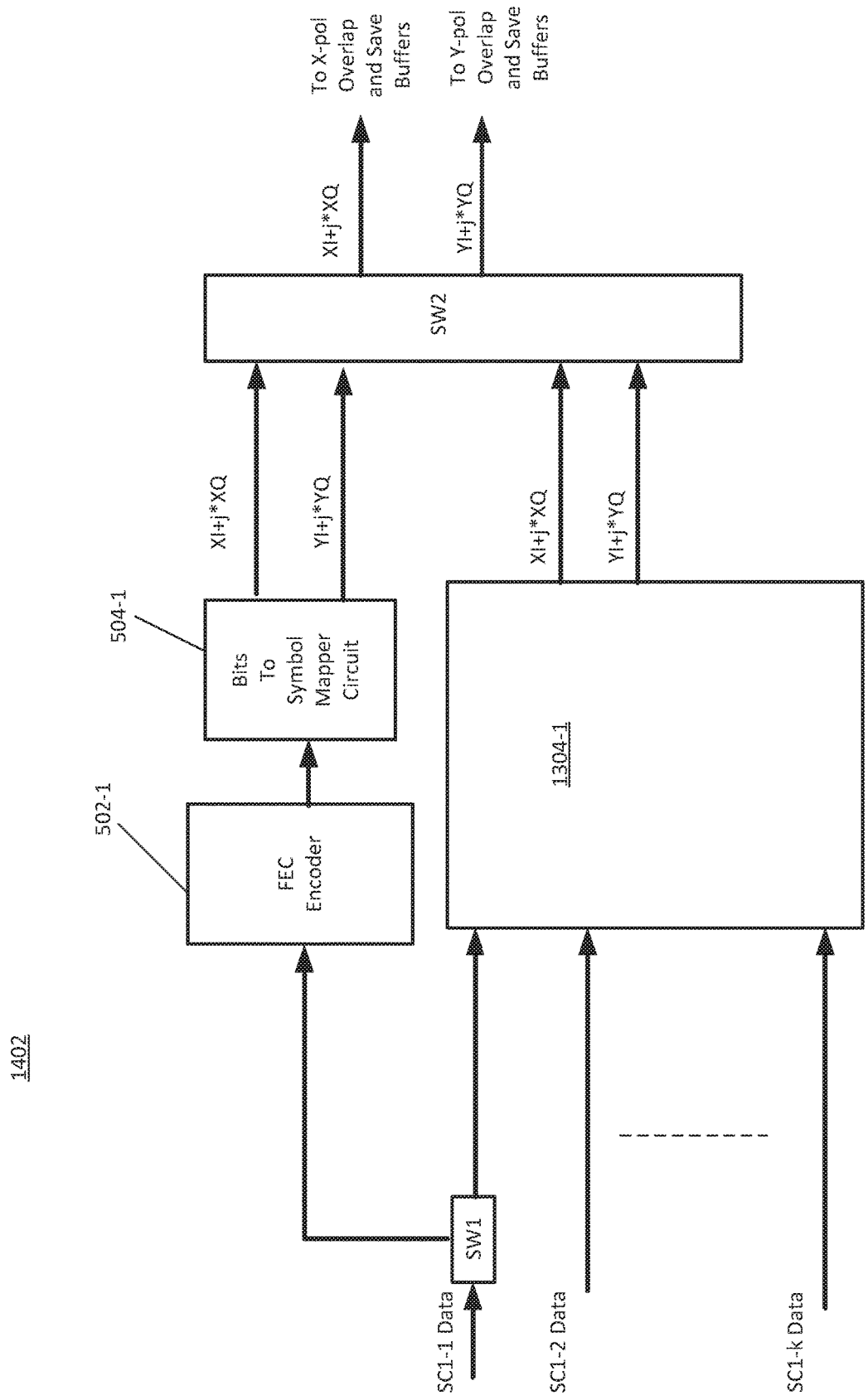
FIG. 14 shows a portion of a primary node transmitter including circuitry for selectively transmitting data encoded in accordance with a multiple access format, such as TDMA.

Consistent with a further aspect of the present disclosure, certain subcarriers, e.g., SC2 to SCn in FIG. 13, may carry TDMA encoded data or information while other subcarriers, e.g., SC1, do not. As a result, certain subcarriers may be employed for multiple access while others may provide a data optical signal that is received by a single secondary node 112, for example. An example of a portion of DSP 1402 for selectively generating symbols for outputting both types of subcarriers is shown in FIG. 14.

DSP portion 1402 includes, for example, a switch that receives SC1-1 data. The switch, under control of a switch control signal, selectively outputs the SC1-1 data to either input block 1304-1 (see FIG. 10) or to FEC encoder 502-1. If TDMA encoding is not desired, the SC1-1 data is supplied to FEC encoder 502-1. In that case, the data is encoded in a manner similar to that described above and supplied to bits to symbol mapper circuit 504-1. As further described above, bits to symbol mapper circuit 504-1 maps the encoded data to symbols represented as XI+j*XQ (x polarization symbols) and Yl+j*YQ (y polarization symbols). The X and Y symbols are output from circuit 504-1 are supplied to a switch SW2, which selectively supplies such X and Y symbols to corresponding overlap and save buffers described above. In that case, the entire subcarrier, e.g., SC1-1, carries data associated with one of the secondary nodes. Such data is not time division multiplexed and the subcarrier does not also carry data intended for other secondary nodes, in this example.

If TDMA encoding is desired, however, the SC1-1 data is selectively output by switch SW1 to input block 1304-1 along with the data included in data streams SC1-2 to SC1-k. As described above, block 1304-1 outputs X and Y symbols that carry TDMA encoded information or data. Such TDMA encoded symbols are also supplied to switch SW2, which selectively supplies the received symbols to corresponding X polarization and Y polarization overlap and save buffers for further processing and generation of optical subcarrier SC1 in a manner similar to that described above. Thus, switch SW2 selectively supplies symbols output from either circuit 504-1 or 1304-1 to the X-pol and Y-pol overlap and save buffers noted above for further output.

Accordingly, DSP portion 1402 may selectively output TDMA encoded symbols or symbols that are not TDMA encoded so that subcarrier SC1, in this example, carries information or data that is also either TDMA encoded or not TDMA encoded based on the configuration of switches SW1 and SW2. It is understood that additional DSP portions having a structure and operation similar to that described above in connection with FIG. 14 may also be provided so that remaining subcarriers SC2 to SCn may selectively carry TDMA encoded information or non-TDMA encoded information, as shown in FIG. 13.

In a further example, the subcarrier carrying non-TDMA encoded information, e.g., SC1, carries information associated with a first secondary node 112 remote from the transmitter in primary node 110. Subcarrier, SC2, on the other hand, in this example, carries first and second TDMA encoded information during first and second time slots, respectively. The first time slots are associated with second and third secondary nodes 112, respectively.

Figure 15:
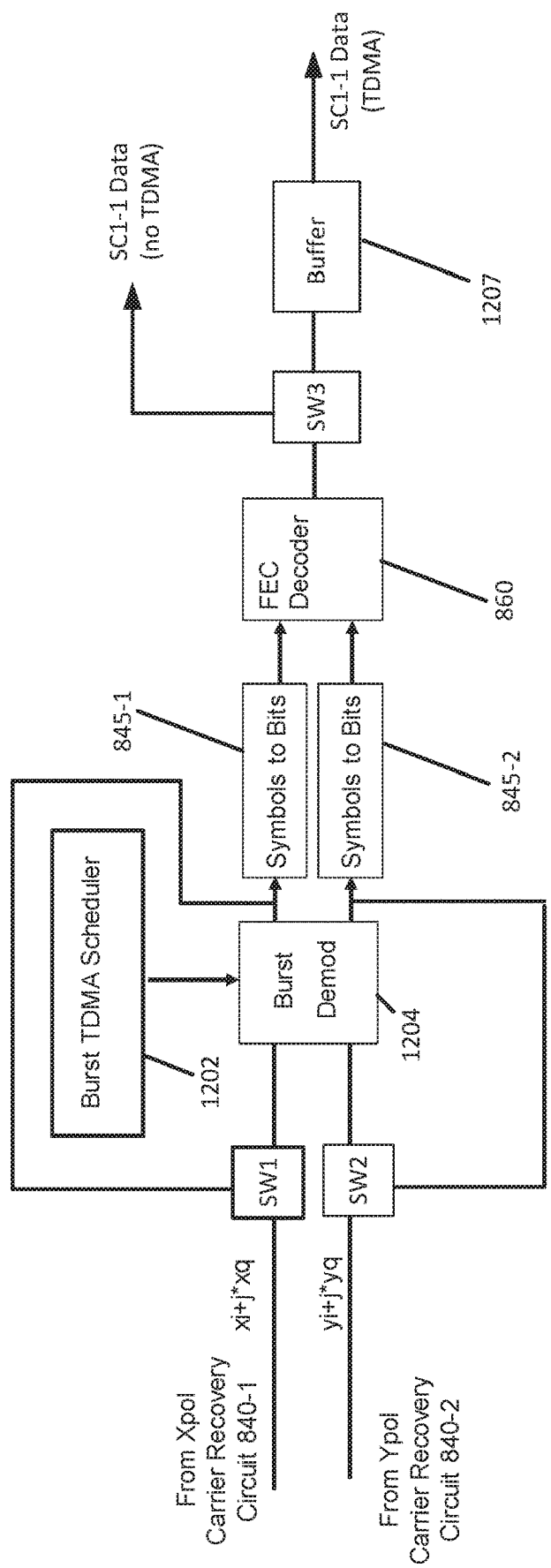
FIG. 15 shows a portion of a secondary node receiver for selectively receiving TDMA encoded data.

Selective processing of data carried by subcarrier SC1, for example, in a secondary node will next be described with reference to FIG. 15, in which the outputs of carrier recovery circuits 840-1 and 840-2 selectively carry TDMA encoded information or information that is not TDMA encoded. Namely, if the outputs of carrier recovery circuits 840-1 and 840-2 are TDMA encoded, switches SW1 and SW2 are configured to provide such outputs to burst demodulator circuit 1204, which, under the control of signals supplied by burst TDMA scheduler 1202, further processes and demodulates the outputs of circuits 840-1 and 840-2 in a manner to that described above in connection with FIG. 12 to output data associated with the particular time slots associated with the intended secondary node, namely, SC1-1 data, for example. If the outputs of circuit 840-1 and 840-2 are not TDMA encoded, switches SW1 and SW2 are configured to provide the outputs of the carrier recovery circuits 840 directly to symbol to bits circuits 845, bypassing burst demodulator 1204, such that the carrier recovery outputs are processed by symbol to bits circuits 845-1 and 845-2 and FEC decoder 860 in a manner similar to that described above in connection with FIG. 8 to output data to switch SW3. If the output from FEC decoder 860 is not associated with TDMA transmission to the secondary node, such data is output from switch SW3 directly to a user, for example. On the other hand, if the data is output based on TDMA encoded information transmitted to the secondary node, such data is supplied to buffer 1207, for example. As noted above, buffer 1207, in one example, accumulates data output from decoder 860 until the amount of data stored in buffer 1207 exceeds a threshold, which may indicate that a packet has been output from decoder 860. Once the threshold has been met or exceeded, buffer 1207 then outputs the data or user data stored therein to a user.

Control of switches SW1, SW2, and SW3 in the above examples may be based on control channel data or information carried either in-band or by an out-of-band channel, such as a subcarrier sideband or subcarrier dedicated to carrying such information, as noted above.

Consistent with a further aspect of the present disclosure, the secondary nodes may be oversubscribed, such that the collective capacity or bandwidth of the secondary nodes exceeds that of the primary node. Typically, however, it may not be necessary for all secondary nodes communicate with the primary node at the same time. Accordingly, based on control channel information exchanged between primary and secondary nodes in a manner similar or the same as that described above certain nodes may be activated or deactivated to receive or transmit data to thereby optimize usage of a network including such nodes.

In the examples described above in connection with FIG. 4-15, subcarriers are transmitted in the downlink. Uplink transmission of subcarriers from the secondary nodes to the primary node will next be described.

Figure 16:
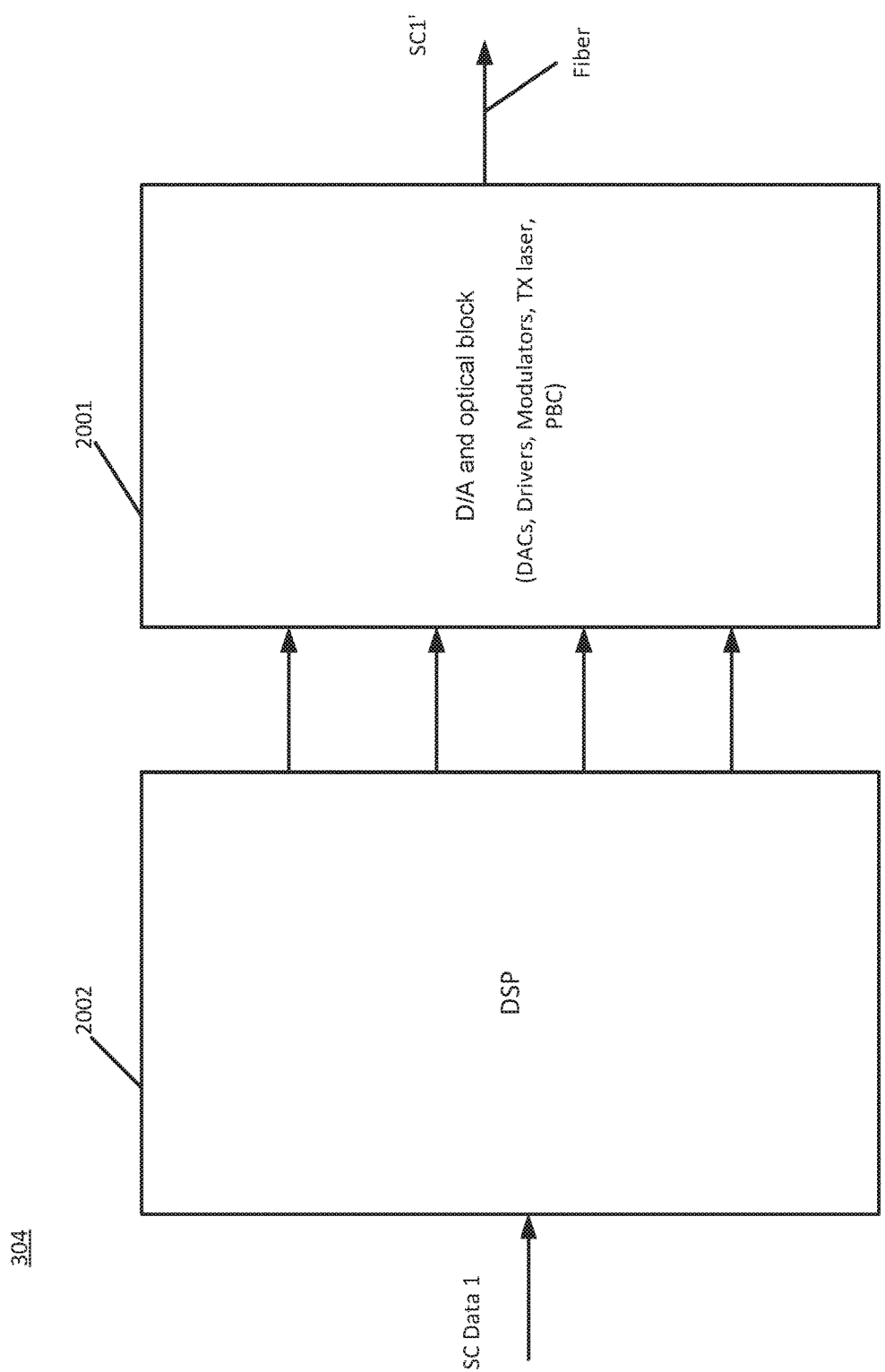
FIG. 16 shows a block diagram of a secondary node transmitter.

FIG. 16 shows secondary node transmitter 304 in greater detail. Transmitter 304 may include a DSP 2002 that receives input data SC Data 1'. Such input data is processed by D/A to supply electrical digital signals to D/A and optics block 2001 having similar structure as block 401 (see FIG. 4). Based on such digital signals, D/A and optics block 2001 may output a modulated optical signal. For example, D/A and optics block 2001, like block 401, includes D/A converter circuits, driver circuits and MZ modulators arranged and connected in a manner similar to that shown in FIG. 4 to output a modulated optical signal to primary node 110 based on digital signals output from DSP 2002. In the example shown in FIG. 20, however, the modulated optical signal includes one subcarrier, SC1', having X and Y polarization components instead of a plurality of subcarriers, as in the example shown in FIG. 4. In a further example, SC1' has frequency f1 and is output on a fiber different than the that which supplies subcarrier SC1 to at least one of secondary nodes 112.

Figure 17:
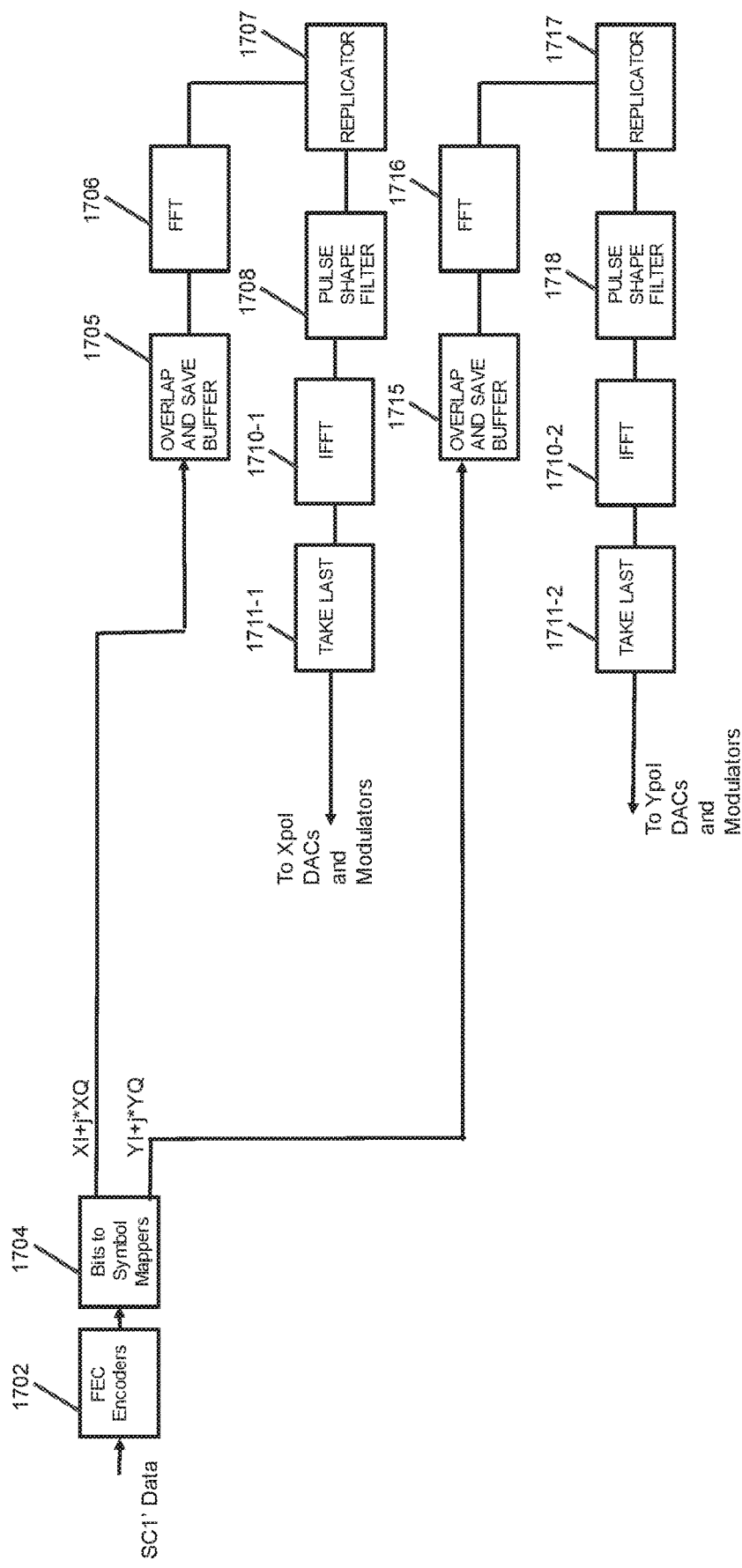
FIG. 17 shows a block diagram of a secondary node transmitter digital signal processor (DSP)

FIG. 17 shows DSP 2002 in greater detail. DSP 2002 may include FEC encoder 1702, which may receive an input data stream SC Data 1' from a data source and carry out error correction coding on the input data stream, such as through the addition of parity bits. FEC encoder 1702 may further provide timing skew between the subcarriers to correct for skew induced by link between nodes 110 and 112-1 to 112-n described above.

FEC encoder 1702 provides an output to bits-to-symbol circuit 1704, which may map the encoded bits to symbols on a complex plane. For example, bits to symbol circuits 1704 may map four bits to a symbol in a dual-polarization QPSK constellation. Bits to symbol circuits 1704 provides first symbols, having the complex representation XI+j*XQ, associated with SC Data 1'. Data indicative of such first symbols is carried by the X polarization component of the polarization multiplexed modulated optical signal output from D/A and optical block 2001.

Bits to symbol circuit 1704 may further provide second symbols, having the complex representation YI+j*YQ, also associated with SC Data 1'. Data indicative of such second symbols, however, is carried by the Y polarization component of the polarization multiplexed modulated optical signal output from D/A and optical block 2001.

As further shown in FIG. 17, each of the first symbols output from bits to symbol circuit 1704 is supplied to overlap and save buffer or memory 1705, which may buffer 256 symbols, for example. Overlap and save buffer 1705 may receive 128 of the first symbols or another number of such symbols at a time from bits to symbol circuit 1004. Thus, overlap and save buffer 1705 may combine 128 new symbols from bits to symbol circuit 1705, with the previous 128 symbols received from bits to symbol circuit 1705.

Overlap and save buffer 1705 supplies an output, which is in the time domain, to fast Fourier Transform (FFT) circuit 1706. In one example, the output includes 256 symbols or another number of symbols. FFT 1706 converts the received symbols to the frequency domain using, for example, a fast Fourier transform. FFT 1706 may include 256 memories or registers, also referred to as frequency bins, that store frequency components associated with the input symbols. Replicator component or circuit 1707 may replicate the 256 frequency components associated with FFT 1706 and store such components in 512 or another number of frequency bins (e.g., for T/2 based filtering of the subcarrier) in replicator component 1707. Such replication may increase the sample rate.

Pulse shape filter circuit 1708 may apply pulse shaping filtering to the data stored in the 512 frequency bins of replicator components 1707 to thereby provide a respective one of a plurality of filtered outputs, which are multiplexed and subject to an inverse FFT, as described below. Pulse shape filter circuits 1708 calculates the transitions between the symbols and the desired spectrum so that subcarrier SC1' may be packed together with other subcarriers on the channel or fiber, e.g., with a close frequency separation. Pulse shape filter circuit 1708 may also be used to introduce timing skew between the subcarriers to correct for timing skew induced by links between nodes shown in FIGS. 1b-1c, for example.

Next, IFFT circuit or component 1710-1 may receive an output from pulse shape filter 1708 and provide a corresponding time domain signal or data based on an inverse fast Fourier transform (IFFT). In one example, the time domain signal may have a same rate of 64 Giga Sample/s. Take last buffer or memory circuit 1711-1 may select the last 1724 or another number of samples from IFFT component 1710-1 and output the samples to DACs in D/A and optics box 2001 at a rate of 64 Giga Sample/s, for example. As noted above, block 2001 has a similar construction and has similar circuitry as block 401 discussed above in connection with FIG. 4. Accordingly, block 2001, like block 401 has a first DAC (similar to DAC 404-1) is associated with the in-phase (I) component of the X pol signal and a second DAC (similar to DAC 404-2) is associated with the quadrature (Q) component of the Y pol signal. Accordingly, consistent with the complex representation XI+jXQ, the first DAC receives values associated with XI and the second DAC receives values associated with jXQ. As noted above in connection with FIG. 4, based on these inputs, the DAC provide analog outputs to MZM driver circuits, respectively, as discussed above. As further noted above, such MZM driver circuits may also be provided in D/A and optics block 2001.

As further shown in FIG. 17, bits to symbol circuits 1704 outputs symbols indicative of data carried by the Y polarization component of the polarization multiplexed modulated optical signal output from D/A and optics block 2001.

As further noted above, these symbols may have the complex representation YI+j*YQ. Each such symbol may be processed by overlap and save buffer 1715, FFT circuit 1716, replicator component or circuits 1717, pulse shape filter circuit 1718, IFFT 1710-2, and take last buffer or memory circuit 1711-2, to provide processed symbols having the representation YI+j*YQ in a manner similar to or the same as that discussed above in generating processed symbols XI+j*XQ output from take last circuit 1711-1. In addition, symbol components YI and YQ are provided to third (e.g., DAC 404-3) and fourth (e.g., DAC 404-4) DACs, respectively, in D/A and optics block 2001. Based on these inputs, corresponding DACs provide analog outputs to respective MZM driver circuits in D/A and optics block 2001, respectively, as further discussed above in connection with FIG. 4.

While FIG. 17 shows DSP 2002 and block 2001 as including a particular quantity and arrangement of functional components, in some implementations, DSP 2002 and block 2001 may include additional functional components, fewer functional components, different functional components, or differently arranged functional components.

MZM driver circuits in D/A and optics block 2001 (see FIG. 16) drive the MZ modulators to modulate light or an optical signal output from a laser, also included in D/A optics block 2001 (similar to laser the Tx laser discussed above in connection with FIG. 4), optical subcarrier SC1' is output onto an optical fiber, which is coupled to the secondary node 112. In one example, each of additional subcarriers SC2' to SCn' may be provided in a similar fashion from respective secondary nodes 112 in FIGS. 1b-1d and 2. In a further example, subcarriers SC1' to SCn' output from such secondary nodes are combined or aggregated and supplied to receiver circuit 204 in primary node 110 (see FIG. 3). Receiver circuit 204 will next be described with reference to FIG. 18.

Figure 18:
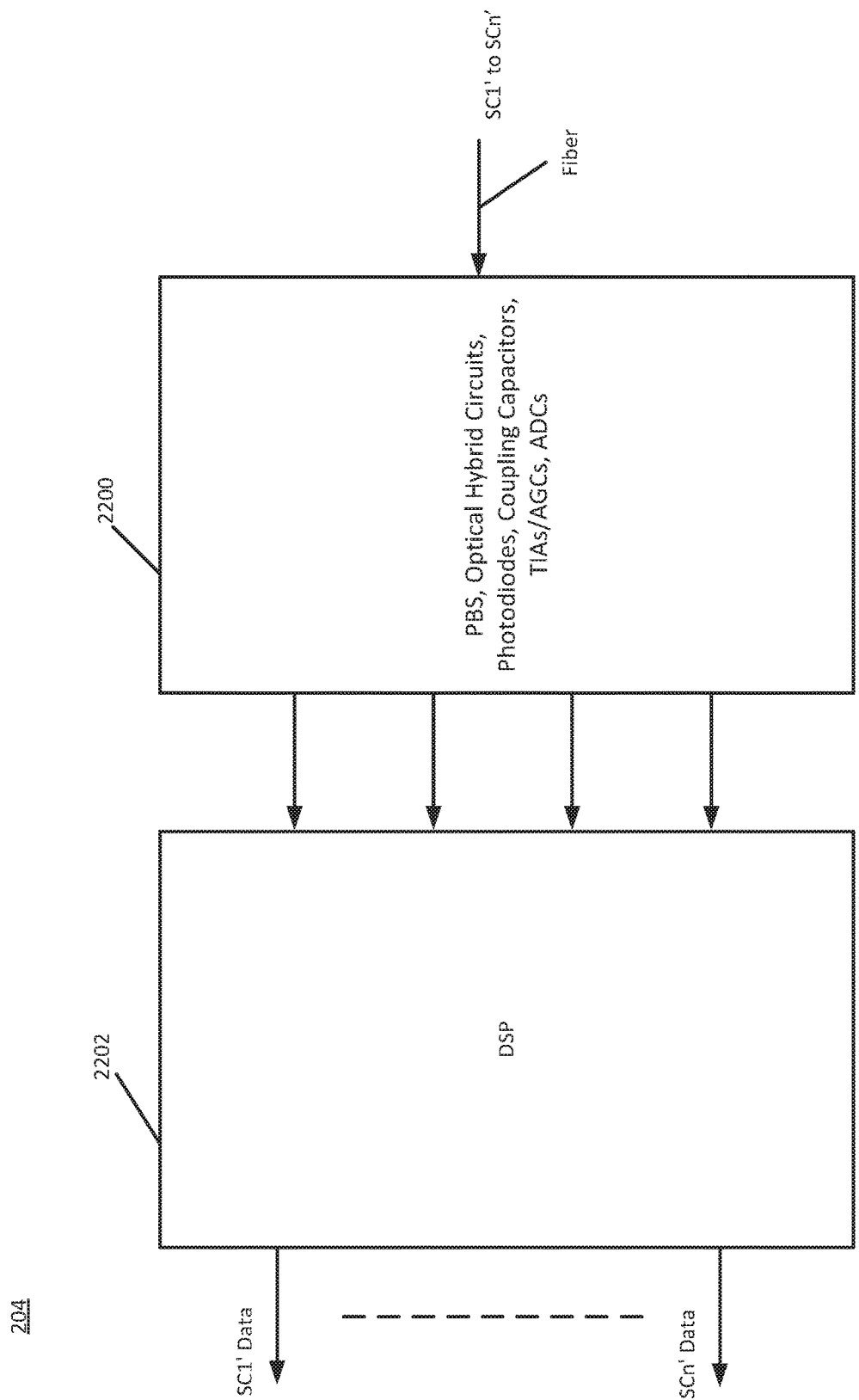
FIG. 18 shows a block diagram of a primary node receiver.

As shown in FIG. 18, primary node receiver circuit 204 may include Rx optics and ND block 2200 having a similar construction as Rx optics and ND block 600 shown in FIG. 6. For example, Rx optics and ND block 2200 includes a polarization beam splitter local oscillator, 90-degree optical hybrids, detectors (each including either a single photodiode or balanced photodiode), AC coupling capacitors, transimpedance amplifiers/automatic gain control circuits, and analog to digital conversion circuits. Each of these circuits and components may be configured and connected as shown in FIG. 6.

In a manner similar to that described above in connection with FIG. 6, block 2200 carries out coherent detection to supply digital samples XI, XQ, YI, and YQ corresponding to the X polarization in-phase component, X polarization quadrature component, Y polarization in-phase component, and Y polarization quadrature component, respectively. Unlike Rx optics and A/D block 600, however, block 2200 in primary node 110 supplies XI, XQ, YI, and YQ digital samples associated with an aggregated plurality of subcarriers SC1' to SCn' output from secondary nodes 112. Based on the received digital samples, DSP 2202 outputs data SC'Data-1 to SC'Data-n carried by a respective one of subcarriers SC1' to SCn'. Processing of the digital samples output from block 2200 will next be described in greater detail with reference to FIG. 19, which shows examples of various circuits included DSP 2202.

DSP 2202 comprises Rx DSP portion 1903, which includes overlap and save buffers 1905-1 and 1905-2, FFT components or circuits 1910-1 and 1910-2, demultiplexer components or circuits 1911-1 and 1911-2, chromatic dispersion (CD) equalizer components (CDEQs) or circuits 1912-1-1 to 1912-1-n and 1912-2-1 to 1912-2-n, polarization mode dispersion (PMD) equalizer components or circuit 1925-1 to 1925-n, IFFT components or circuits 1930-1-1 to 1930-1-n (associated with the X pol of each subcarrier) and 1930-2-1 to 1930-2-n (associated with the Y polarization of each subcarrier), carrier recovery components or circuits 1940-1-1 to 1940-1-n (associated with the X pol of each subcarrier) and 1940-2-1 to 1940-2-n (associated with the Y polarization of each subcarrier), symbols to bits components 1945-1-1 to 1945-1-n (associated with the X pol of each subcarrier) and 1945-2-1 to 1945-2-n (associated with the Y polarization of each subcarrier), and FEC decoders 1960-1 to 1960-n.

As noted above, analog-to-digital (A/D) circuits in Rx A/D and optics block 1100 output digital samples corresponding to the analog inputs supplied thereto. In one example, the samples may be supplied by each ND circuit at a rate of 64 Giga Samples/s. The digital samples correspond to symbols carried by X polarization component of each optical subcarrier SC1' to SCn' and may be represented by the complex number XI+jXQ. The digital samples may be input to Rx DSP portion 1903 and provided to overlap and save buffer 1905-1. In one example, the FFT component 1910-1 receives the 2048 vector elements, for example, from the overlap and save buffer 1905-1 and convert the vector elements to the frequency domain using, for example, a fast Fourier transform (FFT). The FFT component 1910-1 may convert the 2048 vector elements to 2048 frequency components, each of which is stored in a register or "bin" or other memory, as a result of carry outing the FFT.

The frequency components are then supplied to a demultiplexer circuit 1911-1 which provides an output to each of chromatic dispersion equalizer circuits CDEQ 1912-1-1 to 1912-1-n, each of which may include a finite impulse response (FIR) filter that corrects, offsets or reduces the effects of or errors associated with chromatic dispersion of the transmitted optical subcarriers SC1' to SCn', in this example.

Figure 19:
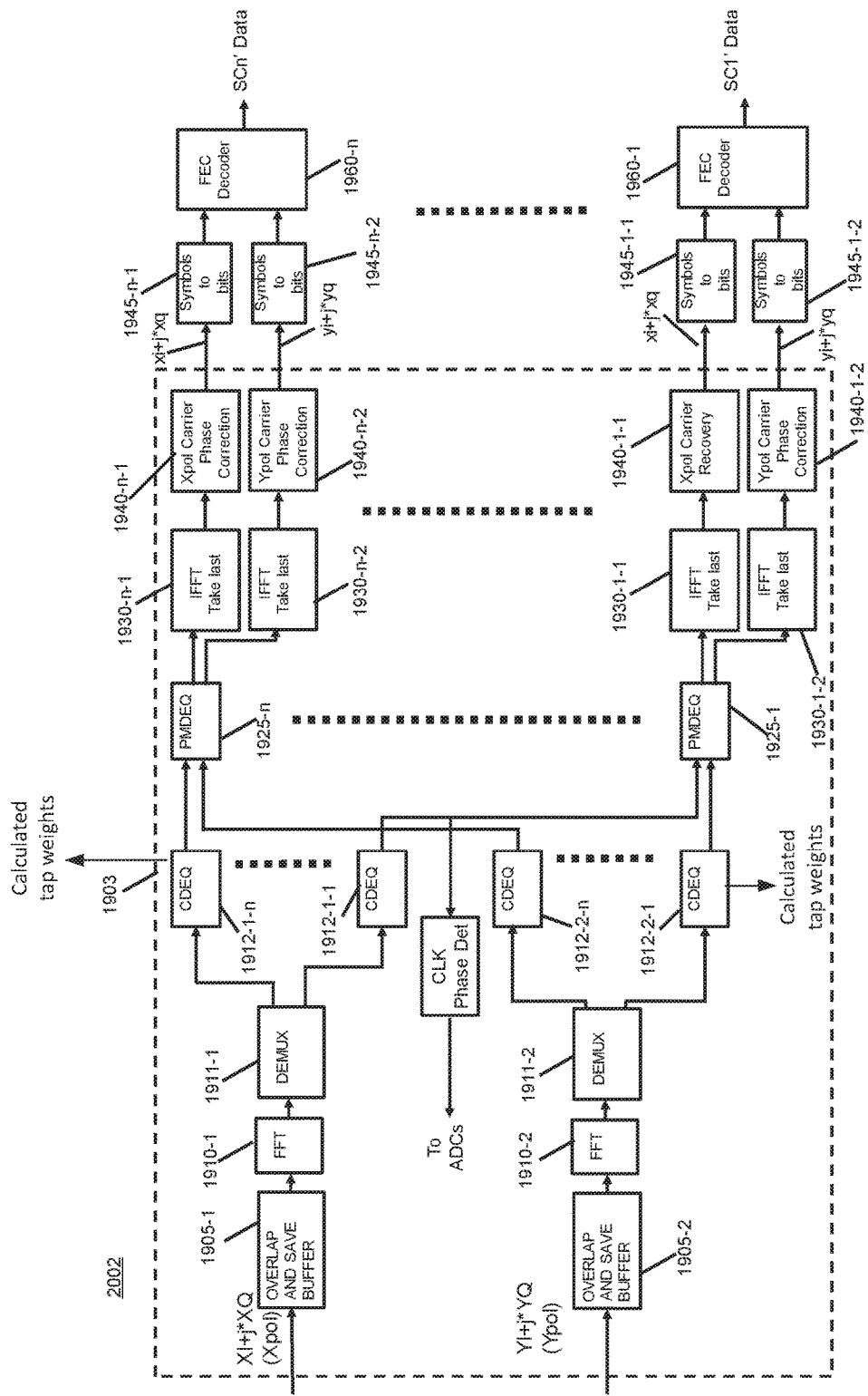
FIG. 19 shows a block diagram of a primary node receiver DSP.

As further shown in FIG. 19, overlap and save buffer 1905-2 receives digital symbols represented by the complex notation YI+j*YQ. Overlap and save buffer 1905-2, FFT 1910-2 and demultiplexer circuit 1911-2 have the same or similar structure and operate in the same or substantially the same way as buffer 1905-1, FFT 1910-1 and 1911-1 to provide a plurality of outputs, each of which being supplied to a respective one of CDEQ circuits 1912-2-1 to 1912-2-n.

Each pair of outputs of the CDEQ circuits is supplied to a corresponding one of PMDEQ circuits 1925-1 to 1925-n. One output of the pair corresponds to the X polarization component of a respective one of subcarriers SC1' to SCn', and the other output of the pair corresponds to the Y polarization signal of that subcarrier. For example, CDEQ circuits 1912-1-1 and 1912-2-1 operate in a manner similar that described above to supply outputs to PMDEQ circuit 1925-1, and CDEQ circuit 1912-n-1 and 1912-n-2 supply outputs to PMDEQ circuit 1925-1-n. Each of PMDEQ circuits 1925-1 to 1925-n may include an FIR filter, for example, to correct, offset, or reduce effects of PMD, in a manner similar to that described above. Each of PMDEQ circuits 1925-1 to 1925-n supplies a further pair of outputs to a corresponding pair of IFFT circuits 1930-1-1, 1930-1-2; 1930-2-1, 1930-2-2; . . . 1930-n-1, 1930-n-2. The IFFT circuits operate in a manner similar to that described above to provide time domain data to corresponding pairs of carrier recovery circuits 1940-1-1, 1940-1-2; 1940-2-1, 1940-2-2; . . . 1940-n-1, 1940-n-2. The carrier recovery circuits operate in a manner similar to the carrier recovery circuits described above. One circuit in each carrier recovery pair provides recovered symbols having the complex representation $xi+j*xq$ associated with the X polarization component and the other circuit in the pair outputs recovered symbols having the complex representation $yi+j*yq$ associated with the Y polarization component of each of subcarriers SC1' to SCn'. Such x and y symbols are provided to corresponding symbols to bits circuits, such that the x symbols ($xi+j*xq$) supplied from each of carrier recovery circuits 1940-1-1 to 1940-n-1 is provided to a corresponding one of symbols to bits circuits 1945-1-1 to 1945-n-1, and the y symbols ($yi+j*yq$) supplied from each of carrier recovery circuits 1940-1-2 to 1940-n-2 is provided to a corresponding one of symbols to bits circuits 1945-1-2 to 1945-n-2. Such symbols to bits circuits map the received symbols back to bits in a manner similar to that described above.

As further shown in FIG. 19, FEC decoder circuits 1960-1 to 1960-n are provided to provide forward error correction decoding of the outputs from pairs of the symbols to bits circuits in a manner similar to that described above. For example, FEC decoder 1960-1 receives outputs from bit to symbol pair 1945-1-1 and 1945-1-2; FEC decoder 1960-2 receives outputs from bit to symbol pair 1945-2-1 and 1945-2-2; . . . FEC decoder 1960-n receives outputs from bit to symbol pair 1945-n-1 and 1945-n-2. Each of FEC decoders 1960-1 to 1960-n, in turn outputs data associated one of SC1' to SCn', namely a respective one of data streams SC1' Data to SCn' Data.

While FIG. 19 shows DSP 2202 as including a particular quantity and arrangement of functional components, in some implementations, DSP 2202 may include additional functional components, fewer functional components, different functional components, or differently arranged functional components.

In a further example, information or data carried by the upstream subcarriers SC1' to SCn' may be TDMA encoded in the secondary nodes and decoded in the primary node. Such encoding, decoding, and transmission will next be described with reference to FIGS. 20-22.

Figure 20:
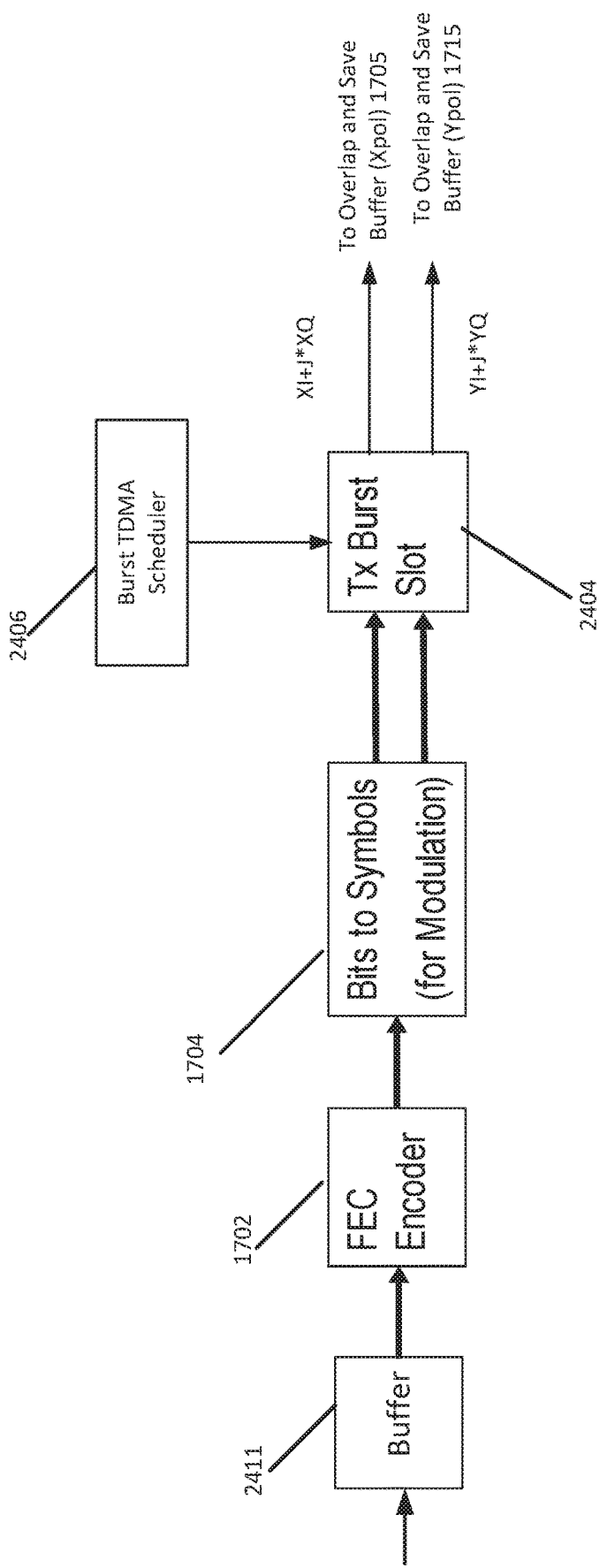
FIG. 20 shows an example of a burst TDMA scheduler and burst slot circuit included in secondary node transmitter DSP.

FIG. 20 shows an example in which a burst TDMA scheduler 2406 and burst slot circuit 2404 are included in secondary node DSP 2202 to facilitate TDMA encoding of the data or information carried by subcarrier SC1', for example, in an upstream direction to primary node 110. In the example shown in FIG. 20, buffer 2411 receives data or user data SC1-1Data' from a user, for example, and when a time slot is available, outputs the data to FEC encoder 1702. FEC encoder 1702 encodes the received data in a manner similar to that described above and supplies the encoded data to bit to symbol mapping circuitry 1704, which, in turn supplies symbols, as further described above in connection with FIG. 17. In FIG. 20, however, the outputs of bits to symbol mapper 1704 are provided to a Tx burst slot buffer circuit 2404, which, under the control of a signal output from burst TDMA scheduler 2406 or based on control signals output from such scheduler, temporarily stores the received X symbols ($XI+j*XQ$) and Y symbols ($YI+j*YQ$) and outputs such symbols for transmission during designated time slots. The symbols are next supplied to overlap and save buffers 1705 and 1715 for further processing to generate (as described above) at least one optical subcarrier SC1', for example, that carries data indicative of such symbols during the designated time slots. Other secondary nodes, for example, include circuitry similar to that shown in FIG. 20 to output optical subcarrier SC1', but carrying data during time slots different than such designated time slots. Each secondary node is assigned particular time slots, such that upstream optical subcarrier SC1' is shared by multiple secondary nodes.

Figure 21:
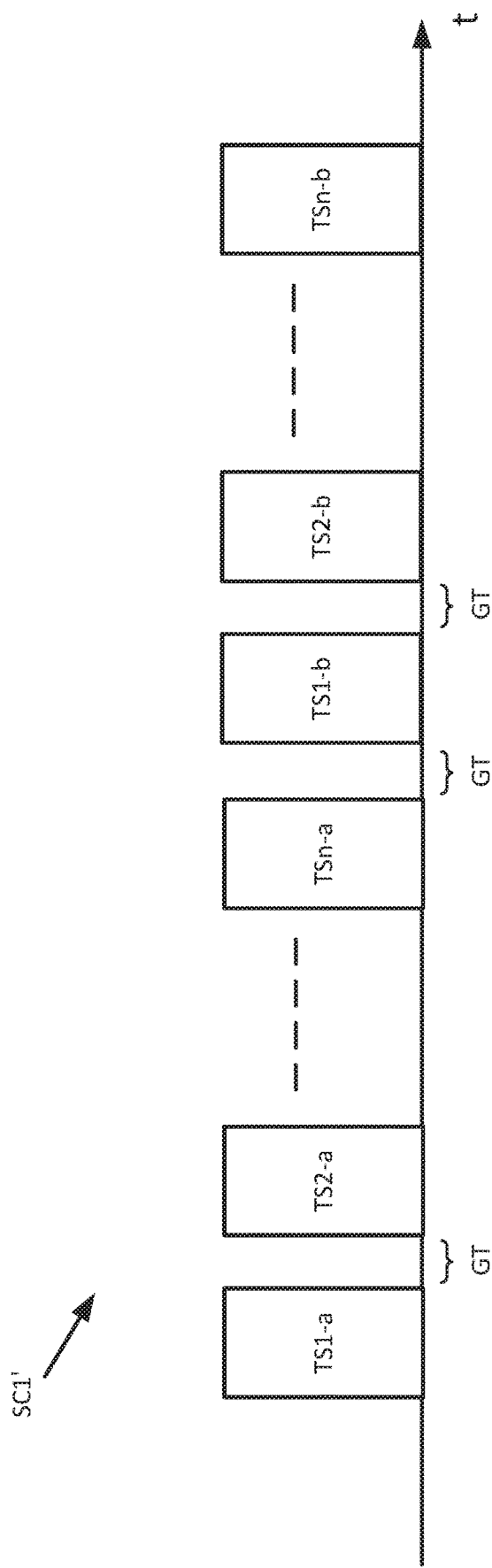
FIG. 21 shows transmission of data or information in time slots TS, consistent with an aspect of the present disclosure.

For example, FIG. 21 shows transmission of data or information in time slots TS, consistent with an aspect of the present disclosure. Here, secondary node 112-1, for example, outputs data or information on subcarrier SC1', during time slots TS1-*a* and TS1-*b*, whereas secondary nodes 112-2, for example, outputs data or information on subcarrier SC1' during time slots TS2-*a* and TS2-*b*. In a similar manner, other secondary nodes 112 also output data or information during designated time slots, such as secondary node 112-n, which outputs data or information during time slots TSn-a and TSn-b.

In a further example, so-called guard time GT intervals may be provided between time slots in the uplink direction, for example, such as time slots adjacent one another in time (e.g., between time slots TS1*a* and TS2*a* in FIG. 21), so that the time slots during which data is transmitted do not overlap temporally with one another. The outputs of each secondary node may be combined by a multiplexer or combiner, as shown in FIGS. 1c and 1d, which combines or multiplexes each received output onto a common optical fiber for transmission to the primary node. As a result, for example, the primary node may receive an a time division multiplexed or TDMA encoded optical subcarrier carrying a plurality of time slots, each of which or groups of which are associated with and carrying information indicative of data provided to a corresponding one of the secondary nodes.

Figure 22:
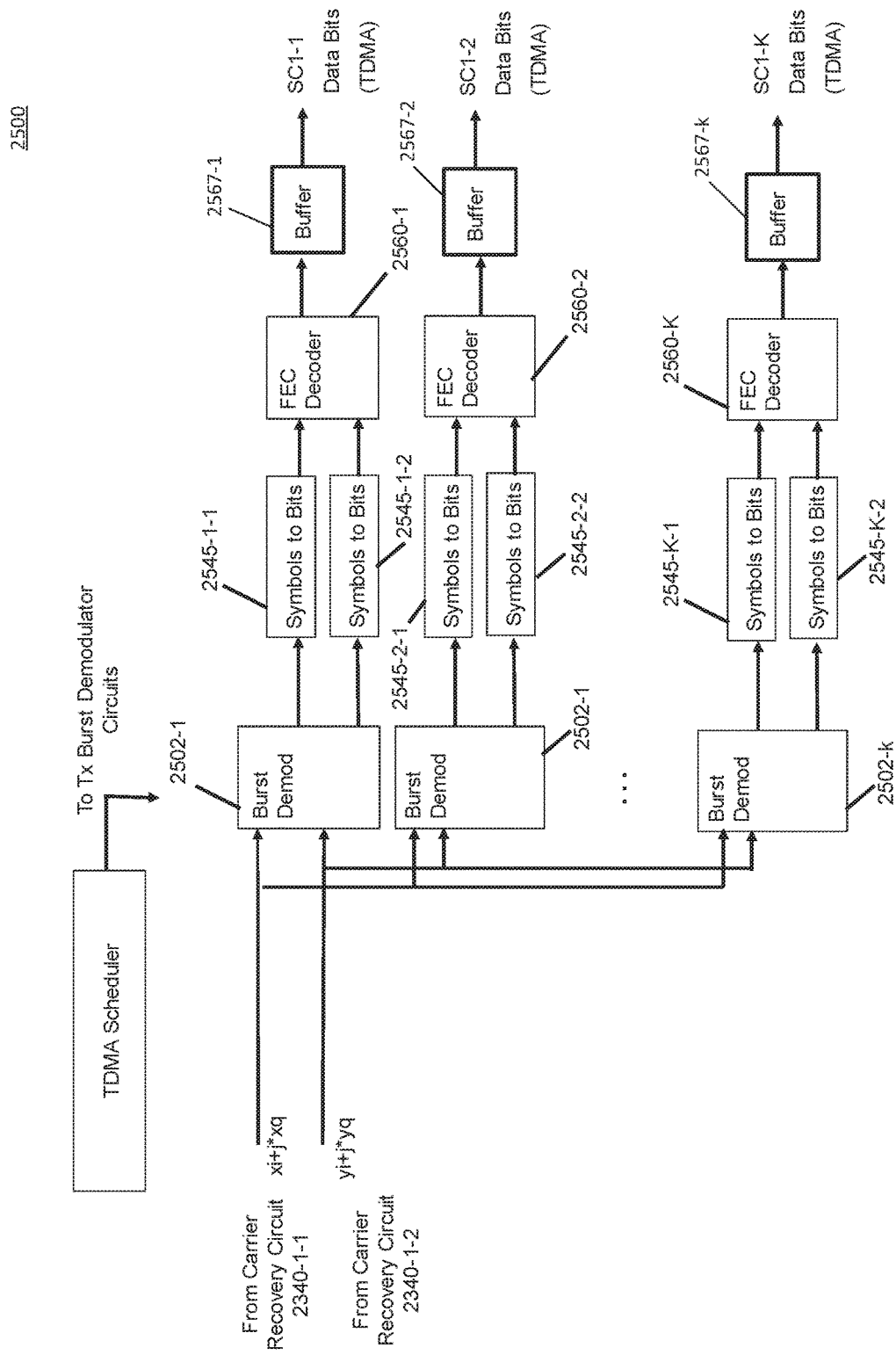
FIG. 22 shows an example of primary node receiver TDMA decoding circuitry associated with one subcarrier consistent with a further aspect of the present disclosure.

FIG. 22 shows an example of TDMA decoding circuitry 2500 associated with one of subcarriers, SC1', in DSP 2202 of primary node receiver 204 consistent with a further aspect of the present disclosure. It is understood that remaining TDMA encoded subcarriers SC2' to SCn' are decoded, for example, with circuitry similar to TDMA decoding circuitry 2502.

As shown in FIG. 22, TDMA decoding circuitry 2500 in primary receiver 204 may receive outputs $xi+j*xq$ ("X symbols" associated with the X polarization) and $yi+j*yq$ ("Y symbols" associated with the Y polarization) carrier recovery circuits 2340-1-1 and 2340-1-2, respectively. The operation of such carrier recovery circuits is described above in connection with FIG. 23. TDMA decoding circuitry 2500 includes burst demodulators 2502-1 to 2502-k that receives X and Y symbols from carrier recovery circuits 2340-1-1 and 2340-1-2, respectively. In particular, electrical signals corresponding to the X symbols are input to burst demodulators 2502-1 to 2502-k. Further, electrical signals corresponding to the Y symbols are also input to burst demodulators 2502-1 to 2502-k. TDMA scheduler circuit 2403 supplies corresponding control signals or data to each burst demodulator circuit 2401-1 to 2401-K, such that X and Y symbols during designated time slots unique to a corresponding one of burst demodulators 2502-1- to 2502-k, and thus unique to a particular secondary node, are supplied or output to a respective one of symbol to bit circuit pairs 2545-1,2545-1-2 to 2545-k-1, 2545-k-2. Symbols in time slots other than the designated time slots are not output. Accordingly, for example, based on a control signal output from TDMA scheduler 2503 to burst demodulator 2502-1, X and Y symbols in a time slot indicated by the control signal are output from burst demodulator 2502-1 to symbols to bits circuits 2545-1-1, 2545-2. Symbols in other time slots are not output from other burst demodulators. Further processing of such symbols by FEC decoders 2560-1 to 2560-k and buffers 2567 is similar to that described above in connection with FIG. 12 to thereby output data streams S1-1 Data Bits' to SC1-k Data Bits', which collectively constitute SC1 Data' associated with subcarrier SC1'.

Figure 23:
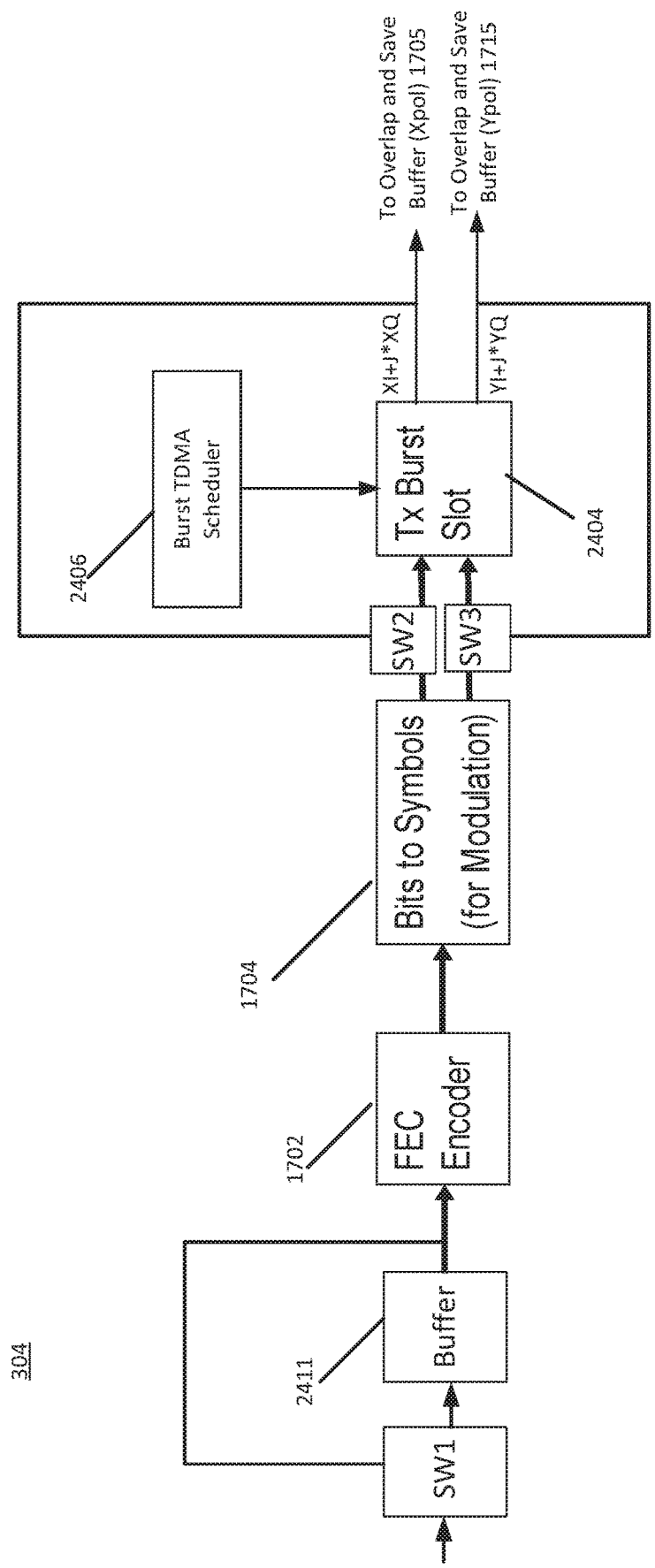
FIG. 23 shows an example of a secondary node transmitter 304 consistent with a further aspect of the present disclosure.

FIG. 23 shows an example of a secondary node transmitter 304 consistent with a further aspect of the present disclosure. The secondary node transmitter shown in FIG. 23 is similar to that shown in FIG. 20 with the exception that the transmitter shown in FIG. 23 includes switches SW1 to SW3 to facilitate selective transmission of TDMA encoded signals or signals not subject to TDMA encoding. Namely, if the signals to be transmitted are not TDMA encoded, switch SW1 is configured to direct data such that the data is bypassed around buffer 2411. In addition, switches SW1 and SW2 are similarly configured to route symbols output from bits to symbols circuit 1704 around Tx burst slot buffer circuit 2404 and output to overlap and save buffers 1705 and 1715. If TDMA encoded is desired, however, switch SW1 is configured to feed incoming data to buffer 2411. In addition, switches SW1 and SW2 are configured to supply data output from bits to symbols circuit 1704 to Tx burst slot buffer circuit 2404, and circuits 2411, 1702, 1704, and 2404 operate in a manner as described above in connection with FIG. 20 to supply TDMA symbols to overlap and save buffers 1705 and 1715.

Figure 24:
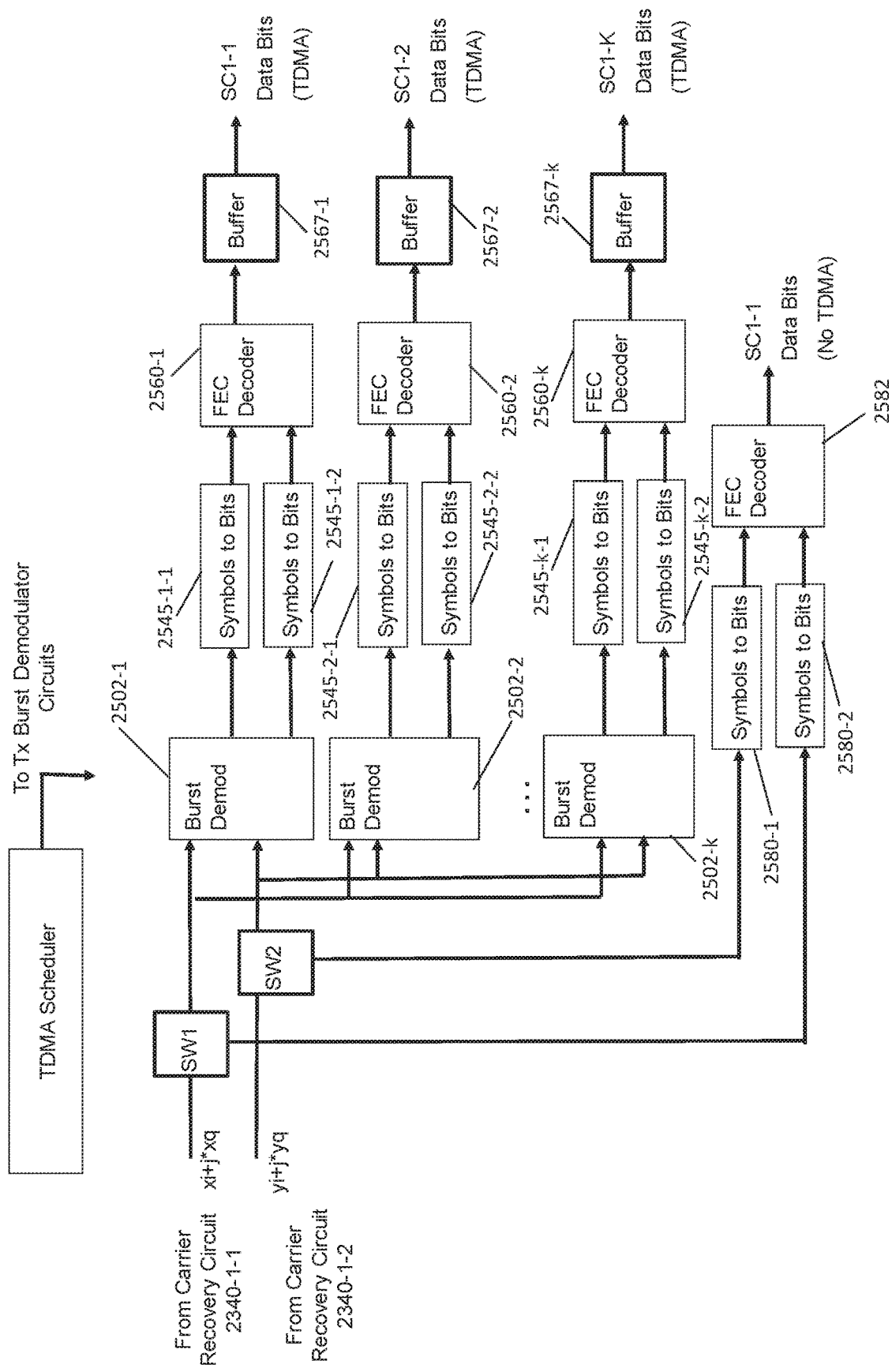
FIG. 24 shows a further example of a primary node receiver.

FIG. 24 shows an example of a primary node receiver 2500 similar to that shown in FIG. 22. In FIG. 24, however, primary node receiver may selectively receive and process signals output from the secondary node which are either TDMA encoded not subject to TDMA encoding. Accordingly, in order to realize selective processing of TDMA and non-TDMA encoded signals, switches SW1 and SW2 are provided that receive X symbols and Y symbols respectively from carrier recover circuits 2340-1-1 and 2340-1-2, respectively. If TDMA signal are received, switches SW1 and SW2 are configured to supply the X and Y symbols burst demodulators 2502, symbol to bits circuits 2545, FEC decoders 2560 and buffers 2567 to outputs data SC1-1 to SC1-k in a manner similar to that described above in connection with FIG. 22. On the other hand, if one of the secondary nodes does not supply TDMA encoded signal, but a signal that is generated in a manner similar to that described above in connection with FIG. 17, i.e., signals which are not TDMA encoded, switches SW1 and SW2 are configured to direct the X and Y symbols to bits circuits 2580-1 and 2580-2, respectively, thereby bypassing burst demodulators 2502 and the associated TDMA processing. Symbols to bits circuits 2580-1 and 2580-2, as well as FEC decoder 2582 operate in a manner similar to that described above in connection with symbols to bits and FEC decoder circuits shown in FIGS. 8 and 19. In one example, if TDMA encoding is not employed, one of the secondary nodes will transmit data on a subcarrier to the primary node receiver. Such subcarriers will be dedicated to that secondary node and will not carry data output from the remaining secondary nodes.

Consistent with a further aspect of the present disclosure, certain subcarriers, such as subcarriers SC1 to SCn shown in FIGS. 1 and 7, may carry user data and OAM information. In addition to or instead of the OAM information described above, the subcarriers may also carry information in a downlink direction to the secondary nodes 112. Such additional information includes, for example, information provided to DSP 650 to assist in carrier recovery, i.e., carrier recovery information. In a further example, such carrier recovery information includes one or more of: chromatic dispersion information, e.g., information indicative of the amount of chromatic dispersion experienced by one or more of subcarriers SC1 to SCn; clocking or timing information provided to the burst demodulator circuits, for example, to identify time slots associated with a particular secondary node or assign time slots to a specific secondary node; and optical phase information associated with one or more subcarriers SC1 to SCn. OAM and carrier recovery information may be provided as inputs to DSP 402 in primary node 110 and may be included in one or more of SC Data 1 to SC Data n in FIGS. 4, 5, 9, and 10.

In a further example, certain subcarriers SC1 to SCn carry user data exclusively, while other subcarriers carry one or more of OAM and carrier recovery information. In another example, certain subcarriers SC1 to SCn carry user data exclusively without OAM or carrier recovery information, and other subcarriers exclusively carry one or more of OAM, control, and carrier recovery information but no user data. Each of OAM information and carrier recovery information may be considered control information.

By transmitting carrier recovery information, such as chromatic dispersion information, for example, to secondary nodes 112, DSPs 650 in the secondary nodes need not calculate such information. Accordingly, power consumption by DSPs 650 may be reduced relative to the power consumption by such DSPs when such information is calculated.

Consistent with a further aspect of the present disclosure, certain subcarriers, such as subcarriers SC1 to SCn shown in FIGS. 1 and 7, may carry user data and OAM information. In addition to or instead of the OAM information described above, the subcarriers may be used by the primary node to extract information on the uplink direction from the secondary nodes 112. Such additional information includes, for example, information provided to DSP 650 to assist in carrier recovery, i.e., carrier recovery information. In a further example, such carrier recovery information includes one or more of: chromatic dispersion information, e.g., information indicative of the amount of chromatic dispersion experienced by one or more of subcarriers SC1 to SCn; clocking or timing information provided to the burst demodulator circuits, for example, to identify time slots associated to a particular secondary node or assigned time slots to a specific secondary node; and apply the extracted carrier recovery information such as optical phase information associated with one secondary node and apply it directly to a subcarrier that is shared by more than one secondary node. This OAM and carrier recovery information may be provided as inputs to DSP 402 in primary node 110 and may be applied to one or more of SC Data 1 to SC Data n in FIGS. 4, 5, 9, and 10.

In a further example, certain subcarriers SC1 to SCn carry user data exclusively, while other subcarriers carry one or more of OAM and carrier recovery information. In another example, certain subcarriers SC1 to SCn carry user data exclusively without OAM or carrier recovery information, and other subcarriers exclusively carry one or more of OAM, control, and carrier recovery information but no user data. Each of OAM information and carrier recovery information may be considered control information and applied to the timeslots of a subcarrier shared by more than one secondary node.

By extracting the carrier recovery information, such as chromatic dispersion information subcarriers assigned to a secondary node 112, the primary node can apply this carrier recovery information to the DSPs 650 to recover allocated timeslots on a subcarrier that is shared by more than one secondary nodes and not need to recover such information on that shared subcarrier. Accordingly, the primary node can apply the appropriate carrier recovery information associated with each secondary node eliminating the time required to re-acquire this recovery information thereby increasing the bandwidth utilization of shared subcarriers.

In a further example, the carrier recovery information includes tap weights that may be supplied to CDEQ circuits 812-1 and 812-2 in secondary nodes 112 to equalize or compensate for chromatic dispersion that may occur during transmission from the primary node 110 to the secondary nodes 112. Generation of tap weights are described below.

Figure 25:
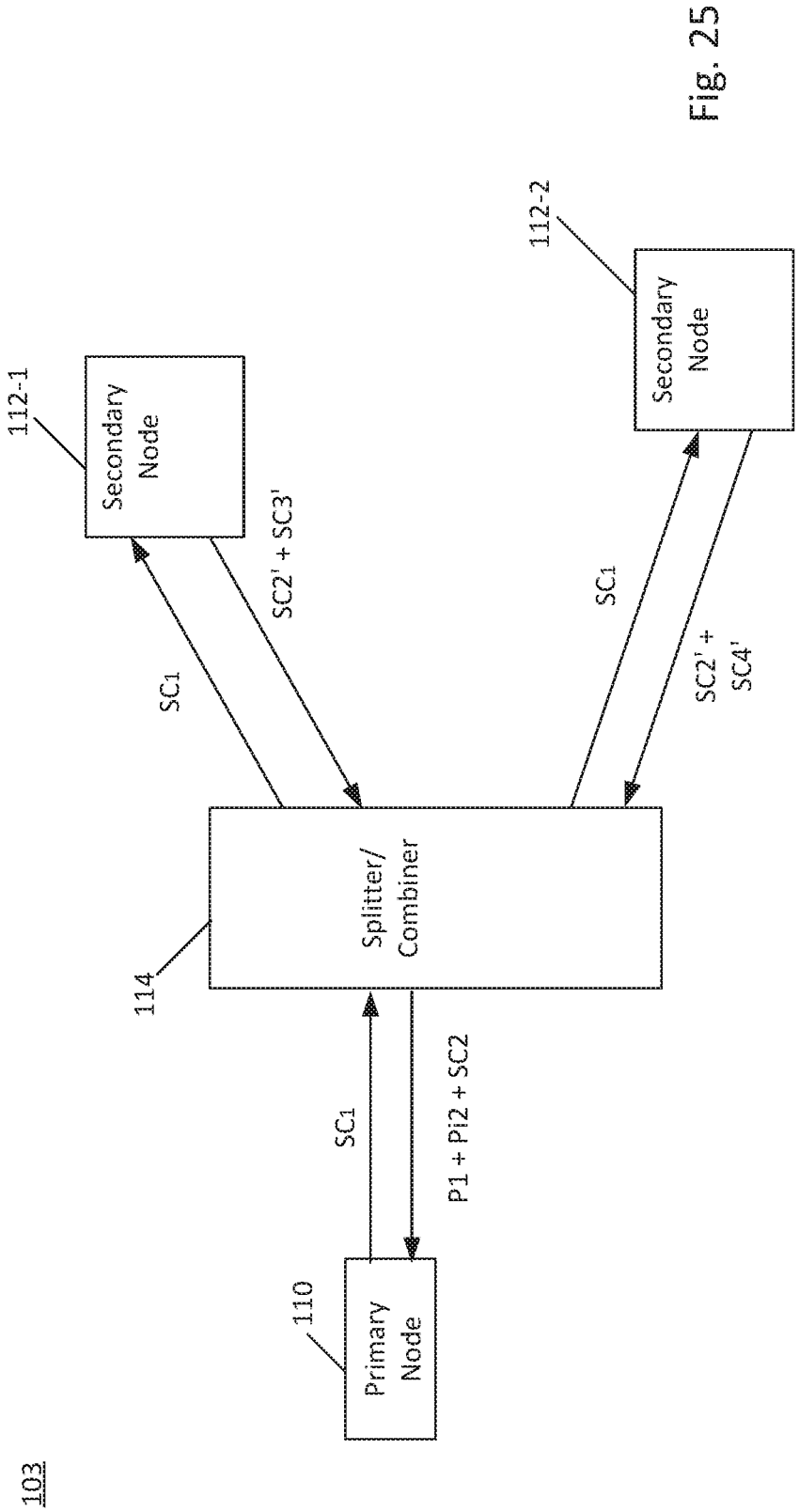
FIG. 25 shows a simple block diagram of a system consistent with an aspect of the present disclosure.

Generation of carrier recovery information and sharing such information will next be described, by way of example and for ease of explanation, with reference to FIGS. 25-28. FIG. 25 shows a block diagram of a system 103 including a primary node 110 that transmits an optical subcarrier SC1 to a splitter/combiner 114, which, in turn, splits the subcarrier SC1 into a first power split portion supplied to secondary node 112-1 and a second power split portion, for example, to secondary node 112-2. Primary node 110 may output data intended for secondary node 112-1 during first time slots and data intended for secondary node 112-2 during second time slots in a manner similar to that described above. Secondary nodes 112-1 and 112-2 process such data in a manner further described above to provide user data outputs.

Figure 26:
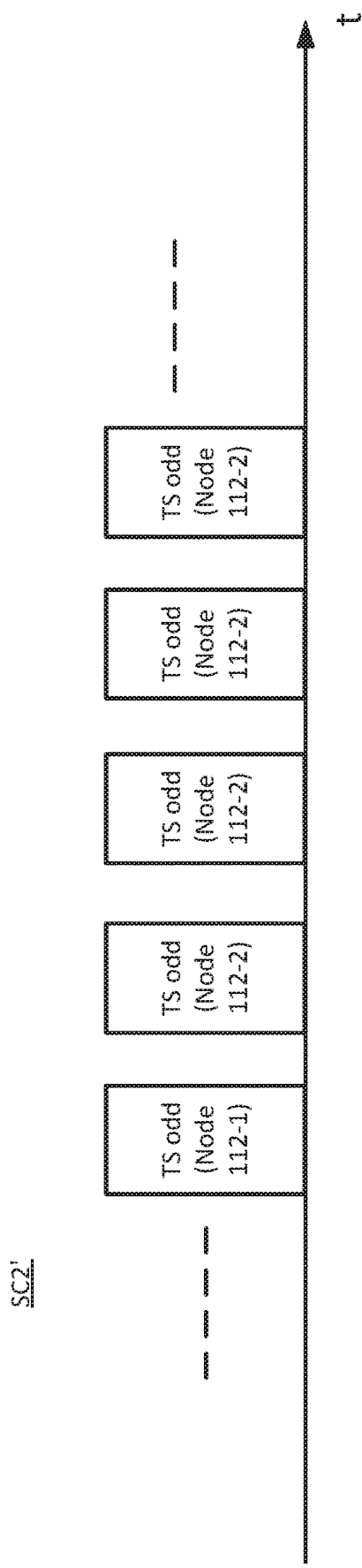
FIG. 26 shows time slots consistent with a further aspect of the present disclosure.

Secondary nodes 112-1 and 112-2 transmit, during respective time slots, information on subcarrier SC2', such that subcarrier SC2' is shared between secondary node 112-1 and secondary node 112-2. For example, as shown in FIG. 26, during "odd" time slots, subcarrier SC2' carries information associated with secondary node 112-1 to primary node 110, via combiner 114, and during "even" time slots, subcarrier SC2' carries information associated with secondary node 112-2 to primary node 110 via combiner 114.

Figure 27:
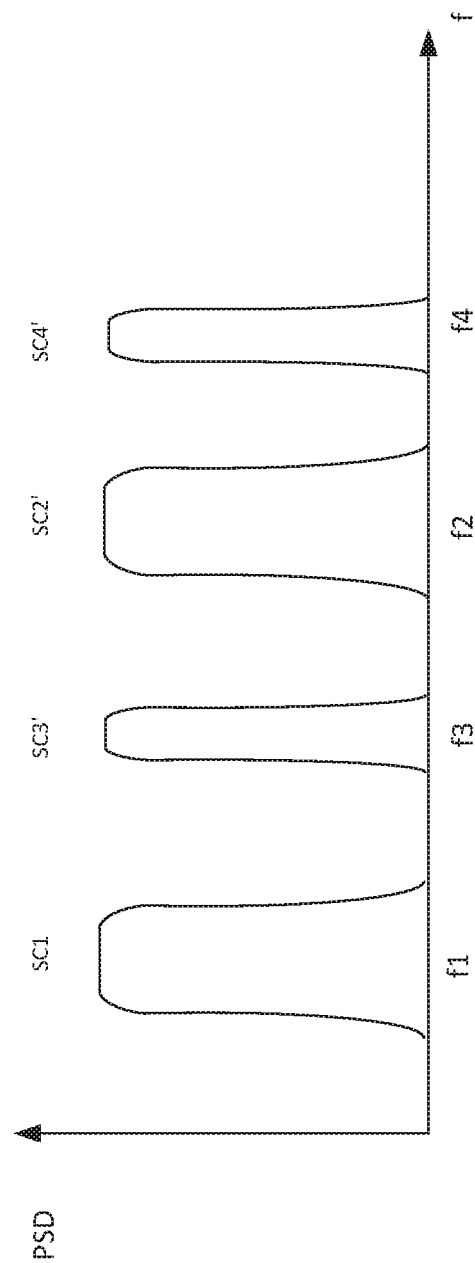
FIG. 27 shows a further example of a power spectral density plot consistent with the present disclosure.

Secondary node 112-1 and secondary node 112-2 also respectively output pilot signals SC3' and SC4' each of which being a subcarrier that carries limited information or information at a reduced rate compared to subcarriers SC1 and SC2'. FIG. 27 is a power spectral density (PSD) plot illustrating subcarriers SC1 and SC2'-SC4' and their corresponding frequencies.

As noted above with respect to FIG. 19, received subcarriers at primary node are processed and corresponding symbols associated with each subcarrier are subject to chromatic dispersion (CD) equalization by CDEQs 1912. In one example, CDEQs 1912-1-3 and 1912-2-3 carry out CD compensation in connection with the X and Y components, respectively, of pilot signal SC3', and CDEQs 1912-1-4 and 1912-2-4 carry out CD compensation in connection with the X and Y components, respectively, of pilot signal SC4'.

CDEQs 1912 typically include FIR filters, as noted above. A block diagram showing features of an example FIR filter 2600 is shown in FIG. 27. It is understood that, in one example, remaining CDEQs 1912-1-2 to 1912-1-n have the same structure as CDEQ 1912-1-1 (see FIG. 19).

As discussed above, subcarriers, such as SC1', transmitted by secondary nodes 112 are received by primary node 110 subject to processing as described with reference to FIGS. 18 and 19. As further discussed above, outputs from demultiplexers 1911-1 and 1911-2 are fed to corresponding CDEQ circuits 1912, each such output corresponding to symbols associated with a respective subcarrier. FIG. 27 shows one such demultiplexer output being fed to FIR filter 2600, which is included in a corresponding CDEQ 1912.

Figure 28:
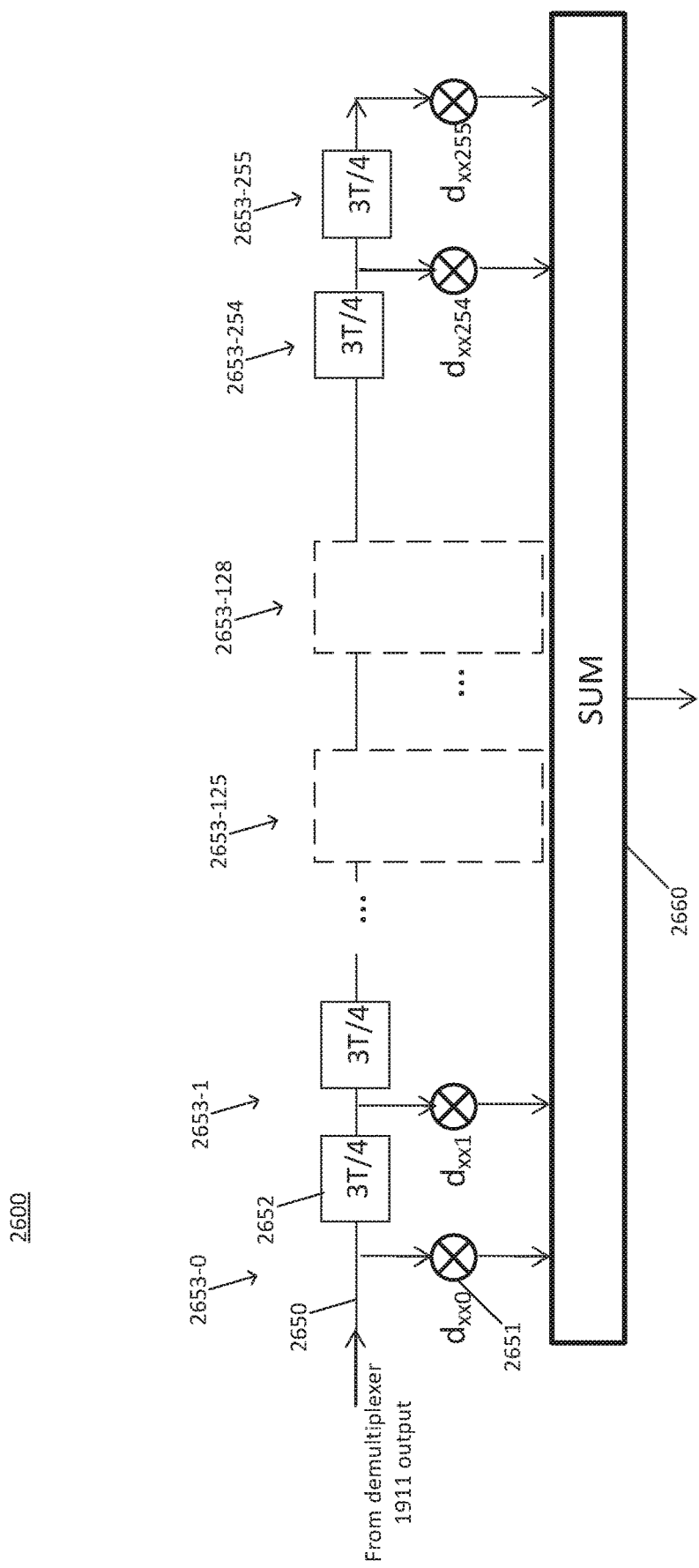
FIG. 28 shows an example of a finite impulse response filter consistent with the present disclosure.

As further shown in FIG. 28, FIR filter 2600 includes a plurality of stages 2653-0 to 2653-255, each of which includes a respective one of delay circuits 2652-0 to 2652-255 and respective one of a plurality of multipliers, such as complex multiplier circuits 2651-0 to 2655-255. Each of multiplier circuits multiplies a respective input to each stage 2653-0 to 2653-255 by a corresponding one of coefficients $d_{xx0}$ to $d_{xx255}$ or tap weights. The products generated by each of multiplier circuits 2651-0 to 2655-255 are summed by an adder circuit 2658.

In operation, stage 2653-0 receives a symbols associated with a corresponding subcarrier, such as SC1'. As noted above, the symbol may be represented by a complex number in the form XI+jXQ for symbols associated with the X polarization and YI+jYQ for symbols associated with the Y polarizsation. In FIG. 25, the symbols is represented by $u_x(n)$, n being an integer. Multiplier circuit 2651-0 multiplies the value $u_x(n)$ by coefficient $d_{xx0}$. The value is next shifted to the next stage 2651-1, and, after a delay created by delay circuit 2652-1, the value (now represented by $u_x(n-1)$ is multiplied by coefficient $h_{xx1}$ with multiplier circuit 2652-1. In the meantime, a subsequent symbol is supplied to the first stage, 2650-0 and multiplied by coefficient $d_{xx0}$. Similarly, multiplier circuits in remaining stages 2650-2 to 2655-255 multiply the values supplied to each such circuit by a respective one of coefficients $d_{xx2}$ to $d_{xx255}$. With each shift to an adjacent stage, following a delay, which in this example is ¾ of a symbol period (T), the value input to each stage is multiplied by a respective coefficient or tap weight and the resulting products are summed by adder 2658 and output. Moreover, with each such shift (or less often) and multiplication, each of coefficients $d_{xx0}$ to $d_{xx255}$ is updated and calculated based on a Least Mean Square (LMS) technique.

Thus, a unique combination of tap weights is calculated in primary node 110 to correct for a particular amount of chromatic dispersion experienced by each of pilot subcarriers SC3' and SC4'.

Typically, secondary nodes 112 are provided at different distances away from primary node 110. If these secondary nodes share a common subcarrier through time division multiplexing, as noted above, the tap weights required to compensate CD, for example, for symbols or data associated with the odd time slots and secondary node 112-1 may be different than the tap weights required to compensate CD for symbols or data associated with the even time slots and second secondary node 112-2. However, the same CDEQs 1912-1-2 and 1912-2-2 are employed to carry out CD compensation during both even and odd time slots. Accordingly, in one example, the tap weights are recalculated during each time slot, which may be difficult at relatively high data rates.

Consistent with an additional aspect of the present disclosure, however, the tap weights calculated by carrying out CD equalization of pilot subcarrier SC3' are provided to CDEQs 1912-1-3 and 1912-2-3 during the odd time slots, and the tap weights calculated by carrying out CD equalization or compensation of pilot subcarrier SC4' are provided to CDEQs 1912-2-4 and 1912-2-4 during the even time slots. In a further example, pilot subcarriers SC3' and SC4' are transmitted continuously, such that their associated CDEQs 1912-1-3/1912-2-3 and 1912-1-4/1912-2-4 continuously update their respective tap weights using LMS, as noted above. Such updated tap weights are then applied during the appropriate time slots, as further noted above.

By providing continuous pilot subcarriers, as noted above, CD compensation can be carried out, even in connection with newly added uplink subcarriers, without undue delay.

In another example, secondary nodes 112-1 and 112-2 may share two subcarriers SC2' and SC5' in the uplink direction. In one example, 64 timeslots are assigned to each of subcarriers SC2' and SC5', and all odd timeslots are assigned to secondary node 112-1, while all even timeslots are assigned to secondary node 112-2. If capacity requirements change, such that both odd and even time slots of subcarier SC5's are assigned to secondary node 112-2 in addition to the even time slots on subcarrier SC2', tap weights are provided the CDEQ circuits associated with SC5' during the odd time slots as well as the even time slots. The timing of such application of tap weights to the CDEQ circuits may be based on an output of a scheduler circuit, such as that described above. Reallocation and scheduling of time slots will next be described.

In the upstream direction, as described above, one or more subcarriers may be transmitted from one or more secondary nodes 112 to primary node 110. If secondary nodes 112 are located at different distances away from primary node 110, the arrival time of data at primary node 110 from one secondary node 112 may be different than the arrival time of data from another secondary node 112. As a result, data input to the primary node 110 from secondary nodes 112 may not be synchronized, such that data launched on a given subcarrier from a first secondary node during one time slot may arrive while primary node 110 is receiving data from another secondary node, leading to errors or loss of data at primary node 110.

Figure 29:
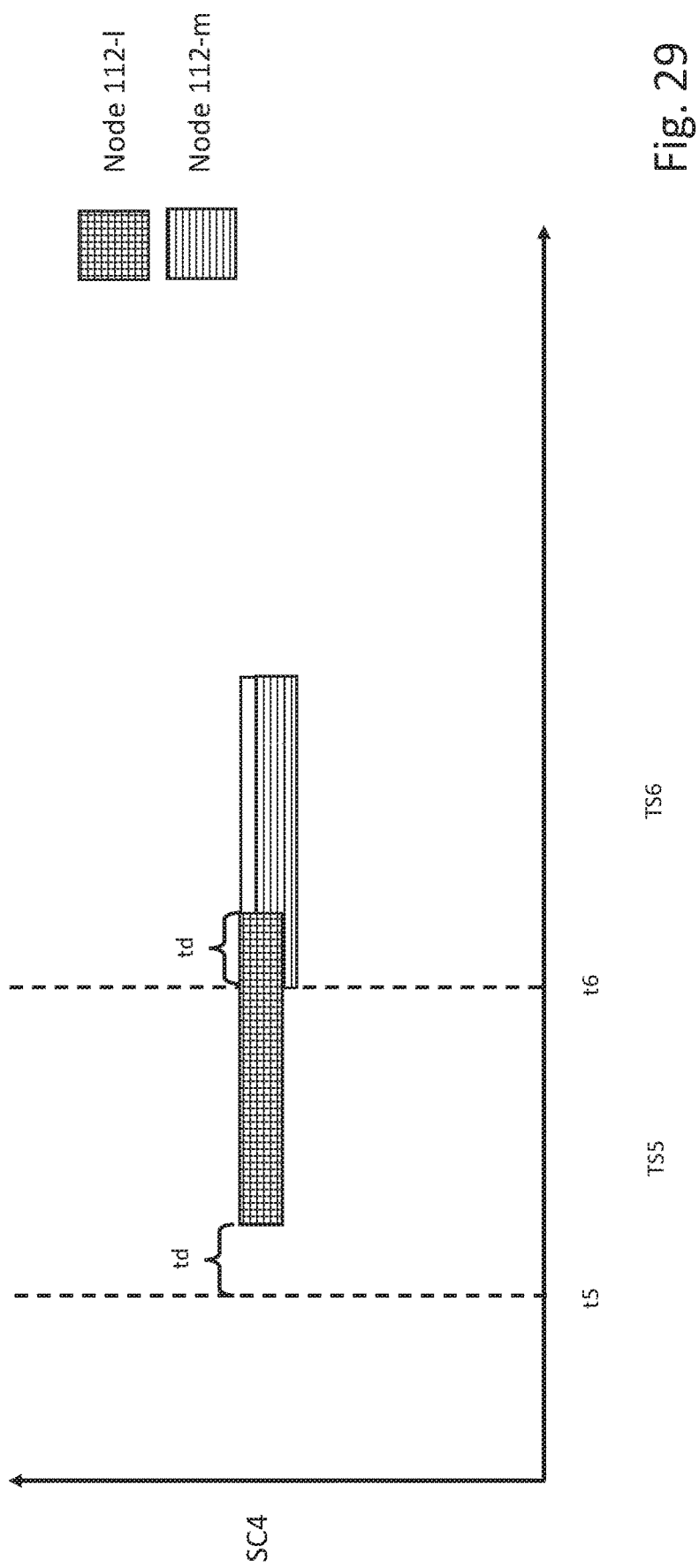
FIG. 29 illustrates arrival times of data from different secondary nodes.

For example, with reference to FIG. 29, if node 112-*l* is farther away from primary node 110 than node 112-*m*, data output from node 112-*l* on subcarrier SC4, for example, will experience a delay, td. Such data will not arrive at primary node 110 until time t5+td, as shown in FIG. 29, and will continue to be received for the during of a time slot, i.e., until time t6+td. At time t6, however, primary node 110 may being to receive data from node 112-*m*, and due to the delay data transmission from node 112-*l*, primary node 110 will, in this example, receive data from both node 112-*l* and 112-*m* on subcarrier 4, such that neither data supplied from node 112-*l* nor data supplied from node 112-*m* may be reliably detected during the interval t6 to t6+td.

According to an aspect of the present disclosure, a method is provided by which circuitry in primary node 110 may determine the "time of flight" delay or the amount of time required for the primary node to send a request to a secondary node and for the primary node to receive a response from the secondary node. Based on such time of flight information, primary node 110 may then schedule or coordinate transmission on various time slots to avoid collisions, such as that shown in FIG. 19.

Figures 30, 31:
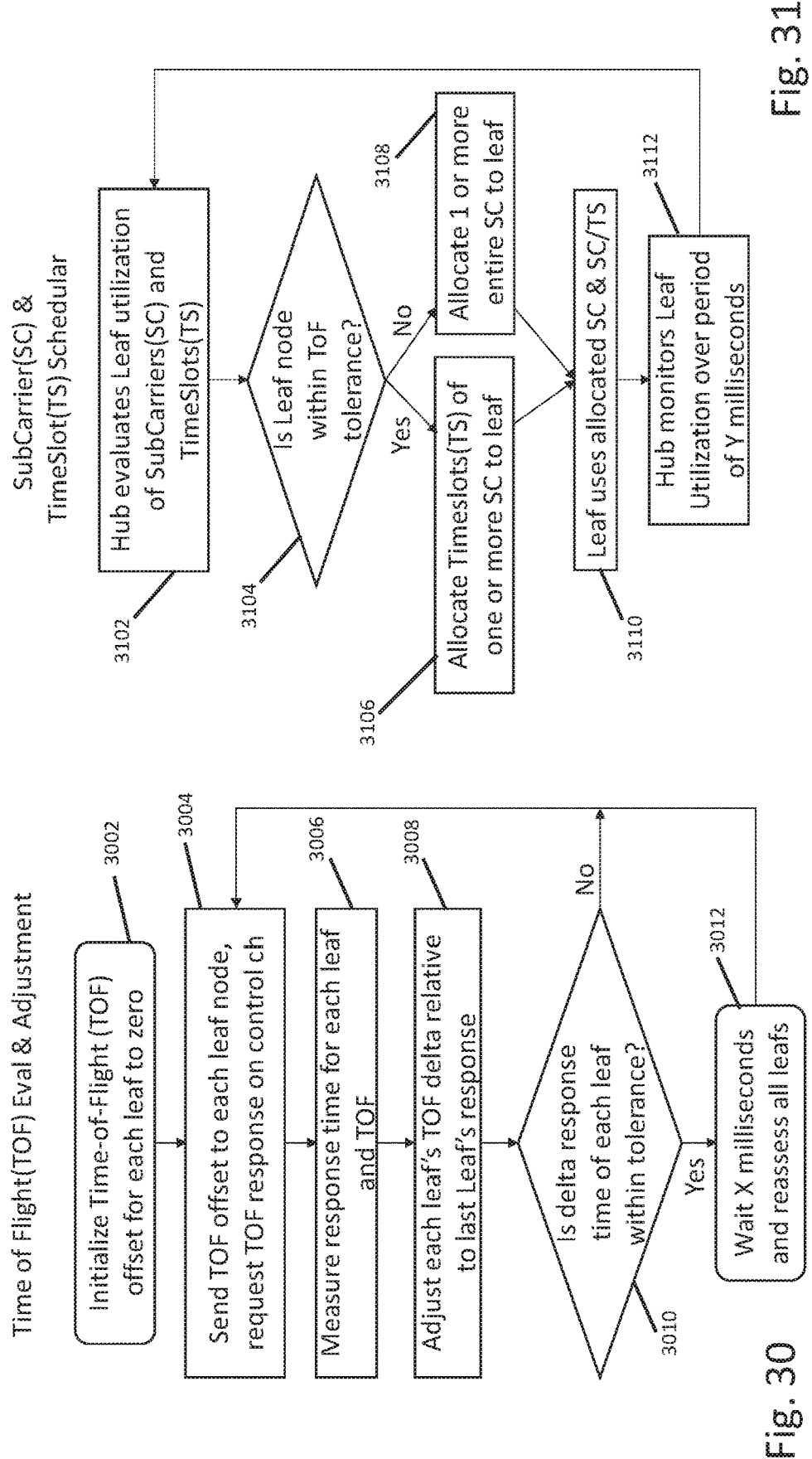
FIG. 30 is a flow chart of a method for determining time of flight and data transmission timing from consistent with an aspect of the present disclosure.
FIG. 31 is a flow chart of a method for scheduling time slots consistent with the present disclosure.

FIG. 30 shows a flow chart of a method for determining time of flight information for each second node 112. In step 3002, circuitry in primary node 110 initializes the time of flight of flight (TOF) offset for each leaf 112 to zero. In step 3004, a test message or TOF offset is sent to each leaf node 112 with an instruction or request for each such leaf node 12 to respond on a control channel, such as an in-band channel that is transmitted with data and is carried by one of the subcarriers. Circuitry in primary node 110 next measures a response time for each leaf node 112 (step 3006). Circuitry in primary node 110 next determines the difference in TOF times ("delta TOF") for each node and each delta TOF is adjusted so that the leaf node 112 having the longest TOF has a delta TOF of zero (step 3008). Next, circuitry in primary node 110 determines when the delta TOF response time of each leaf node 112 is within a given tolerance or margin (step 3010). If not, steps 3004, 3006, 3008, and 3010 are repeated and will continue to be repeated until the delta response time is within such margin. If the delta response time is within the margin, the above method starts again at step 3002 to reassess TOF information after a predetermined time period of X milliseconds.

Once the TOF and delta TOF information is obtained by the method shown in FIG. 30, primary node 110 schedules time slots to avoid collisions through a further method having an associated flow chart shown in FIG. 31. In a first step 3102 of the scheduling method, hub 110 evaluates or measures by way of the control channel noted above leaf node utilization of subcarriers and time slots. Based on such measured utilization, circuitry in hub 110 determines whether a leaf node is within the TOF tolerance or margin (step 3104). If yes, one or more time slots are allocated to that leaf node (step 3106), and, if not, the hub node provides instructions so that one or more subcarriers are allocated to such leaf node such that such leaf node may continuously transmit data on such allocated subcarrier(s) to hub node 110. The leaf nodes are then configured to transmit only during designated time slots or continuously over a one or more subcarriers in accordance with instructions received, for example, by way of the subcarriers noted above dedicated for sending control channel information (step 3110). In step 3112, the hub monitor leaf node utilization over a predetermined time period, such as a time period of Y milliseconds. The process next returns to step 3102.

Note that the above TOF-related calculations may performed outside of primary node 110 or by circuitry inside primary node 110, as noted above.

Figure 32:
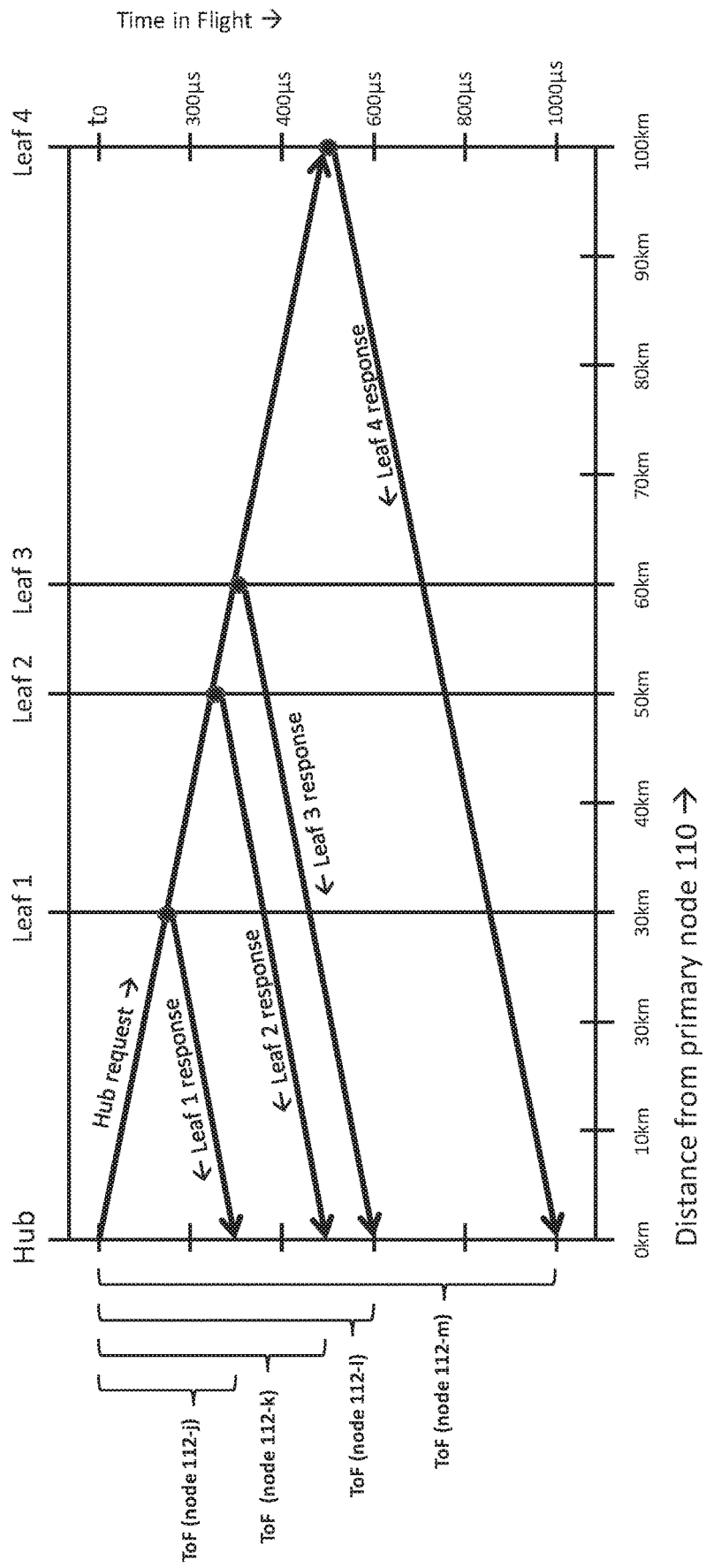
FIG. 32 is a plot showing examples of time hub request and leaf response times, as well as corresponding TOF times.

FIG. 32 is a plot showing examples of time hub request and leaf response times, as well as corresponding TOF times. As depicted in FIG. 32, the farther away a secondary node is from the primary node, the longer or the greater the TOF time. For example, secondary node 112-*m* is located 100 km away from primary node 110 and is thus the farthest secondary node away from primary node 110. Further, in this example, secondary node 112-*l* is 60 km away from primary node 110, and secondary node 112-*k* is 50 km away. In addition, node 112-*j* is located 30 km away from primary node 110 and is thus the closes secondary node to the primary node.

TOF values are determined by circuitry in primary node 110 that measures the time it takes for the primary node to receive a response from a secondary node following a TOF request response (see steps 3004 and 3006 above). As shown in FIGS. 32 and 33, the TOF associated with second node 112-*j* is 300 μs (or 1.5 time slots (TS), assuming each time slot is 200 μs); the TOF associated with node 112-*k* is 500 μs (or 2.5 TS); the TOF associated with node 112-*l* is 600 μs (3.0 TS); and the TOF associated with node 112-*m* is 1000 μs (or 5.0 TS). As noted above, after each TOF is determined, circuitry in primary node 110, for example, determines the TOF associated with each node, wherein the delta TOF is the difference between the longest TOF, here 1000 μs, and the TOF of each remaining secondary node 112 (i.e., longest TOF—TOF of each remaining secondary node). Accordingly, as further shown in table 3302 (FIG. 33), the delta TOF associated with secondary node 112-*j* is 700 μs (1000 μs–300 μs=700 μs or 3.5 TS); the delta TOF associated with secondary node 112-*k* is 500 μs (1000 μs–500 μs=500 μs or 2.5 TS); the delta TOF associated with secondary node 112-*l* is 400 μs (1000 μs–600 μs=400 μs or 2.0 TS); the delta TOF associated with secondary node 112-*m* is 0.0 μs (1000 μs–1000 μs=0.0 μs or 0 TS).

In scheduling the transmission from secondary node 112 to primary node 110, both TOF and delta TOF are taken into account in order to achieve desired arrival times at primary node 110 for each such transmission. An example of such scheduling will next be described with reference to FIG. 34.

Figure 34:
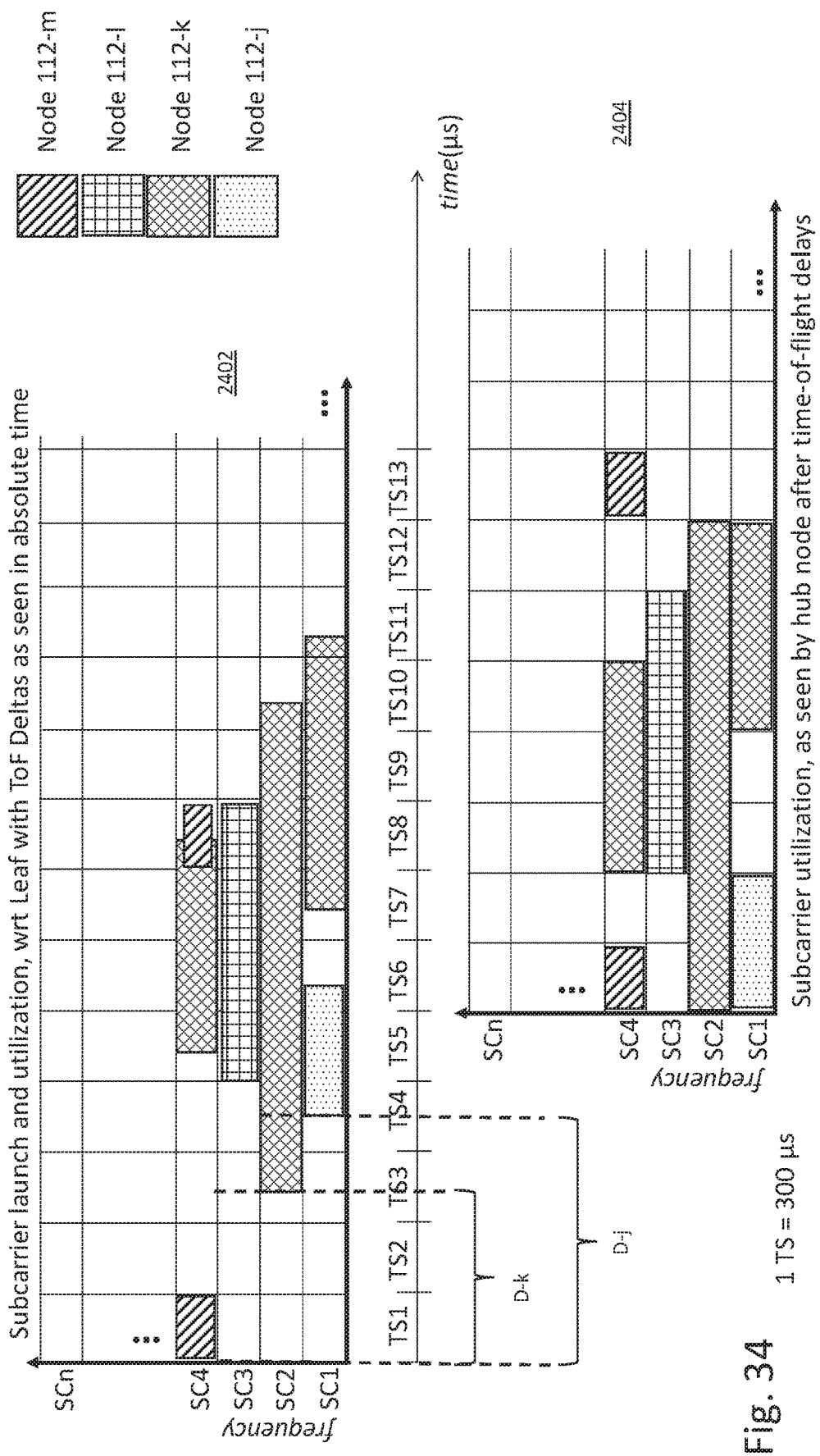
FIG. 34 shows example timing charts consistent with a further aspect of the present disclosure.

FIG. 34 shows example timing charts 3402 and 3404 in which, for ease of explanation, transmission on only subcarriers SC1 to SC4 is shown. Chart 3402 shows launch timing and leaf node utilization in absolute time for the secondary nodes have the TOFs and delta TOFs noted in FIGS. 32 and 33. Chart 3404 shows data carried by various subcarriers originating at such secondary nodes and corresponding arrival times at the primary node without any collisions also in absolute time. In one example, as shown in FIG. 34, it is desirable that node 110 receive data on subcarriers SC1, SC2, and SC4 from secondary nodes 112-*j*, 112-*k*, and 112-*m* respectively, at the beginning of time slot TS6. As noted above, since secondary node 112-*m* is the farthest from primary node 110, secondary node 112-*m* has an associated delta TOF of zero (0). Data is thus scheduled to be transmitted, as shown in chart 3402, during time slot TS1, and, as shown in chart 3404, such data arrives five time slots later during time slot TS6 (see FIGS. 32 and 33). Node 112-*k*, on the other hand, has a shorter time of flight of 2.5 TS. In order to arrive at node 110 at approximately the same time as the data output from node 112-*m*, transmission from node 112-*k* is scheduled to be output or launched toward node 110 following the launch of the node 112-*m* data by an amount of time or delay D-k in chart 3402 approximately equal to delta TOF associated with node 112-*k* or 2.5 TS (see chart 3402). As a result, following such delay, the node 112-*k* data is further delayed by the TOF associated (2.5 TS) with node 112-*k*, such that the 112-*k* data arrives at approximately the same time as the 112-*m* data (see chart 3404).

Further, in order for data transmitted from node 112-*j* to arrive at node 110 at approximately the same time as data output from node 112-*m*, transmission from node 112-*j* is scheduled to be launched toward node 110 after the launch of the node 112-*m* data by an amount of delay D-j approximately equal to the delta TOF associated with node 112-*j* or 3.5 TS (see chart 3402). Accordingly, following D-j, the node 112-*k* data is further delayed by the TOF associated (1.5 TS) with node 112-*j*, such that the 112-*j* data arrives at approximately the same time as the 112-*m* data (see chart 3404).

Other example launch and arrival times and subcarrier utilization are further shown in FIG. 34.

In another example, empty time slots may be provided between transmission by one node on a given subcarrier and transmission by another node on that subcarrier in order to provide sufficient time between slots so as to reduce the risk of collisions or data transmission on a given subcarrier in which time slots overlap, for example, as shown in FIG. 19.

Other embodiments will be apparent to those skilled in the art from consideration of the specification. It is intended that the specification and examples be considered as exemplary only, with a true scope and spirit of the invention being indicated by the following claims.

What is claimed is:

1. A transmitter, comprising:
a laser operable to output an optical signal;
a digital signal processor operable to receive user data and provide a plurality of electrical signals based on the data;
a modulator operable to modulate the optical signal to provide a plurality of optical subcarriers based on the plurality of electrical signals, a first one of the plurality of subcarriers carries first TDMA encoded information and second TDMA encoded information, such that the first TDMA encoded information includes a first portion of the data and is carried by the first one of the plurality of subcarriers during a first time slot, and the second TDMA encoded information includes a second portion of the data and is carried by the first one of the plurality of subcarriers during a second time slot, the first TDMA encoded information being associated with a first node remote from the transmitter and the second TDMA encoded information being associated with a second node remote from the transmitter, wherein a second one of the plurality of subcarriers carries third information that is not TDMA encoded, the third information being associated with a third node remote from the transmitter, and
wherein the digital signal processor includes a burst slot circuit, the burst slot circuit providing time slot data that includes the first information during the first time slot.

2. The transmitter in accordance with claim 1, wherein each of the plurality of optical subcarriers is a Nyquist subcarrier.

3. The transmitter in accordance with claim 1, wherein each of the plurality of optical subcarriers does not spectrally overlap with another of the plurality of optical subcarriers.

4. The transmitter in accordance with claim 1, wherein the digital signal processor includes:
a forward error correction encoder that receives the first portion of the data and provides encoded data;
a bit-to-symbol mapper circuit that provides symbol information based on the encoded data, the burst slot circuit providing time slot data based on the symbol information.

5. The transmitter in accordance with claim 4, further including a scheduler circuit that supplies a first output to the first burst slot circuit and a second output and a second output to the second burst slot circuit, such that a timing of an output of the first time slot data and the second time slot data is controlled based on the first and second outputs, respectively, of the scheduler circuit.

6. The transmitter in accordance with claim 1, further including a scheduler circuit that supplies an output to the burst slot circuit, such that a timing of an output of the time slot data is controlled based on the output of the scheduler circuit.

7. The transmitter in accordance with claim 1, further including a first switch coupled to the digital signal processor, such that, based on a configuration of the switch, the modulator supplies the third optical subcarrier carrying non-TDMA encoded information.

8. The transmitter in accordance with claim 1, further including a switch coupled to the digital signal processor, such that, based on a configuration of the switch, the modulator supplies the second optical subcarrier carrying the third information.

9. The transmitter, comprising:
a laser operable to output an optical signal;
a digital signal processor operable to receive user data and provide a plurality of electrical signals based on the data;
a modulator operable to modulate the optical signal to provide a plurality of optical subcarriers based on the plurality of electrical signals, a first one of the plurality of subcarriers carriers carries first TDMA encoded information and second TDMA encoded information, such that the first TDMA encoded information includes a first portion of the data and is carried by the first one of the plurality of subcarriers during a first time slot, and the second TDMA encoded information includes a second portion of the data and is carried by the first one of the plurality of subcarriers during a second time slot, the first TDMA encoded information being associated with a first node remote from the transmitter and the second TDMA encoded information being associated with a second node remote from the transmitter,
wherein a second one of the plurality of subcarriers carries third information that is not TDMA encoded, the third information being associated with a third node remote from the transmitter,
wherein the digital signal processor includes:
   a first burst slot circuit, the first burst slot circuit providing first time slot data that includes the first information during the first time slot; and
   a second burst slot circuit, the second burst slot circuit providing second time slot data that includes the second information during the second time slot.

10. The transmitter in accordance with claim 9, wherein the digital signal processor includes:
   a first forward error correction encoder that receives the first portion of the data and provides first encoded data;
   a first bit-to-symbol mapper circuit that provides first symbol information based on the first encoded data, the first burst slot circuit providing first time slot data based on the first symbol information; and
   a second bit-to-symbol mapper circuit that provides second symbol information based on the second encoded data, the second burst slot circuit providing second time slot data based on the second symbol information.

11. The transmitter in accordance with claim 10, further including an adder circuit that adds the first time slot data and the second time slot data.

12. A system, comprising:
   a transmitter, including:
   a laser operable to output an optical signal,
   a digital signal processor operable to receive data and provide a plurality of electrical signals based on the data, and
   a modulator operable to modulate the optical signal to provide a plurality of optical subcarriers based on the plurality of electrical signals, a first one of the plurality of subcarriers carries first information during a first time slot and second information during a second time slot, and a second one of the plurality of subcarriers carries third information;
   a first receiver provided in a first node, the first receiver receiving being optically coupled to the transmitter;
   a second receiver provided in a second node, the second receiver being optical coupled to the transmitter, the first and second receivers being remote from the transmitter, such that the first information is associated with the first node and the second information is associated with a second node remote from the transmitter; and
   a third receiver provided in a third node, the third receiver being remote from the transmitter, such that the third information is associated with the third node,
   wherein the digital signal processor includes a burst slot circuit, the burst slot circuit providing time slot data includes the first information during the first time slot.

13. The system in accordance with claim 12, wherein the first and second information is time division multiple access (TDMA) encoded.

14. The system in accordance with claim 12, wherein each of the plurality of optical subcarriers is a Nyquist subcarrier.

15. The system in accordance with claim 12, wherein each of the plurality of optical subcarriers does not spectrally overlap with another of the plurality of optical subcarriers.

16. The system in accordance with claim 12, wherein the digital signal processor includes:
   a forward error correction encoder that receives the first portion of the data and provides encoded data;
   a bit-to-symbol mapper circuit that provides symbol information based on the encoded data, the burst slot circuit providing time slot data based on the symbol information.

17. The system in accordance with claim 16, further including a scheduler circuit that supplies a first output to the first burst slot circuit and a second output and a second output to the second burst slot circuit, such that a timing of an output of the first time slot data and the second time slot data is controlled based on the first and second outputs, respectively, of the scheduler circuit.

18. A system in accordance with claim 12, further including a scheduler circuit that supplies an output to the burst slot circuit, such that a timing of an output of the time slot data is controlled based on the output of the scheduler circuit.

19. The system in accordance with claim 12, further including a switch coupled to the digital signal processor, such that, based on a configuration of the switch, the modulator supplies the second optical subcarrier carrying the third information.

20. A system, comprising:
   a transmitter, including:
   a laser operable to output an optical signal,
   a digital signal processor operable to receive data and provide a plurality of electrical signals based on the data, and
   a modulator operable to modulate the optical signal to provide a plurality of optical subcarriers based on the plurality of electrical signals, a first one of the plurality of subcarriers carries first information during a first time slot and second information during a second time slot, and a second one of the plurality of subcarriers carries third information;
   a first receiver provided in a first node, the first receiver receiving being optically coupled to the transmitter;
   a second receiver provided in a second node, the second receiver being optical coupled to the transmitter, the first and second receivers being remote from the transmitter, such that the first information is associated with the first node and the second information is associated with a second node remote from the transmitter; and
   a third receiver provided in a third node, the third receiver being remote from the transmitter, such that the third information is associated with the third node,
   wherein the digital signal processor includes:
   a first burst slot circuit, the first burst slot circuit providing first time slot data that includes the first information during the first time slot; and
   a second burst slot circuit, the second burst slot circuit providing second time slot data that includes the second information during the second time slot.

21. The system in accordance with claim 20, wherein the digital signal processor includes:
   a first forward error correction encoder that receives the first portion of the data and provides first encoded data;
   a first bit-to-symbol mapper circuit that provides first symbol information based on the first encoded data, the first burst slot circuit providing first time slot data based on the first symbol information; and
   a second bit-to-symbol mapper circuit that provides second symbol information based on the second encoded data, the second burst slot circuit providing second time slot data based on the second symbol information.

22. The system in accordance with claim 21, further including an adder circuit that adds the first time slot data and the second time slot data.

23. A receiver, comprising:

a local oscillator laser;

an optical hybrid circuit that receives a plurality of optical subcarriers and an optical signal supplied from the local oscillator laser, the optical hybrid circuit supplying a plurality of mixing products, one of the plurality of optical subcarriers carrying first information during a first time slot and second information during a second time slot, and a second one of the plurality of optical subcarriers carrying third information, the first information being designated for the receiver and the second and third information being designated for another first receiver and another second receiver, respectively;

a photodiode circuit that receives the plurality of mixing products and outputs a plurality of electrical signals;

a digital signal processor that outputs, based on the plurality of electrical signals, data associated with the first information, wherein the data is first data, further including a switch, such that, when the switch has a first configuration, the receiver outputs the first data, and, when the switch has a second configuration, the receiver outputs second data associated with the third information carried by the second subcarrier.

24. The receiver in accordance with claim 23, wherein the first and second information is time division multiple access (TDMA) encoded.

25. The receiver in accordance with claim 23, wherein each of the plurality of optical subcarriers is a Nyquist subcarrier.

26. The receiver in accordance with claim 23, wherein each of the plurality of optical subcarriers does not spectrally overlap with another of the plurality of optical subcarriers.

* * * * *